US012155043B2

(12) United States Patent
Velderman et al.

(10) Patent No.: US 12,155,043 B2
(45) Date of Patent: *Nov. 26, 2024

(54) TRANSPORT SYSTEM FOR BATTERY PACK

(71) Applicant: BLACK & DECKER INC., New Britain, CT (US)

(72) Inventors: Matthew J. Velderman, Baltimore, MD (US); Daniel J. White, Baldwin, MD (US); Daniel Fitzgerald, Parkville, MD (US); Ryan Klee, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/922,688

(22) Filed: Jul. 7, 2020

(65) Prior Publication Data

US 2020/0335834 A1 Oct. 22, 2020

Related U.S. Application Data

(63) Continuation of application No. 15/299,952, filed on Oct. 21, 2016, now Pat. No. 10,840,559, which is a
(Continued)

(51) Int. Cl.
*H01M 10/00* (2006.01)
*H01M 10/42* (2006.01)
(Continued)

(52) U.S. Cl.
CPC ..... *H01M 10/4207* (2013.01); *H01M 10/425* (2013.01); *H01M 50/204* (2021.01);
(Continued)

(58) Field of Classification Search
CPC .......... H01M 10/4207; H01M 10/425; H01M 50/20; H01M 50/502; H01M 2220/30;
(Continued)

(56) References Cited

U.S. PATENT DOCUMENTS 2,559,521 A 7/1951 Smith, Jr. et al.
2,590,805 A 3/1952 Vitale
(Continued)

FOREIGN PATENT DOCUMENTS

CA 1304464 6/1992
CA 1315335 3/1993
(Continued)

OTHER PUBLICATIONS

ThunderVolt System Catalog 1990.
(Continued)

*Primary Examiner* — Nicholas P D'Aniello
(74) *Attorney, Agent, or Firm* — Michael Aronoff

(57) ABSTRACT

A battery pack and transport coupler for enabling the battery pack to reduce the pack power capacity. The battery pack include at least two strings of battery cells and a coupler provided at least partially inside the housing. The coupler is moveable between a first position, which causes the string of battery cells to be electrically connected inside the housing, and a second position, which causes the strings of battery cells to be electrically disconnected inside the housing.

22 Claims, 81 Drawing Sheets

Related U.S. Application Data continuation of application No. 14/931,240, filed on Nov. 3, 2015, now Pat. No. 9,893,384, which is a continuation-in-part of application No. 14/715,258, filed on May 18, 2015, now Pat. No. 9,406,915.

(60) Provisional application No. 62/240,252, filed on Oct. 12, 2015, provisional application No. 62/118,917, filed on Feb. 20, 2015, provisional application No. 62/114,645, filed on Feb. 11, 2015, provisional application No. 62/093,513, filed on Dec. 18, 2014, provisional application No. 62/091,134, filed on Dec. 12, 2014, provisional application No. 62/046,546, filed on Sep. 5, 2014, provisional application No. 62/000,307, filed on May 19, 2014, provisional application No. 62/000,112, filed on May 19, 2014, provisional application No. 61/994,953, filed on May 18, 2014.

(51) Int. Cl.
  *H01M 50/204* (2021.01)
  *H02J 7/00* (2006.01)
  *H02J 7/02* (2016.01)
  *H02P 27/08* (2006.01)
  *H01M 50/271* (2021.01)
  *H01M 50/502* (2021.01)

(52) U.S. Cl.
  CPC .......... *H02J 7/0024* (2013.01); *H02J 7/0045* (2013.01); *H02J 7/02* (2013.01); *H02P 27/085* (2013.01); *H01M 50/271* (2021.01); *H01M 50/502* (2021.01); *H01M 2220/30* (2013.01)

(58) Field of Classification Search
  CPC .......... H02J 7/0024; H02J 7/0045; H02J 7/02; H02P 27/085; B25F 5/02; Y02E 60/10
  See application file for complete search history.

(56) References Cited

U.S. PATENT DOCUMENTS

| | | |
|---|---|---|
| 3,214,670 A | 10/1965 | Schaf et al. |
| 3,344,899 A | 10/1967 | Wang et al. |
| 3,453,518 A | 7/1969 | Rose et al. |
| 3,456,119 A | 7/1969 | Franklin et al. |
| 3,525,912 A | 8/1970 | Gus et al. |
| 3,757,194 A | 9/1973 | Weber et al. |
| 3,838,465 A | 9/1974 | Fischer et al. |
| 3,936,710 A | 2/1976 | Tanikoshi et al. |
| 3,970,912 A | 7/1976 | Hoffman |
| 4,175,249 A | 11/1979 | Gruber et al. |
| 4,240,015 A | 12/1980 | White et al. |
| 4,267,914 A | 5/1981 | Saar et al. |
| 4,285,112 A | 8/1981 | Eshghy et al. |
| 4,292,571 A | 9/1981 | Cuneo et al. |
| 4,315,162 A | 2/1982 | Ferguson et al. |
| 4,581,570 A | 4/1986 | Mejia |
| 4,709,202 A | 11/1987 | Koenck et al. |
| 4,737,661 A | 4/1988 | Lessign, III et al. |
| 4,834,192 A | 5/1989 | Hansson et al. |
| 4,835,409 A | 5/1989 | Walter et al. |
| 4,835,410 A | 5/1989 | Bhagwat et al. |
| 4,835,448 A | 5/1989 | Dishner et al. |
| 4,847,513 A | 7/1989 | Katz et al. |
| 4,879,503 A | 11/1989 | Aoki et al. |
| 5,028,858 A | 7/1991 | Schnizler et al. |
| 5,095,259 A | 3/1992 | Bailey et al. |
| 5,121,046 A | 6/1992 | McCullough et al. |
| 5,180,641 A | 1/1993 | Burns et al. |
| 5,217,395 A | 6/1993 | Bailey et al. |
| 5,229,693 A | 7/1993 | Futami et al. |
| 5,235,232 A | 8/1993 | Conley et al. |
| 5,285,112 A | 2/1994 | Mann |
| 5,298,821 A | 3/1994 | Michel et al. |
| 5,298,839 A | 3/1994 | Takeda |
| 5,354,215 A | 10/1994 | Viracola et al. |
| 5,406,266 A | 4/1995 | Mino et al. |
| 5,418,433 A | 5/1995 | Nilssen |
| 5,461,264 A | 10/1995 | Yang et al. |
| 5,506,456 A | 3/1996 | Yang et al. |
| 5,573,074 A | 11/1996 | Thames et al. |
| 5,628,054 A | 5/1997 | Osaka |
| 5,654,623 A | 8/1997 | Shiga et al. |
| 5,687,129 A | 11/1997 | Kim et al. |
| 5,715,156 A | 2/1998 | Yilmaz et al. |
| 5,734,025 A | 2/1998 | Komai et al. |
| 5,739,651 A | 3/1998 | Miyazawa et al. |
| 5,804,939 A | 9/1998 | Yamai et al. |
| 5,821,722 A | 10/1998 | Forbes et al. |
| 5,897,454 A | 4/1999 | Cannaliato et al. |
| 5,898,290 A | 4/1999 | Beard et al. |
| 6,034,494 A | 3/2000 | Kitamine et al. |
| 6,057,608 A | 5/2000 | Bailey, Jr. et al. |
| 6,072,299 A | 6/2000 | Kurle et al. |
| 6,081,087 A | 6/2000 | Iijima et al. |
| 6,104,162 A | 8/2000 | Sainsbury et al. |
| 6,137,268 A | 10/2000 | Mitchell et al. |
| 6,140,927 A | 10/2000 | Whitmire |
| 6,172,437 B1 | 1/2001 | Du et al. |
| 6,172,860 B1 | 1/2001 | Yoshimizu et al. |
| 6,243,276 B1 | 6/2001 | Neumann et al. |
| 6,268,711 B1 | 7/2001 | Bearfield et al. |
| 6,296,065 B1 | 10/2001 | Carrier et al. |
| 6,308,059 B1 | 10/2001 | Domes |
| 6,324,339 B1 | 11/2001 | Hudson et al. |
| 6,346,793 B1 | 2/2002 | Shibata et al. |
| 6,377,848 B1 | 4/2002 | Garde et al. |
| 6,400,107 B1 | 6/2002 | Nakatani et al. |
| 6,430,692 B1 | 8/2002 | Kimble et al. |
| 6,431,289 B1 | 8/2002 | Potter et al. |
| 6,448,732 B1 | 9/2002 | Block et al. |
| 6,460,626 B2 | 10/2002 | Carrier et al. |
| 6,495,932 B1 | 12/2002 | Nakagawa et al. |
| 6,522,902 B2 | 2/2003 | Nishihara et al. |
| 6,536,536 B1 | 3/2003 | Gass et al. |
| 6,566,843 B2 | 5/2003 | Takano et al. |
| 6,573,621 B2 | 6/2003 | Neumann et al. |
| 6,577,097 B2 | 6/2003 | Krefta et al. |
| 6,580,235 B2 | 6/2003 | Laurent et al. |
| 6,581,696 B2 | 6/2003 | Giardino et al. |
| 6,624,535 B2 | 9/2003 | Morrow et al. |
| 6,674,180 B2 | 1/2004 | Gale et al. |
| 6,675,912 B2 | 1/2004 | Carrier et al. |
| 6,683,396 B2 | 1/2004 | Ishida et al. |
| 6,713,988 B2 | 3/2004 | Dubac et al. |
| 6,727,679 B2 | 4/2004 | Kovarik et al. |
| 6,731,022 B2 | 5/2004 | Silverman et al. |
| 6,753,673 B2 | 6/2004 | Shiue et al. |
| 6,761,229 B2 | 7/2004 | Cripe et al. |
| 6,765,317 B2 | 7/2004 | Chu |
| 6,777,910 B2 | 8/2004 | Small |
| 6,860,341 B2 | 3/2005 | Spielmann et al. |
| 6,971,951 B2 | 12/2005 | Boyer et al. |
| 6,978,846 B2 | 12/2005 | Kawai et al. |
| 6,982,541 B2 | 1/2006 | Zick et al. |
| 6,983,810 B2 | 1/2006 | Hara et al. |
| 7,007,762 B2 | 3/2006 | Yamamoto et al. |
| 7,039,533 B2 | 5/2006 | Bertness et al. |
| 7,064,519 B2 | 6/2006 | Ito et al. |
| 7,085,123 B2 | 8/2006 | Shiue et al. |
| 7,090,030 B2 | 8/2006 | Miller et al. |
| 7,102,306 B2 | 9/2006 | Hamaoka et al. |
| 7,121,361 B2 | 10/2006 | Hara et al. |
| 7,157,870 B2 | 1/2007 | Nakawa et al. |
| 7,157,882 B2 | 1/2007 | Johnson et al. |
| 7,161,326 B2 | 1/2007 | Kubota et al. |
| 7,176,656 B2 | 2/2007 | Feldmann et al. |
| 7,193,385 B2 | 3/2007 | Emadi et al. |
| 7,196,911 B2 | 3/2007 | Takano et al. |
| 7,202,622 B2 | 4/2007 | Eskritt et al. |
| 7,210,541 B2 | 5/2007 | Miller et al. |

(56) References Cited

U.S. PATENT DOCUMENTS

| | | |
|---|---|---|
| 7,292,009 B2 | 11/2007 | Kawakami et al. |
| 7,298,113 B2 | 11/2007 | Orikasa |
| 7,304,453 B2 | 12/2007 | Eaves |
| 7,327,120 B2 | 2/2008 | Lin et al. |
| 7,332,889 B2 | 2/2008 | Glasgow et al. |
| 7,342,381 B2 | 3/2008 | Johnson et al. |
| 7,385,366 B2 | 7/2008 | Yukitake et al. |
| 7,397,219 B2 | 7/2008 | Phillips et al. |
| 7,443,134 B2 | 10/2008 | Phillips et al. |
| 7,463,007 B2 | 12/2008 | Phillips et al. |
| 7,486,047 B2 | 2/2009 | Phillips et al. |
| 7,494,035 B2 | 2/2009 | Weaver et al. |
| 7,516,726 B2 | 4/2009 | Esaka et al. |
| 7,551,411 B2 | 6/2009 | Woods et al. |
| 7,589,500 B2 | 9/2009 | Johnson et al. |
| 7,592,773 B2 | 9/2009 | Pellenc |
| 7,602,146 B2 | 10/2009 | Carrier et al. |
| 7,621,652 B2 | 11/2009 | Zick et al. |
| 7,653,963 B2 | 2/2010 | Cochran et al. |
| 7,659,696 B2 | 2/2010 | Zeiler et al. |
| 7,675,263 B2 | 3/2010 | Kawasumi et al. |
| 7,696,721 B2 | 4/2010 | Young et al. |
| 7,723,954 B2 | 5/2010 | Frucht |
| 7,750,594 B2 | 7/2010 | Clothier et al. |
| 7,752,760 B2 | 7/2010 | Baskar et al. |
| 7,755,308 B2 | 7/2010 | Kayikci et al. |
| 7,821,217 B2 | 10/2010 | Abolhassani et al. |
| 7,880,628 B2 | 2/2011 | Yoo |
| 8,025,418 B2 | 9/2011 | Zick et al. |
| 8,040,090 B2 | 10/2011 | Kitagawa et al. |
| 8,044,814 B2 | 10/2011 | Bruce et al. |
| 8,067,922 B2 | 11/2011 | Phelps, III et al. |
| 8,076,873 B1 | 12/2011 | Lucas et al. |
| 8,136,254 B2 | 3/2012 | Riddell et al. |
| 8,159,194 B2 | 4/2012 | Mori et al. |
| 8,198,835 B2 | 6/2012 | Yokoyama et al. |
| 8,212,504 B2 | 7/2012 | Ogahara et al. |
| 8,222,863 B2 | 7/2012 | Sakakibara |
| 8,241,235 B2 | 8/2012 | Kahler et al. |
| 8,310,177 B2 | 11/2012 | Naumann et al. |
| 8,344,685 B2 | 1/2013 | Bertness et al. |
| 8,376,667 B2 | 2/2013 | Wilbert et al. |
| 8,378,632 B2 | 2/2013 | Bourilkov et al. |
| 8,381,829 B2 | 2/2013 | Hanawa et al. |
| 8,395,337 B2 | 3/2013 | Onishi et al. |
| 8,410,756 B2 | 4/2013 | Matsunaga |
| 8,424,213 B2 | 4/2013 | Fukinuki et al. |
| 8,490,732 B2 | 7/2013 | Sugimoto et al. |
| 8,564,236 B2 | 10/2013 | Hirabayashi et al. |
| 8,587,230 B2 | 11/2013 | Pant et al. |
| 8,601,640 B2 | 12/2013 | Bertram et al. |
| 8,643,319 B2 | 2/2014 | Celik et al. |
| 8,704,483 B2 | 4/2014 | Bertness et al. |
| 8,723,480 B2 | 5/2014 | Lim et al. |
| 8,732,896 B2 | 5/2014 | Lucas et al. |
| 8,733,470 B2 | 5/2014 | Matthias et al. |
| 8,796,995 B2 | 8/2014 | Cunanan et al. |
| 8,797,004 B2 | 8/2014 | Skinner et al. |
| 8,813,866 B2 | 8/2014 | Suzuki et al. |
| 8,847,532 B2 | 9/2014 | Kawai et al. |
| 8,872,474 B2 | 10/2014 | Scheucher |
| 8,876,540 B2 | 11/2014 | Lavender |
| 8,988,077 B2 | 3/2015 | Ishihara |
| 8,994,331 B2 | 3/2015 | Kerfoot, Jr. et al. |
| 8,994,336 B2 | 3/2015 | Brotto et al. |
| 9,041,322 B2 | 5/2015 | Shimizu et al. |
| 9,112,360 B2 | 8/2015 | Goto et al. |
| RE45,897 E | 2/2016 | Naumann et al. |
| 9,362,762 B2 | 6/2016 | Bobbin et al. |
| 9,583,745 B2* | 2/2017 | White .................. H02P 29/032 |
| 9,893,384 B2* | 2/2018 | Velderman ........ H01M 10/4207 |
| 10,840,559 B2* | 11/2020 | Velderman ................ H02J 7/02 |
| 10,978,746 B2* | 4/2021 | Velderman ............ H01M 50/20 |
| 2001/0017531 A1 | 8/2001 | Sakakibara et al. |
| 2003/0090162 A1 | 5/2003 | Cornog et al. |
| 2003/0090227 A1 | 5/2003 | Ito et al. |
| 2003/0235060 A1 | 12/2003 | Matsubara et al. |
| 2004/0140781 A1 | 7/2004 | Craven et al. |
| 2004/0257038 A1 | 12/2004 | Johnson et al. |
| 2005/0017686 A1 | 1/2005 | Sakakibara et al. |
| 2005/0110458 A1 | 5/2005 | Seman et al. |
| 2005/0156566 A1 | 7/2005 | Thorsoe et al. |
| 2005/0193538 A1 | 9/2005 | Quinn et al. |
| 2005/0200339 A1 | 9/2005 | Phillips et al. |
| 2005/0247459 A1 | 11/2005 | Voigt et al. |
| 2005/0263305 A1 | 12/2005 | Shimizu et al. |
| 2005/0280393 A1 | 12/2005 | Feldmann et al. |
| 2006/0038572 A1 | 2/2006 | Philbrook |
| 2006/0071636 A1 | 4/2006 | Phillips et al. |
| 2006/0091849 A1 | 5/2006 | Huynh et al. |
| 2006/0125445 A1 | 6/2006 | Cao et al. |
| 2006/0157262 A1 | 7/2006 | Chen et al. |
| 2006/0164032 A1 | 7/2006 | Johnson et al. |
| 2006/0218768 A1 | 10/2006 | Makimae et al. |
| 2006/0222930 A1 | 10/2006 | Aradachi et al. |
| 2006/0225904 A1 | 10/2006 | Chen et al. |
| 2006/0268504 A1 | 11/2006 | Shimizu et al. |
| 2007/0034394 A1 | 2/2007 | Gass et al. |
| 2007/0090796 A1 | 4/2007 | Norris et al. |
| 2007/0152624 A1 | 7/2007 | Hamaoka et al. |
| 2007/0159007 A1 | 7/2007 | King et al. |
| 2008/0030198 A1 | 2/2008 | Kawata et al. |
| 2008/0079319 A1 | 4/2008 | Okada et al. |
| 2008/0182143 A1 | 7/2008 | Dong et al. |
| 2008/0193832 A1 | 8/2008 | Doffin et al. |
| 2008/0218917 A1 | 9/2008 | Archer et al. |
| 2008/0248376 A1* | 10/2008 | Rejman .................. H01M 50/20 |
| | | 429/97 |
| 2008/0266913 A1 | 10/2008 | Brotto et al. |
| 2008/0284363 A1 | 11/2008 | Lucas et al. |
| 2009/0108806 A1 | 4/2009 | Takano et al. |
| 2009/0121550 A1 | 5/2009 | Riviera et al. |
| 2009/0237012 A1 | 9/2009 | Yokoyama et al. |
| 2010/0032468 A1 | 2/2010 | Gross et al. |
| 2010/0181966 A1 | 7/2010 | Sakakibara et al. |
| 2010/0244769 A1 | 9/2010 | Sakakibara |
| 2010/0320969 A1 | 12/2010 | Sakakibara et al. |
| 2011/0001456 A1 | 1/2011 | Wang et al. |
| 2011/0012560 A1* | 1/2011 | Sakakibara ......... H01M 10/441 |
| | | 320/118 |
| 2011/0037423 A1 | 2/2011 | Koda et al. |
| 2011/0043143 A1 | 2/2011 | Alter et al. |
| 2011/0090726 A1 | 4/2011 | Brotto et al. |
| 2011/0121782 A1 | 5/2011 | Marsh et al. |
| 2011/0147031 A1 | 7/2011 | Matthias et al. |
| 2011/0162219 A1 | 7/2011 | Okouchi et al. |
| 2011/0250484 A1 | 10/2011 | Meng et al. |
| 2011/0279070 A1 | 11/2011 | Tanaka et al. |
| 2011/0285352 A1 | 11/2011 | Lim et al. |
| 2011/0291617 A1 | 12/2011 | Rosenbecker et al. |
| 2012/0037385 A1 | 2/2012 | Suzuki et al. |
| 2012/0048588 A1 | 3/2012 | Iyoda et al. |
| 2012/0092018 A1 | 4/2012 | Scheucher |
| 2012/0205984 A1 | 8/2012 | Goto et al. |
| 2012/0239957 A1 | 9/2012 | Hsiao et al. |
| 2012/0287691 A1 | 11/2012 | Breuner et al. |
| 2012/0293128 A1 | 11/2012 | Kim et al. |
| 2012/0321912 A1 | 12/2012 | Hachisuka et al. |
| 2013/0002175 A1 | 1/2013 | Shimizu et al. |
| 2013/0025893 A1 | 1/2013 | Ota et al. |
| 2013/0044002 A1 | 2/2013 | Schneider et al. |
| 2013/0082627 A1 | 4/2013 | Ichikawa et al. |
| 2013/0082661 A1* | 4/2013 | Bohan, Jr. ............ H01M 10/425 |
| | | 320/134 |
| 2013/0106355 A1 | 5/2013 | Kim et al. |
| 2013/0134787 A1 | 5/2013 | Sakakibara |
| 2013/0162045 A1 | 6/2013 | Weissenborn et al. |
| 2013/0164589 A1 | 6/2013 | Ota et al. |
| 2013/0187461 A1 | 7/2013 | Goto et al. |
| 2013/0293197 A1 | 11/2013 | Sakakibara et al. |
| 2013/0314007 A1 | 11/2013 | Yanagihara et al. |
| 2013/0320926 A1 | 12/2013 | Kerfoot, Jr. et al. |
| 2013/0334898 A1 | 12/2013 | Kao et al. |
| 2013/0335012 A1 | 12/2013 | Meyer et al. |

(56) References Cited

U.S. PATENT DOCUMENTS

| | | |
|---|---|---|
| 2014/0077605 A1 | 3/2014 | Bulur et al. |
| 2014/0132093 A1 | 5/2014 | Purohit et al. |
| 2014/0190017 A1 | 7/2014 | Máynez et al. |
| 2014/0210379 A1 | 7/2014 | Kato et al. |
| 2014/0361740 A1 | 12/2014 | Suzuki et al. |
| 2015/0015205 A1 | 1/2015 | Suzuki et al. |
| 2015/0137717 A1 | 5/2015 | Ishikawa et al. |
| 2019/0157881 A1* | 5/2019 | Velderman ............ H02J 7/0013 |
| 2021/0016668 A1* | 1/2021 | Nakahara ............ H01M 50/249 |

FOREIGN PATENT DOCUMENTS

| | | |
|---|---|---|
| DE | 1175352 | 8/1964 |
| DE | 2412143 | 9/1975 |
| DE | 2838996 | 3/1980 |
| DE | 3844093 | 7/1990 |
| DE | 19747139 | 11/1998 |
| DE | 19907369 | 8/2000 |
| DE | 19963450 | 11/2000 |
| DE | 102006003454 | 8/2007 |
| DE | 102009046565 | 5/2011 |
| DE | 202012001853 | 5/2012 |
| DE | 202013102567 | 9/2013 |
| DE | 102012210662 | 12/2013 |
| DE | 202011110568 | 10/2014 |
| EP | 0024268 | 2/1981 |
| EP | 0170833 | 2/1986 |
| EP | 0310717 | 4/1989 |
| EP | 0310718 | 4/1989 |
| EP | 0372823 | 7/1990 |
| EP | 0609101 | 8/1994 |
| EP | 1266725 | 12/2002 |
| EP | 1381131 | 1/2004 |
| EP | 1469583 | 10/2004 |
| EP | 1898508 | 3/2008 |
| EP | 1903657 | 3/2008 |
| EP | 2200145 | 6/2010 |
| EP | 2246157 | 11/2010 |
| EP | 2397277 | 12/2011 |
| EP | 2132000 | 4/2012 |
| EP | 2495843 | 5/2012 |
| EP | 2554334 | 2/2013 |
| EP | 2554335 | 2/2013 |
| EP | 2704287 | 3/2014 |
| EP | 2747235 | 6/2014 |
| EP | 2913158 | 2/2015 |
| GB | 2399148 | 9/2004 |
| GB | 1403971.3 | 9/2015 |
| JP | 4-183253 | 6/1992 |
| JP | 05236608 | 9/1993 |
| JP | 7337067 | 12/1995 |
| JP | 2000308268 | 11/2000 |
| JP | 2002315381 | 10/2002 |
| JP | 2012231655 | 11/2012 |
| WO | 9748922 | 12/1997 |
| WO | 9828831 | 7/1998 |
| WO | 9967869 | 12/1999 |
| WO | 2005099043 | 10/2005 |
| WO | 2007116239 | 10/2007 |
| WO | 2008155209 | 12/2008 |
| WO | 2009055360 | 4/2009 |
| WO | 2011099348 | 8/2011 |
| WO | 2011105794 | 9/2011 |
| WO | 2012039418 | 3/2012 |
| WO | 2013027772 | 2/2013 |
| WO | 2013187837 | 12/2013 |
| WO | 2014075285 | 5/2014 |
| WO | 2014119126 | 8/2014 |
| WO | 2014119128 | 8/2014 |
| WO | 2014119135 | 8/2014 |
| WO | 2014119188 | 8/2014 |
| WO | 2014119203 | 8/2014 |
| WO | 2014192372 | 12/2014 |
| WO | 2015132606 | 9/2015 |
| WO | PCT/GB2015/050651 | 9/2015 |

OTHER PUBLICATIONS

ThunderVolt System Instruction Manual 1988.
PCT International Search Report, Aug. 7, 2015.
Thundervolt 12 & 24 Volt System Instruction Manual.
ThunderVolt Circular Saw Instruction Manual 1988.
Thunder Volt System VSR Dual Range Drill, VSR Dual Range Hammer Drill, VSR Scrudrill Instruction Manual 1989.
Non Final Office Action dated Dec. 6, 2016 issued in corresponding patent application.
PCT International Search Report dated Jan. 13, 2016.
International Preliminary Report and Written Opinion dated Jun. 22, 2017 issued in corresponding PCT Application No. PCT/US2015/058772.
PCT Search Report, Shane Thomas, Jan. 13, 2016.

* cited by examiner

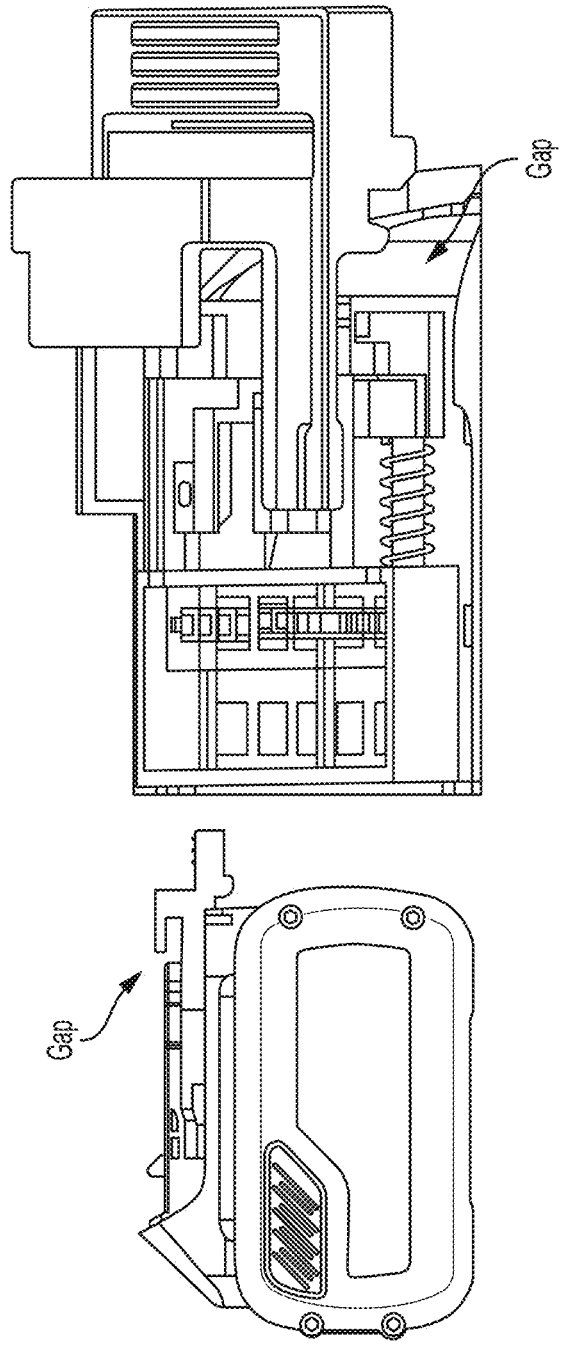

lock engaged = transport configuration

Figure 31 Low Rated Voltage Configuration
four power switches in closed state, two power switches in closed state In the low rated voltage configuration, the A string (set) of battery cells, the B string (set) of battery cells, and the C string (set) of battery cells are electrically connected in parallel by switches.

The open state can be suitably preserved to create the transport configuration by inserting a reliably secured insulating plastic divider to separate the terminals. After purchase, the user removes the plastic divider to create a functioning first operational configuration (low rated voltage configuration) battery. The user can reinsert the plastic divider to create the transport configuration for future transport.

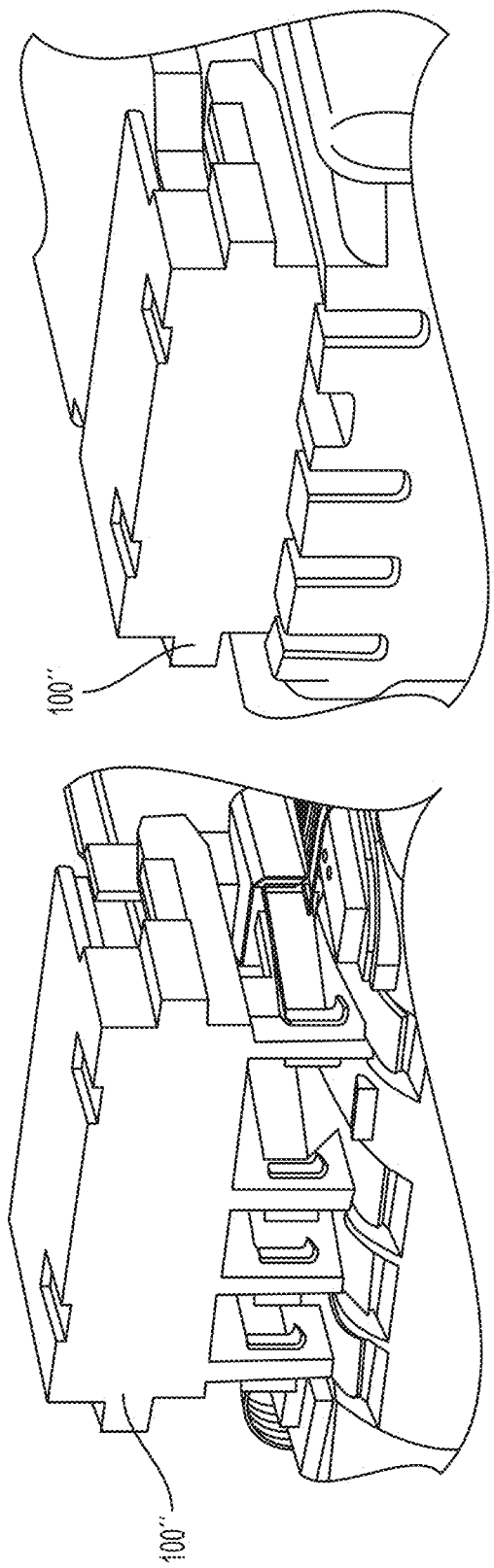

Transport Configuration
six power switches in opened state

Figure 35  Medium Rated Voltage Configuration
two power switches in closed state, four power switches in closed state

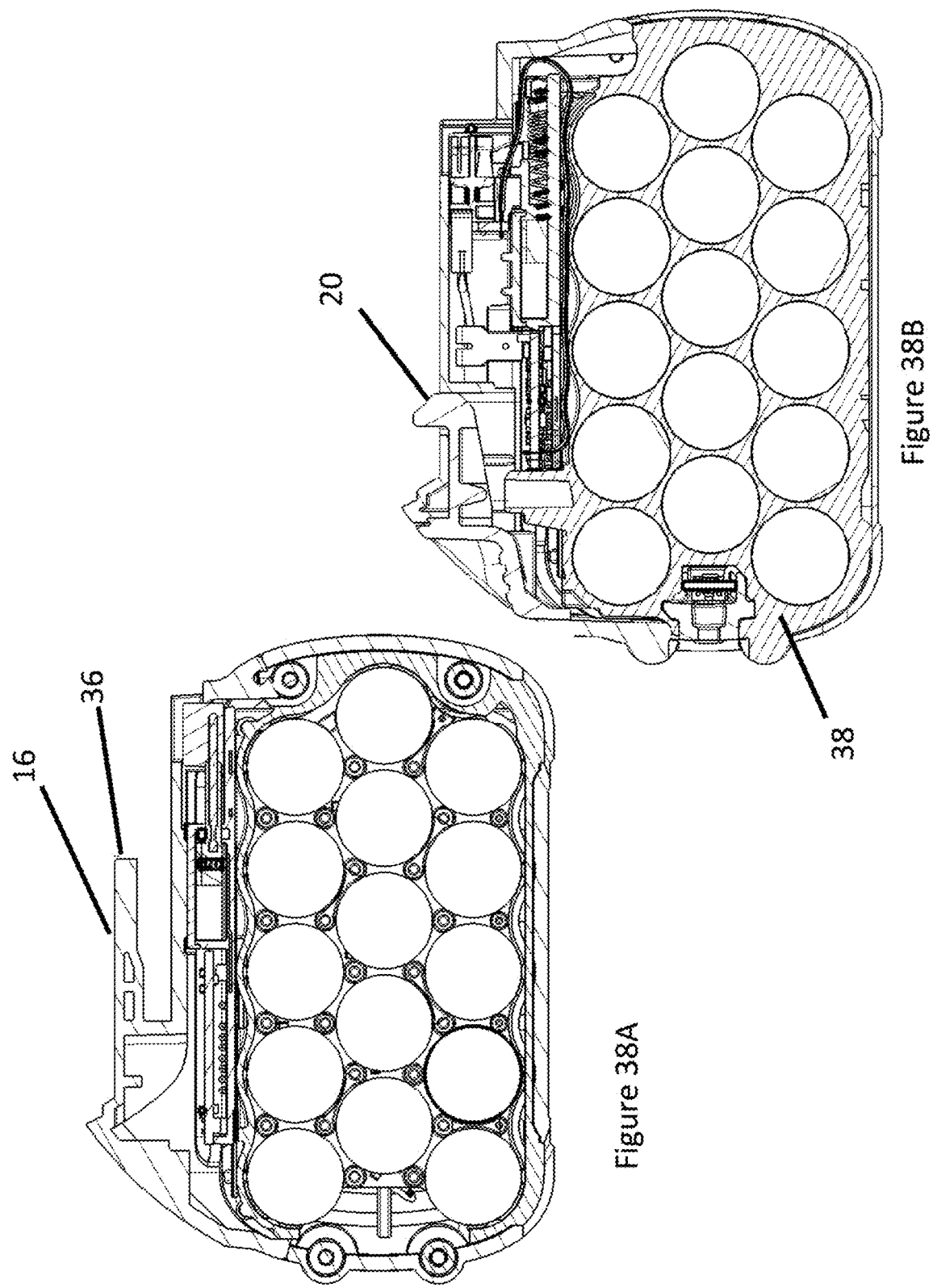

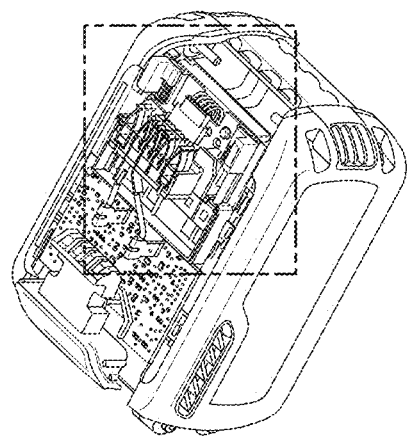
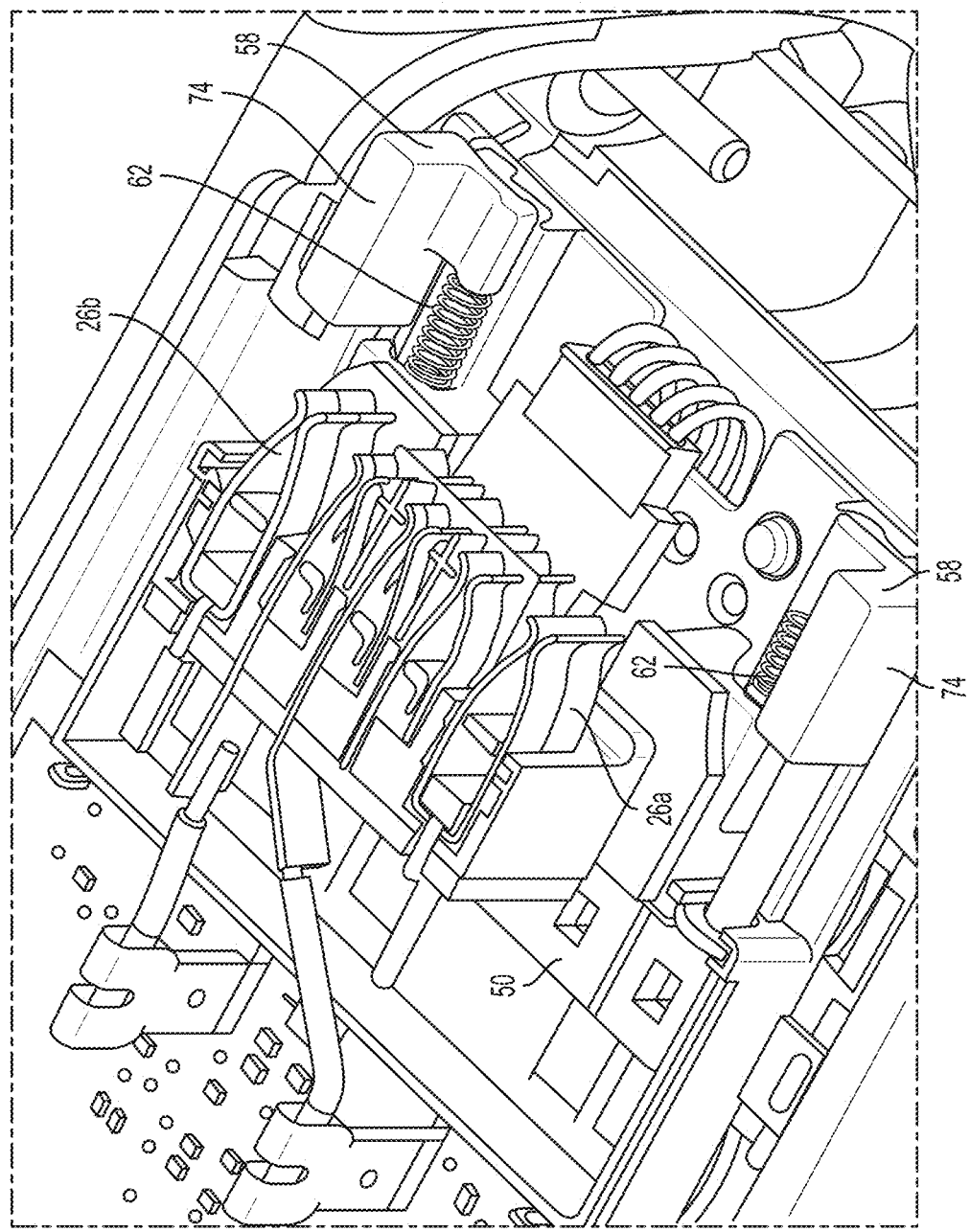
Figure 39

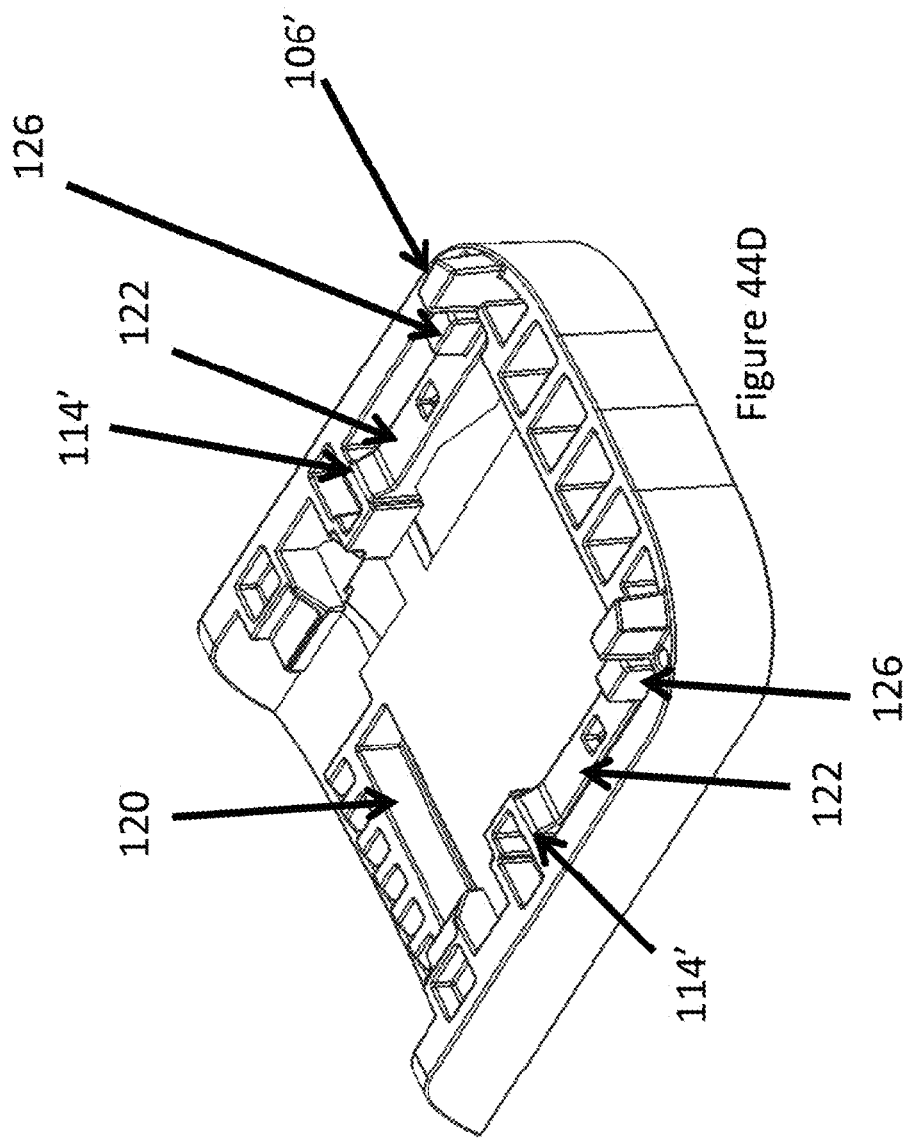

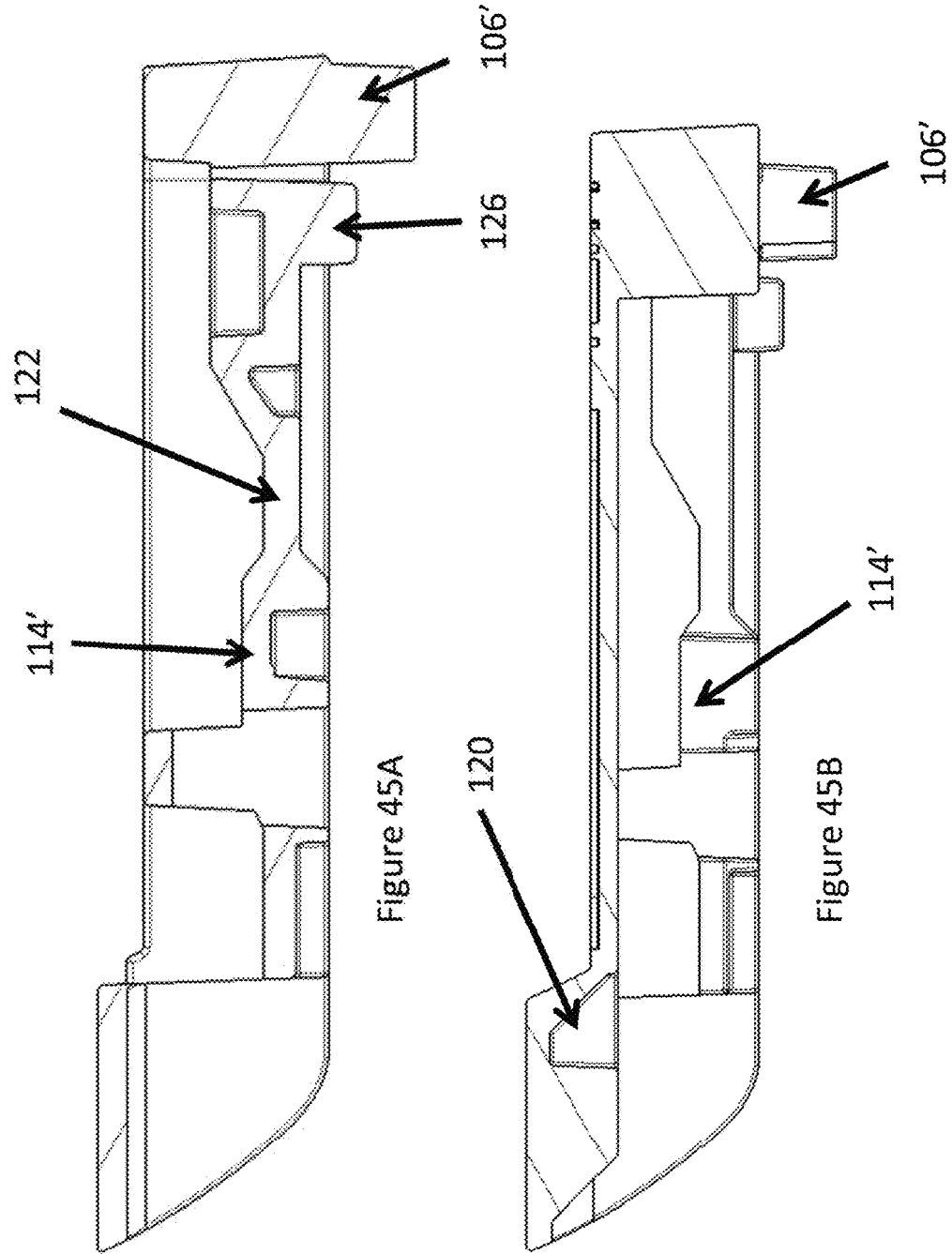

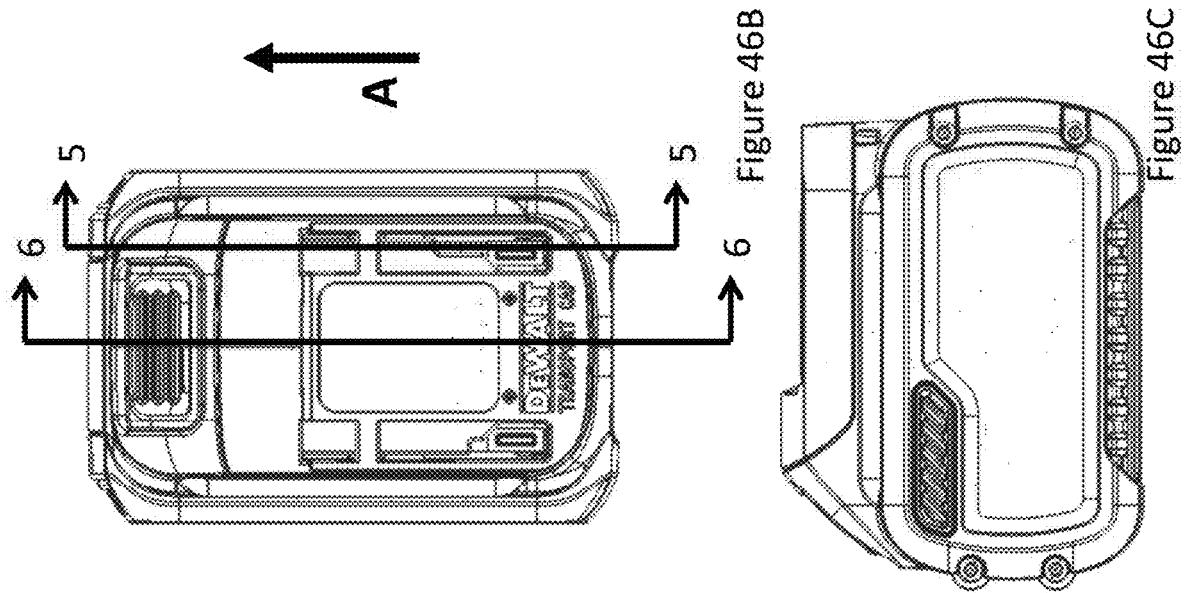
Figure 46B
Figure 46C
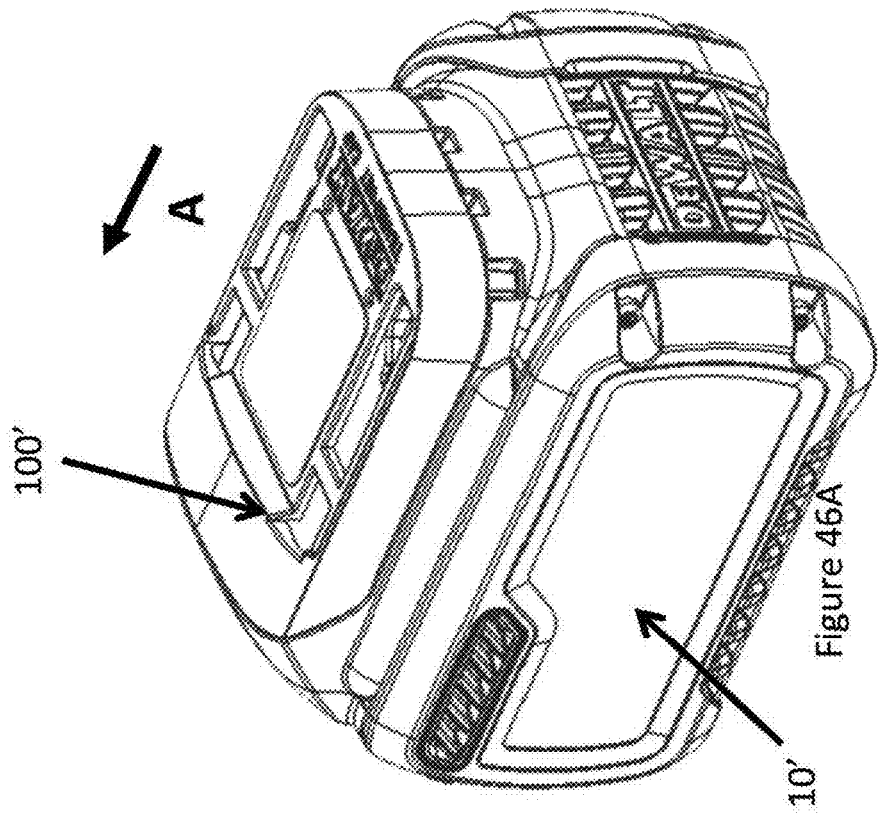
Figure 46A

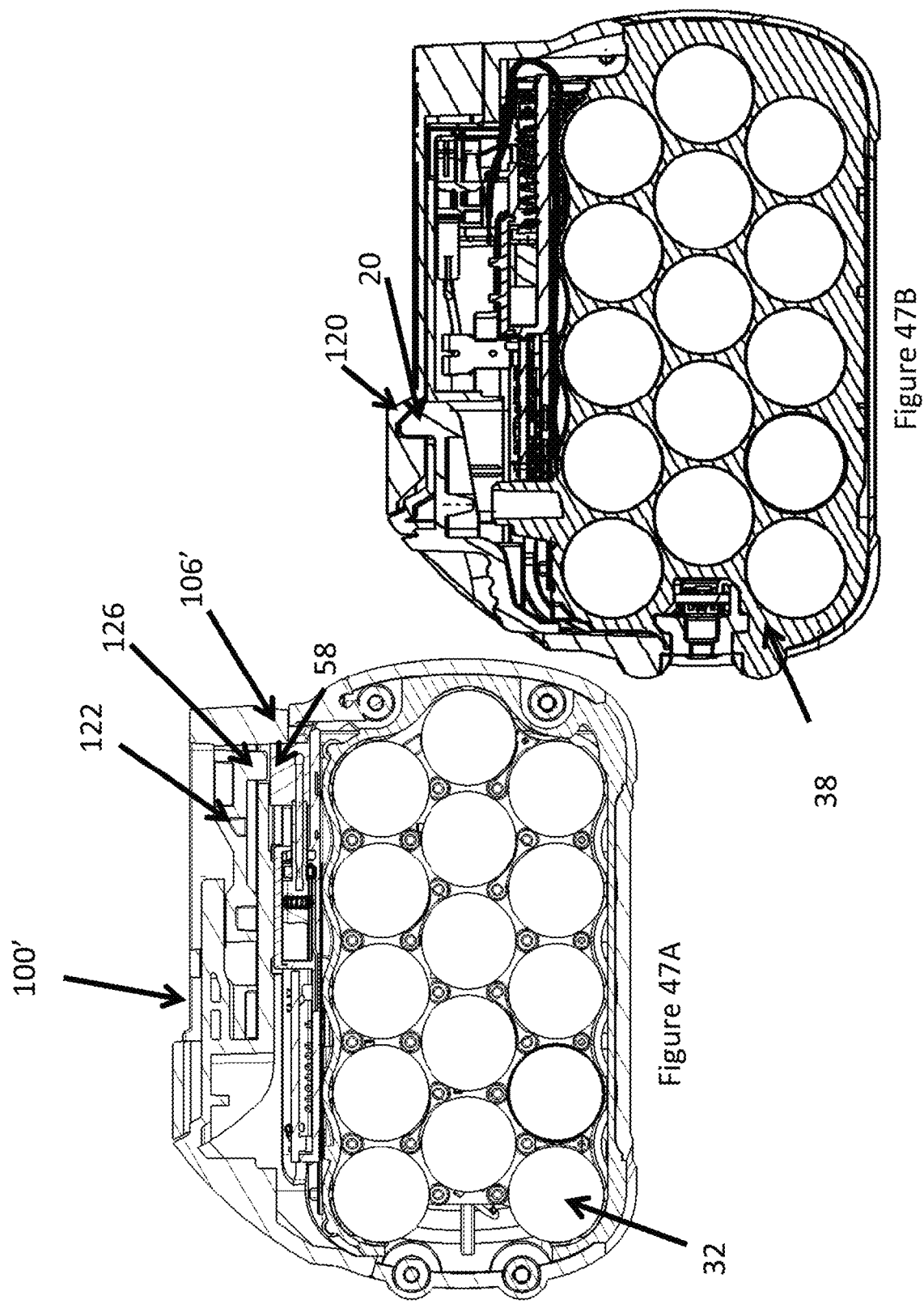

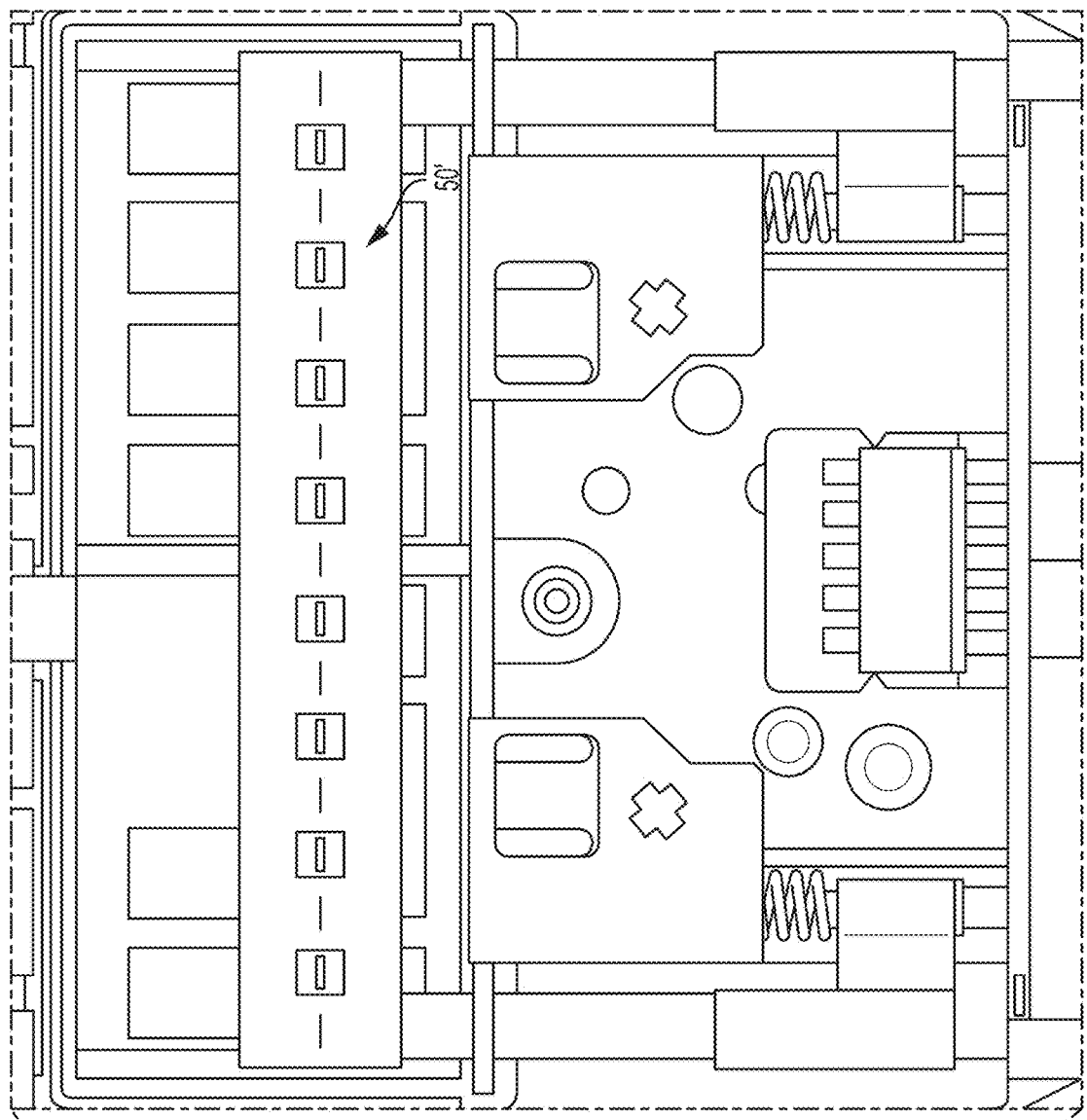
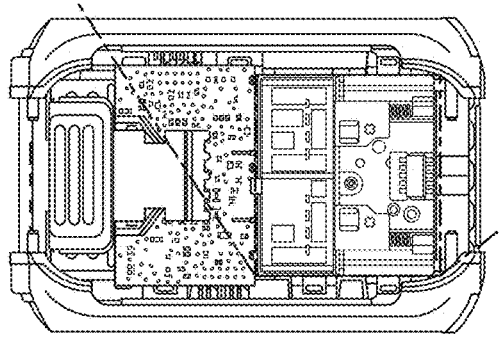
Figure 49

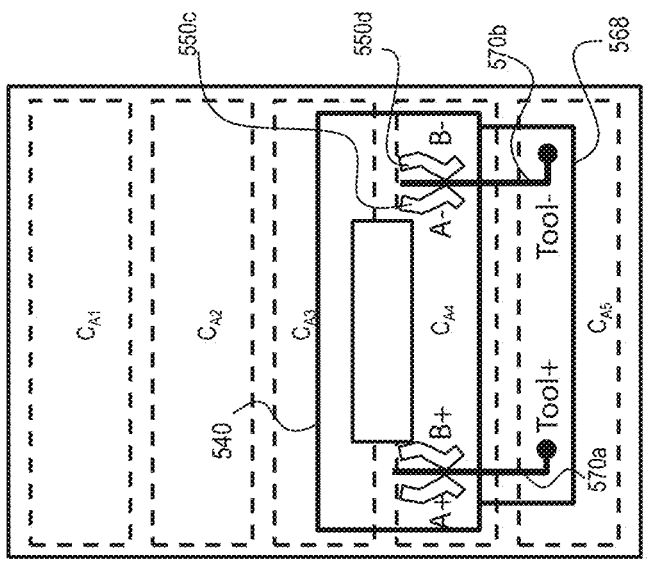
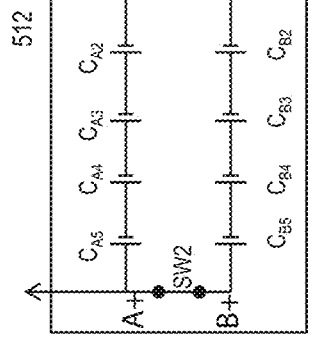
Figure 53C1 Working State
Figure 53C2
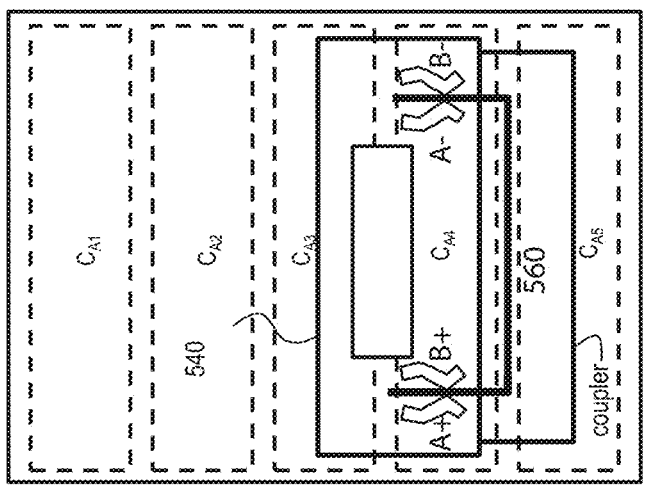
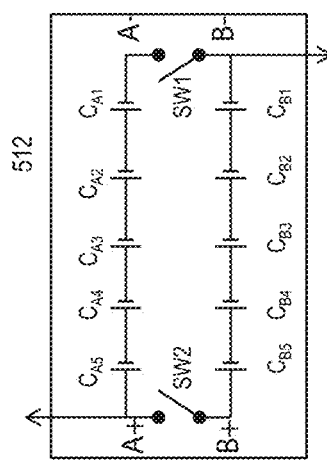
Figure 53B1 Transport State
Figure 53B2
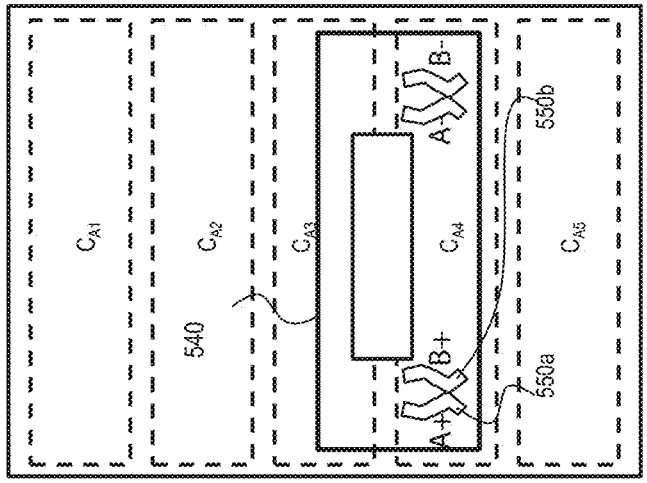
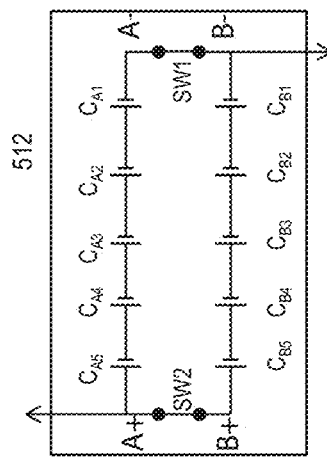
Figure 53A1 Working State
Figure 53A2

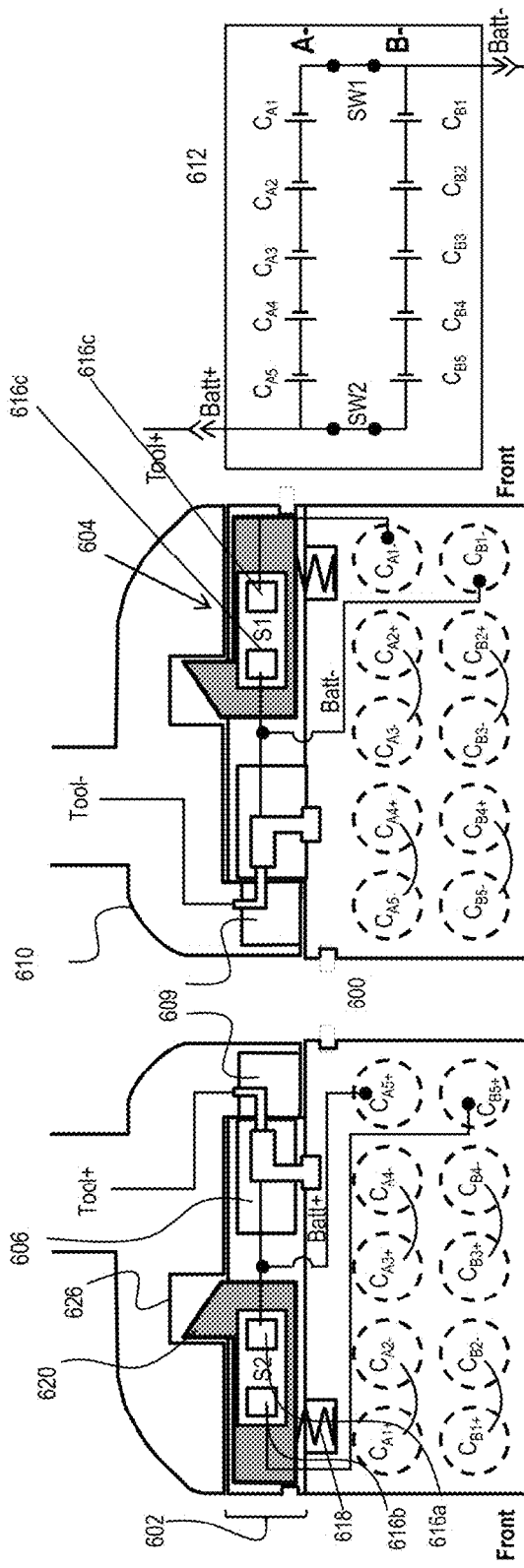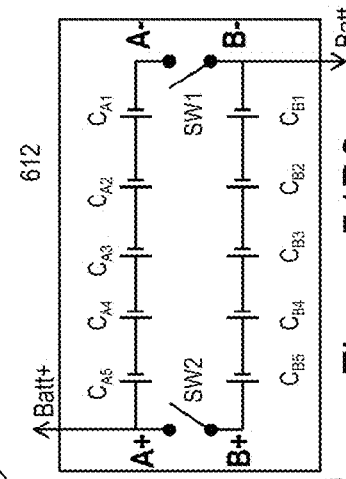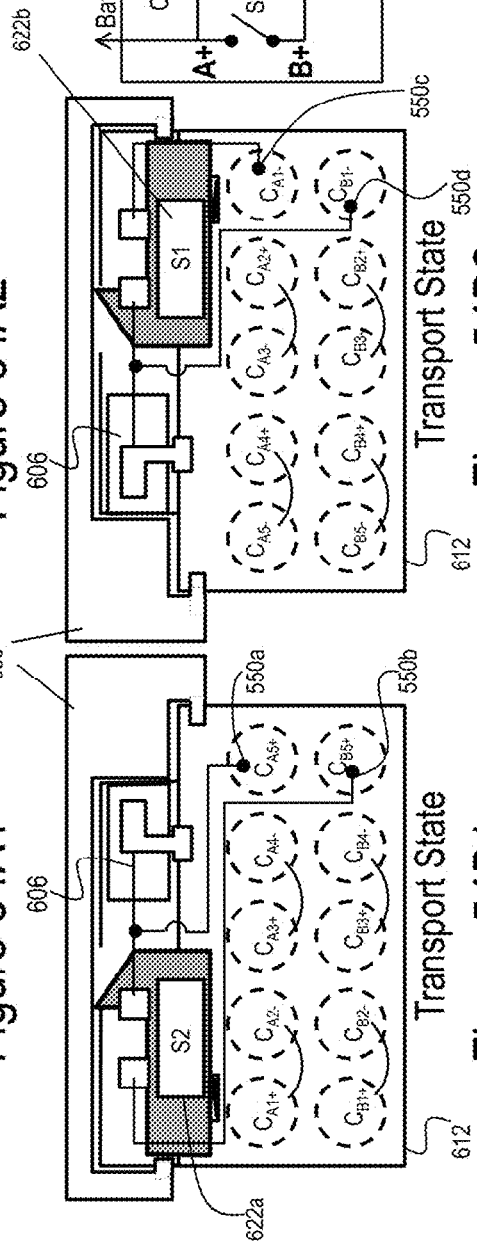

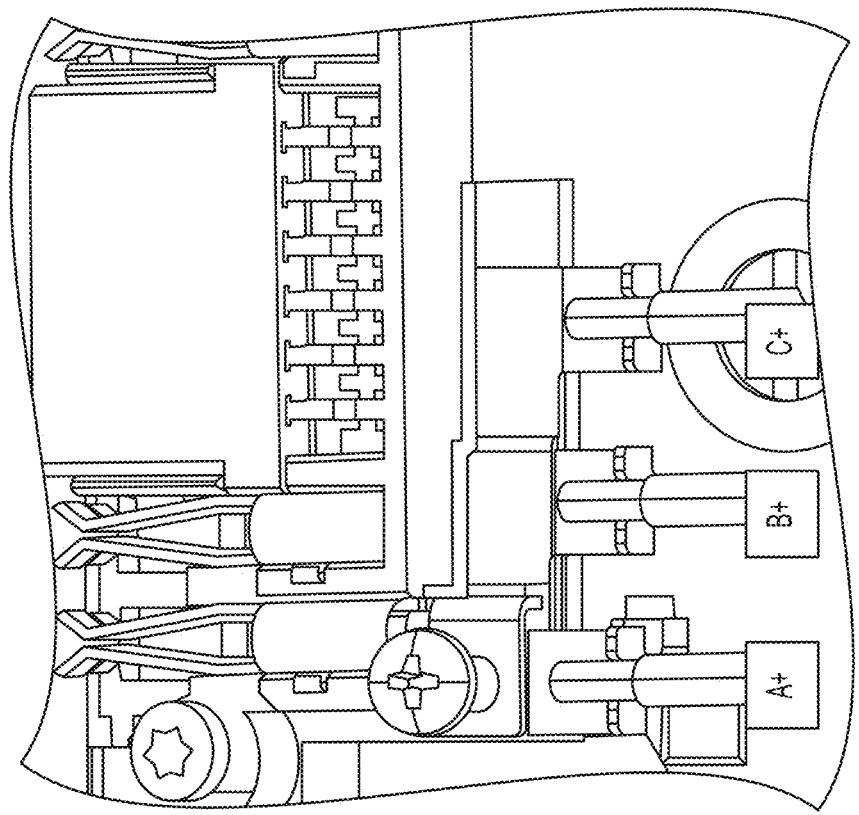
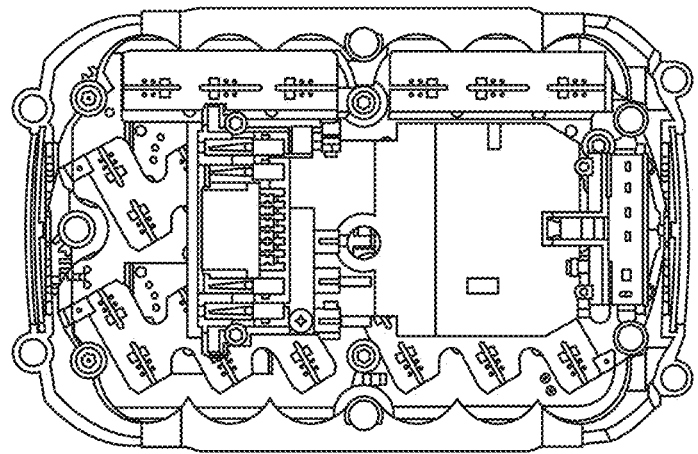
Parallel Connection
All battery strings come to the screw connection
Figure 56

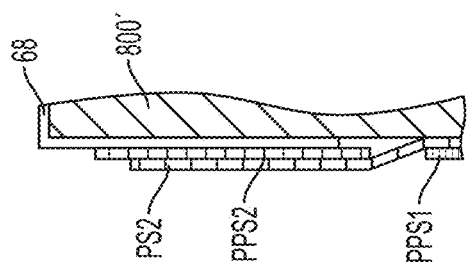
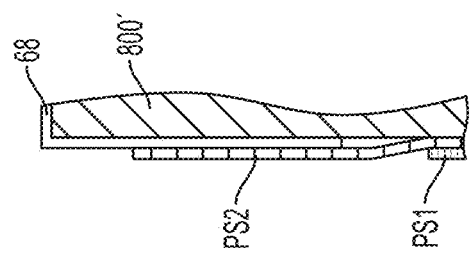
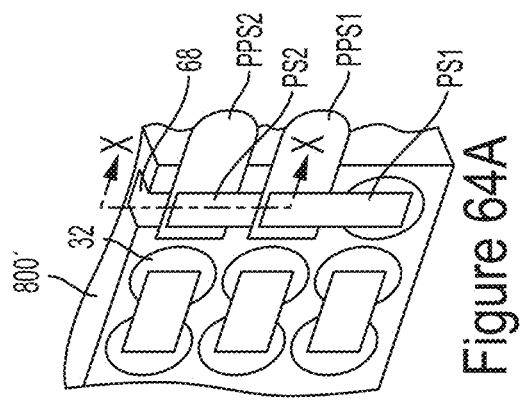
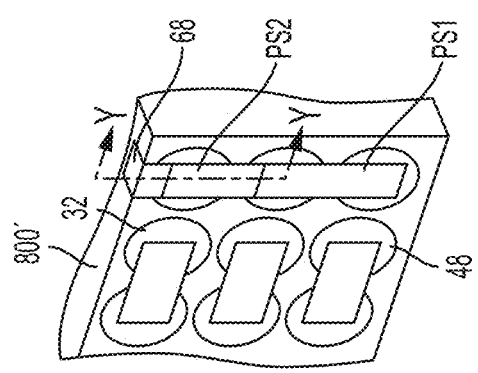

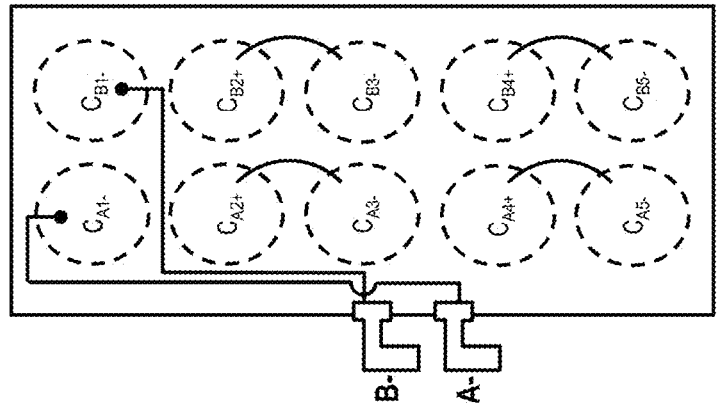
Figure 72A3
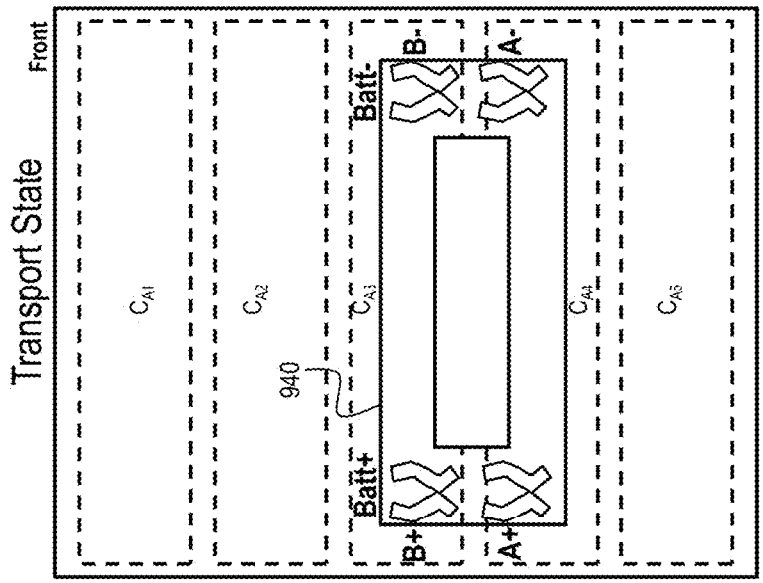
Figure 72A1
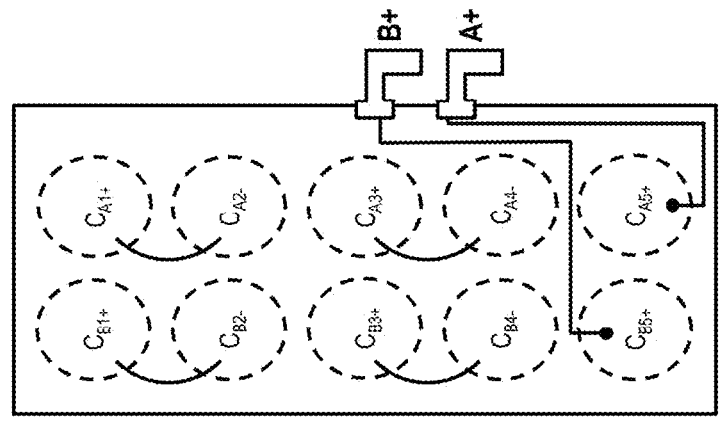
Figure 72A2
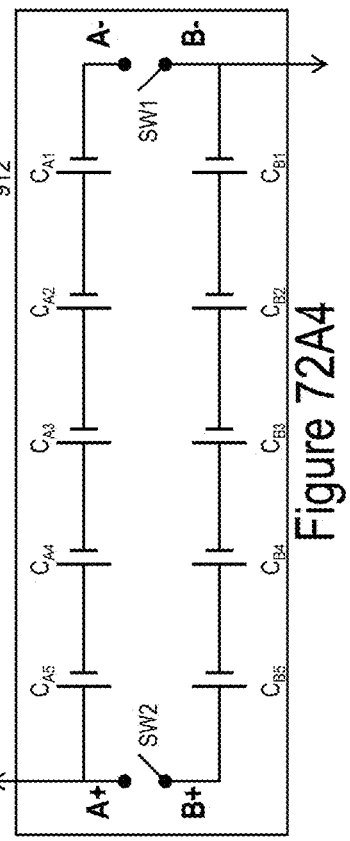
Figure 72A4

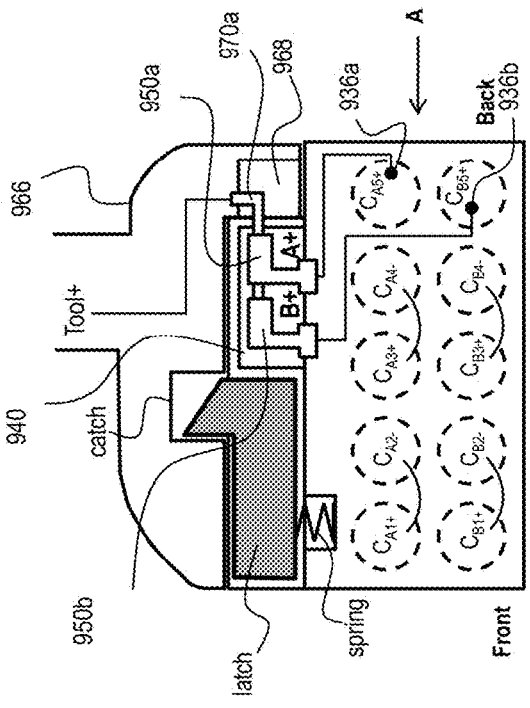
Figure 73A2
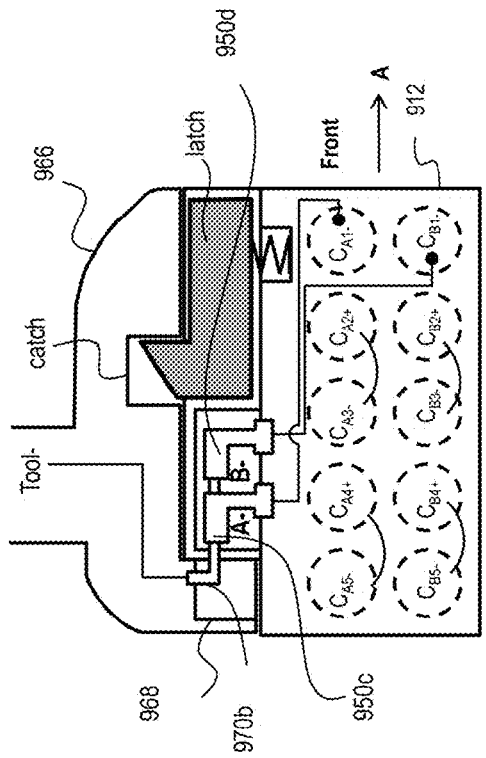
Figure 73A3
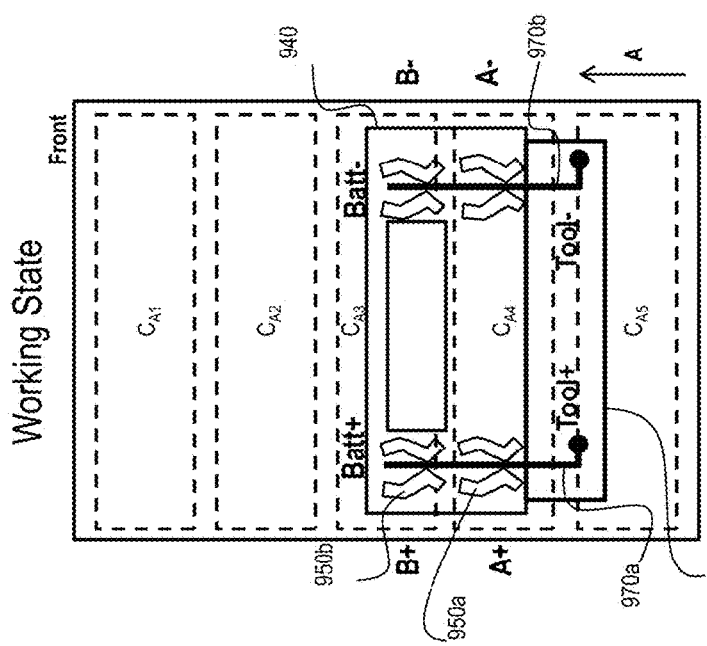
Figure 73A1
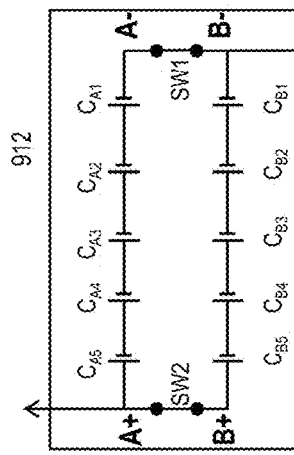
Figure 73A4

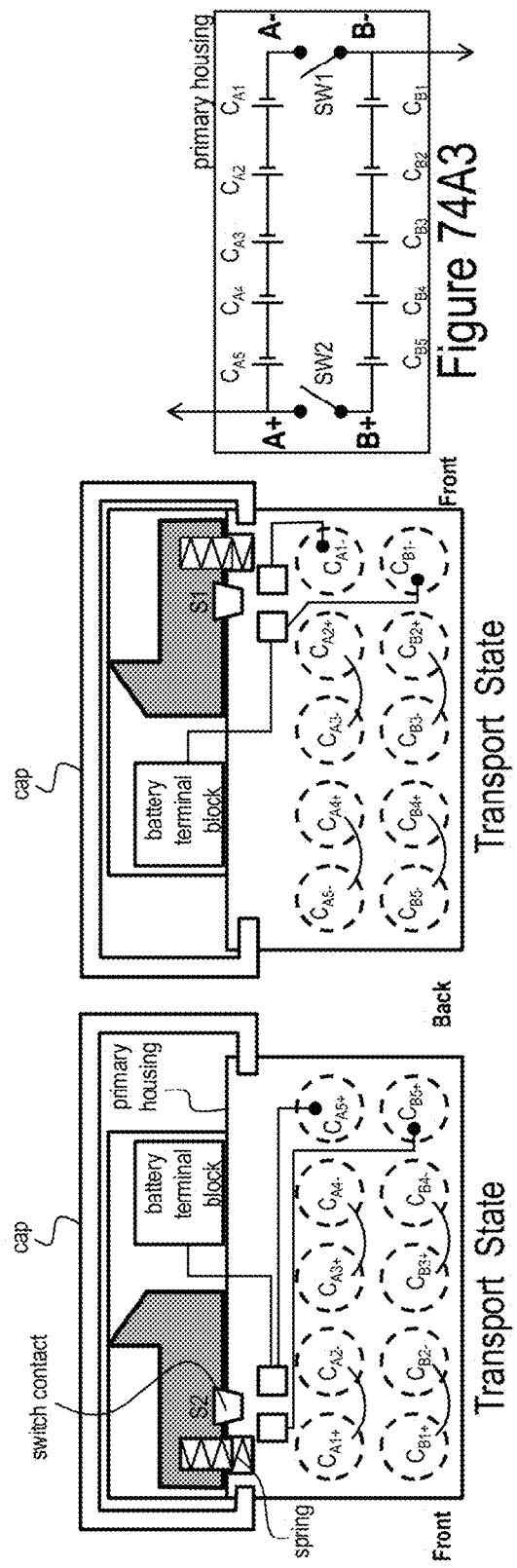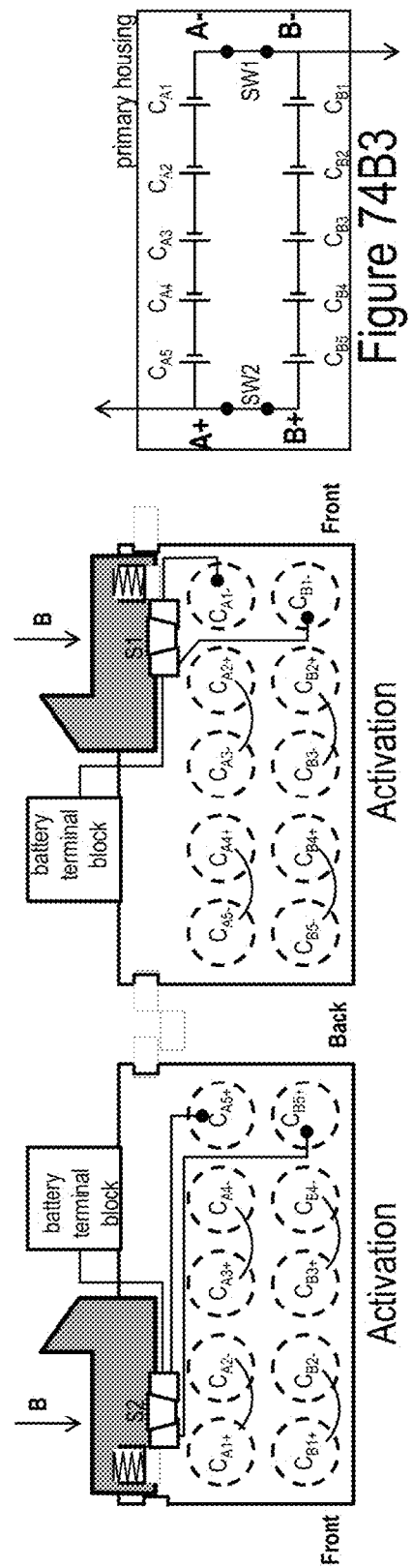

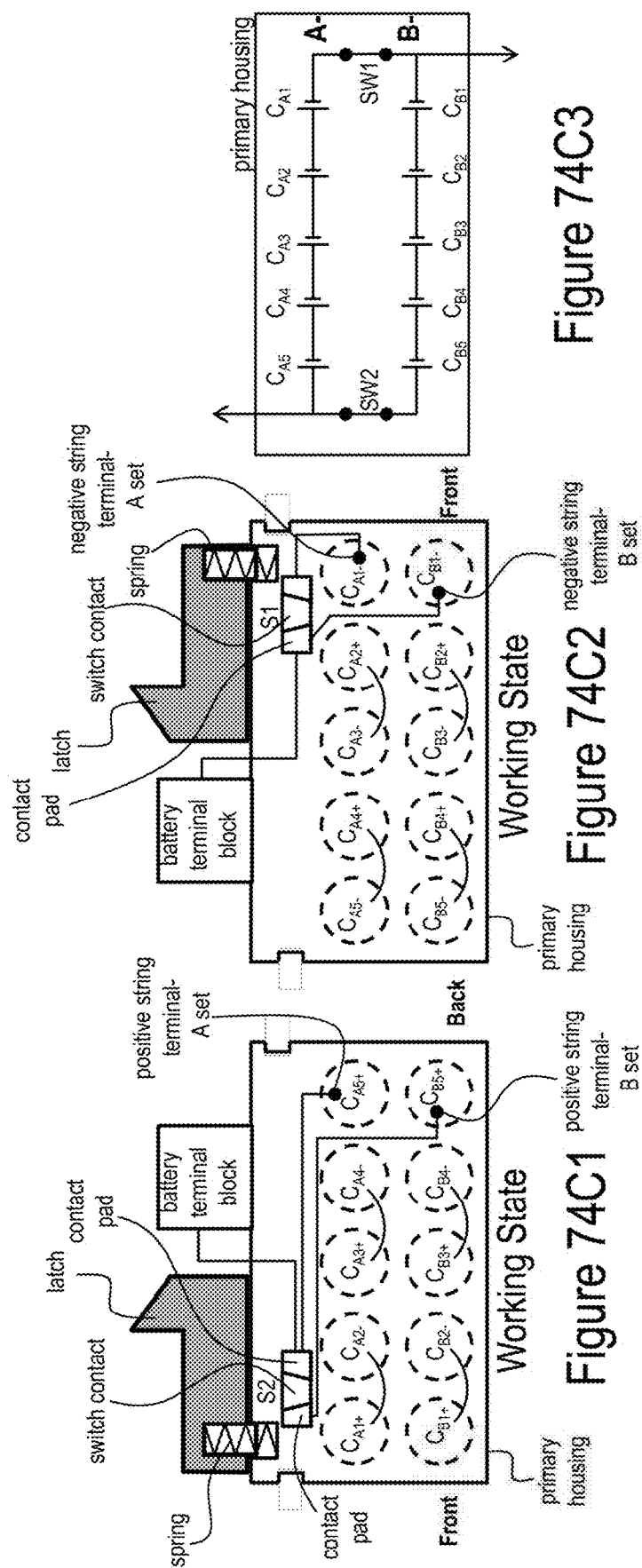

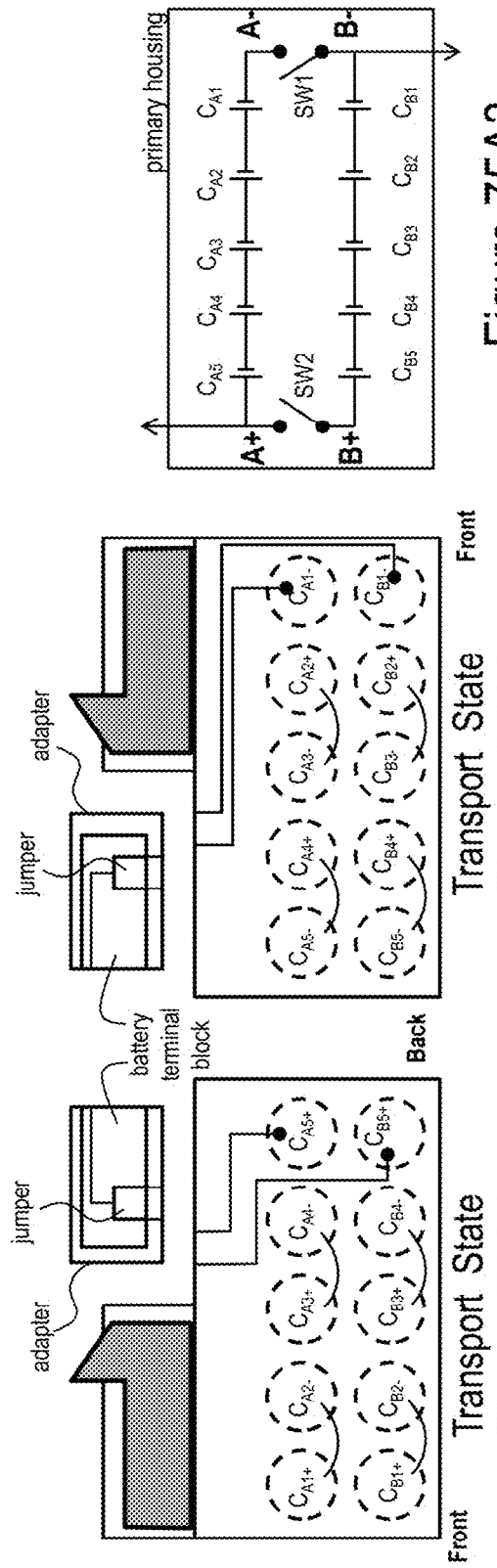

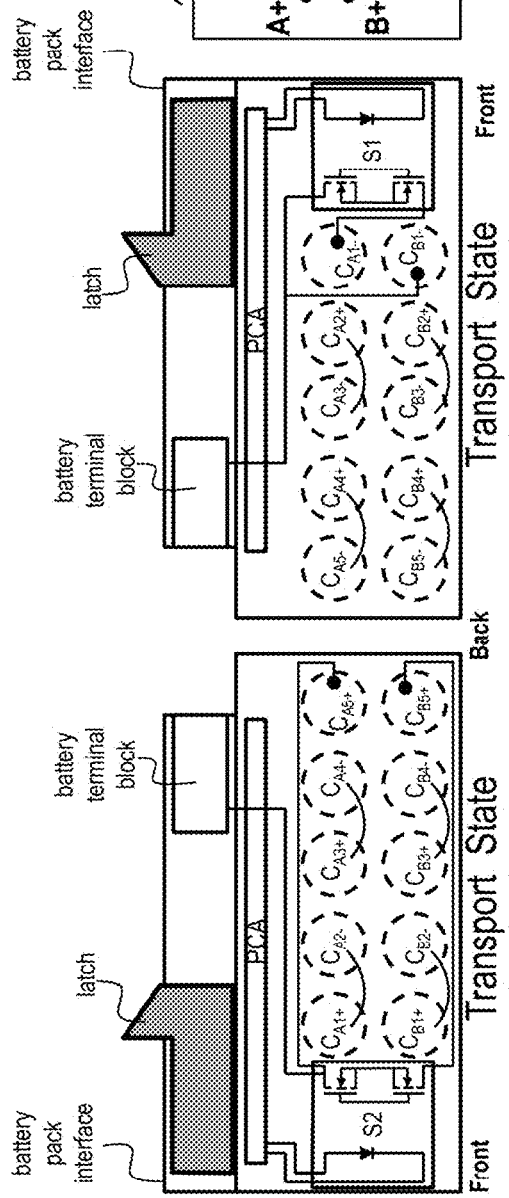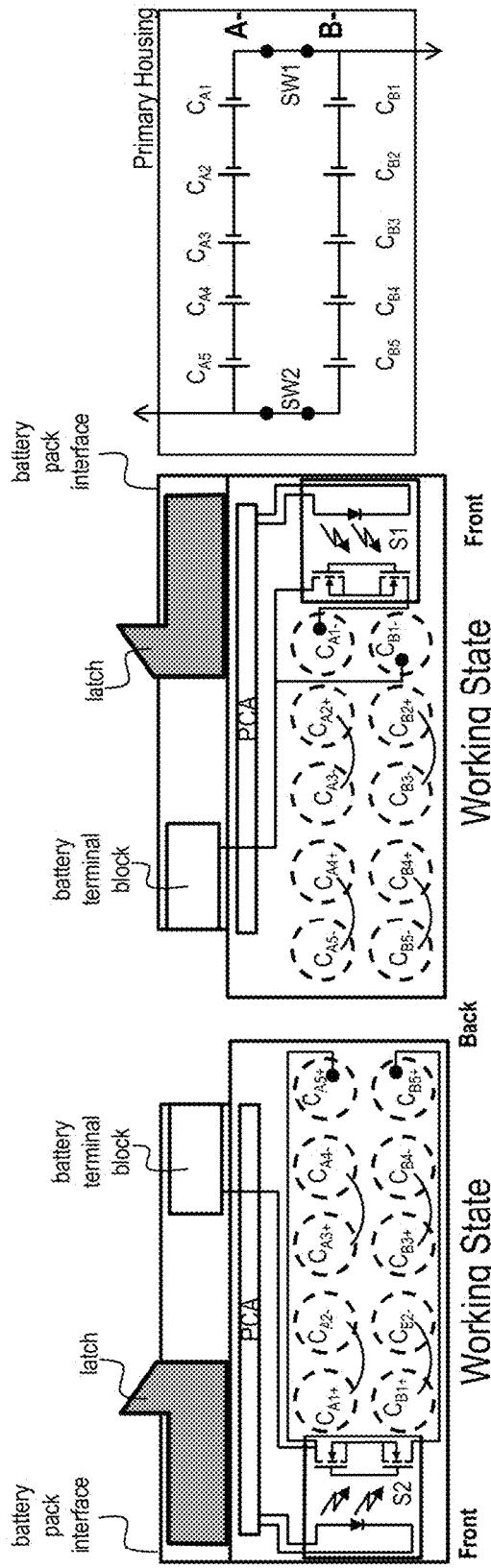

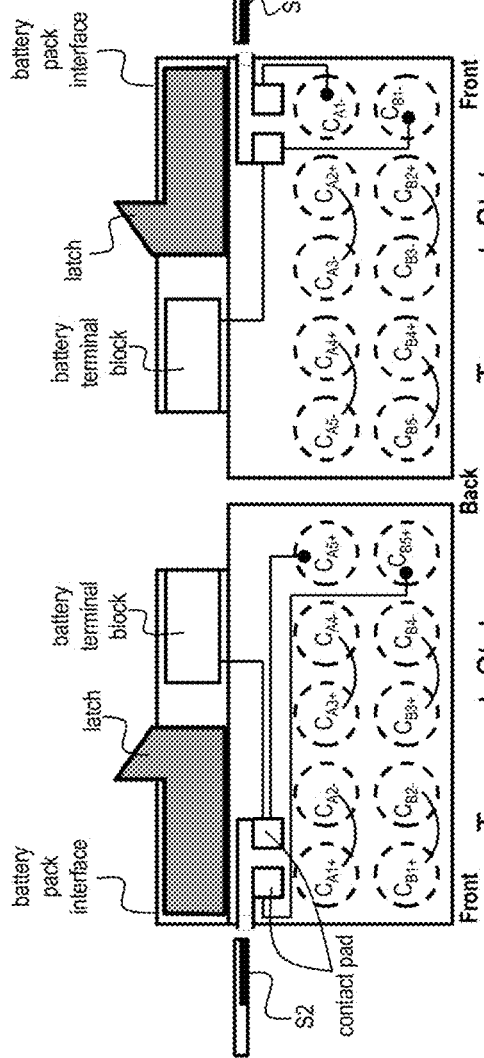
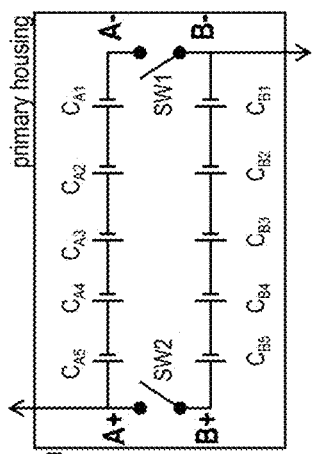
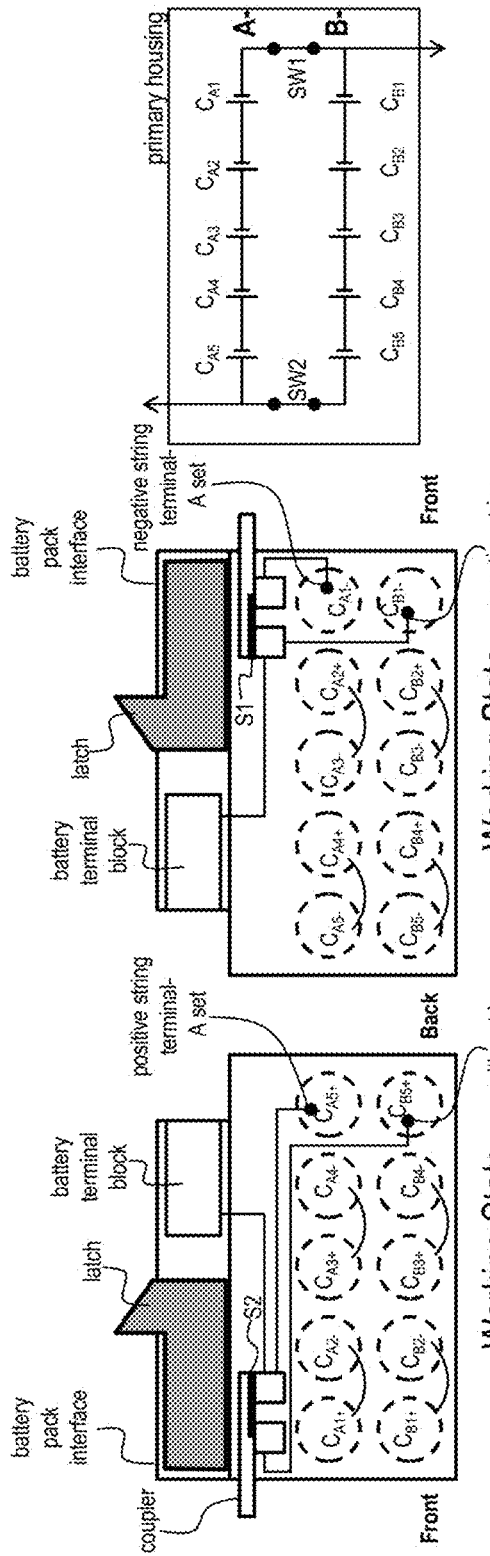
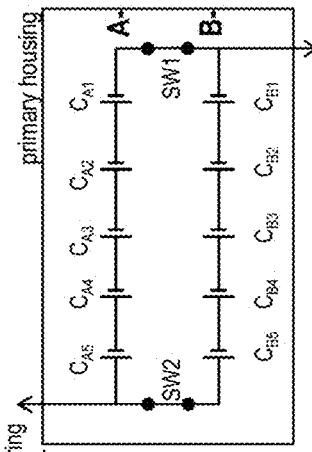
Figure 77A1 Transport State
Figure 77A2 Transport State
Figure 77A3
Figure 77B1 Working State
Figure 77B2 Working State
Figure 77B3

TRANSPORT SYSTEM FOR BATTERY PACK

CROSS REFERENCE TO RELATED APPLICATIONS

This application is a continuation of U.S. patent application Ser. No. 15/299,952 filed Oct. 21, 2016, which is a continuation of U.S. patent application Ser. No. 14/931,240 filed Nov. 3, 2015, now U.S. Pat. No. 9,893,384, which claims the benefit of U.S. Provisional Patent Application Nos. 62/091,134 filed Dec. 12, 2014 and 62/114,645 filed Feb. 11, 2015; 62/240,252 filed Oct. 12, 2015, and claims priority to U.S. patent application Ser. No. 14/715,258 filed May 18, 2015, all of which are incorporated by reference in their entirety.

TECHNICAL FIELD

This application relates to rechargeable battery packs and systems for transporting the battery packs.

BACKGROUND

Conventional rechargeable battery packs include Li-Ion battery cells. Due to the nature of the chemistry of these battery packs, the United States and many other countries and international bodies, including the United Nations, have implemented special rules directed to the shipping of Li-Ion batteries. If a battery or battery pack exceeds these limits there are additional fees and shipping costs for shipping the battery pack. As such, there is an interest in keeping the Watt-hour levels below the 100 Wh limits. Today, it is common for Li-Ion batteries already exceed these limits. As battery power and capacity increases it will become more common for batteries to exceed these limits. As such, there is a great desire to keep the battery packs below these limits.

Typically, shipping regulations pose limitations how much energy is disposed in a battery pack. For example, some regulations require that each cell have an energy equal to or less than 20 Watt-hours, and that each battery pack has an energy limit equal to or less than 100 Watt-hours. It is preferable to provide a solution that can maximize the energy available to the end user while complying with shipping regulations. Preferably, a temporary separator could be used to separate components of the battery pack, thus opening the battery pack circuit, limiting the energy output.

SUMMARY

Implementations of the technologies disclosed herein may include one or more of the following features. Battery packs, for example rechargeable battery packs for power tools typically include two or more strings (also referred to as "sets") of cells that are connected to each other in parallel. Each string may include one or more cells. If a string of cells includes, for example five battery cells and each cell has a rated voltage of four (4) volts and a rated capacity of five (5) Amp-hours the string of cells will have a power rating of one hundred (100) Watt-hours—4V×5 Ah×5 cells. The two strings of cells, whether connected in series or parallel, will have a power rating of 200 Whr. Such a battery pack would exceed the aforementioned limits and require special shipping.

The present invention enables the battery pack to be placed in a configuration that isolates the strings of cells from each other such that the battery pack does not include a battery that exceeds the 100 Whr. limit set by the aforementioned rules.

Advantages may include one or more of the following.
Other advantages and features will be apparent from the description, the drawings, and the claims.

BRIEF DESCRIPTION OF THE DRAWINGS

FIGS. 10A and 10B are views of the transport coupler/lock of FIG. 8 and the battery pack of FIG. 1 in a disengaged state.

FIGS. 33A and 33B are picture views of an alternate exemplary embodiment of a coupler for use with the exemplary set of battery pack terminals of FIG. 32.

FIGS. 38A and 38B are section views taken from FIG. 37B.

FIG. 39 is a pictorial of a terminal block and the converter element of the exemplary battery pack of FIG. 37.

FIGS. 44A, 44B, 44C, and 44D are various views of another example of a transport lock.

FIGS. 45A and 45B are section views taken from FIG. 44B.

FIG. 46A is a perspective view, FIG. 46B is a top view, and FIG. 46C is a side view of the exemplary convertible battery pack of FIG. 37 mated with the exemplary transport lock of FIG. 44.

FIGS. 47A and 47B are section views taken from FIG. 46B.

FIG. 49 is a pictorial of the converter element of the exemplary battery pack of FIG. 37 in a second position.

FIGS. 53A1, 53A2 53B1, 53B2, 53C1, and 53C2 are an exemplary battery pack and an exemplary transport system.

FIGS. 54A1, 54A2, 54A3, 54B1, 54B2, and 54B3 are another exemplary battery pack and another exemplary transport system.

FIG. 56 is picture views of a battery of the exemplary battery pack and transport system of FIG. 55.

FIG. 64A is a partial perspective view of an alternate exemplary battery of the battery pack of FIG. 61A incorporating an alternate exemplary transport coupler; FIG. 64B is a section view along line X-X of FIG. 64A.

FIG. 65A is a partial perspective view of the exemplary battery and transport coupler of FIG. 64A with a part of the transport coupler removed; FIG. 65B is a section view along line Y-Y of FIG. 65A.

FIG. 72A1 is a top view of an alternate exemplary embodiment of a battery pack incorporating an alternate exemplary embodiment of a transport coupler in a first operational (decoupled) configuration; FIG. 72A2 is a first side view of the battery pack of FIG. 72A1; FIG. 72A3 is a second side view of the battery pack of FIG. 72A1; FIG. 72A4 is a simplified circuit diagram of the battery pack of FIG. 72A1.

FIG. 73A1 is a top view of the battery pack of FIG. 72 mated with an electrical device and in a second operational (coupled) configuration; FIG. 73A2 is a first side view of the battery pack of FIG. 73A1; FIG. 73A3 is a second side view of the battery pack of FIG. 73A1; 73A4 is a simplified circuit diagram of the battery pack of FIG. 73A1.

FIG. 74A1 is a first side view of an alternate exemplary embodiment of a battery pack incorporating an alternate exemplary embodiment of a transport coupler in a first operational (decoupled) configuration; FIG. 74A2 is a second side view of the battery pack and transport coupler of FIG. 74A1; FIG. 74A3 is a simplified circuit diagram of the battery pack of FIG. 74A1; FIG. 74B1 is a first side view of the battery pack of FIG. 74A1 in a second operational (activation) configuration; FIG. 74B2 is a second side view of the battery pack of FIG. 74A2; FIG. 74B3 is a simplified circuit diagram of the battery pack of FIG. 74B1; FIG. 74C1 is a first side view of the battery pack of FIG. 74A1 in a third operational (coupled) configuration; FIG. 74C2 is a second side view of the battery pack of FIG. 74A2; and FIG. 74C3 is a simplified circuit diagram of the battery pack of FIG. 74C1.

FIG. 75A1 is a first side view of an alternate exemplary embodiment of a battery pack incorporating an alternate exemplary embodiment of a transport coupler in a first operational (decoupled) configuration; FIG. 75A2 is a second side view of the battery pack and transport coupler of FIG. 75A1; FIG. 75A3 is a simplified circuit diagram of the battery pack of FIG. 75A1; FIG. 75B1 is a first side view of the battery pack of FIG. 75A1 in a second operational (coupled) configuration; FIG. 75B2 is a second side view of the battery pack of FIG. 75A2; FIG. 75B3 is a simplified circuit diagram of the battery pack of FIG. 75B1

FIG. 76A1 is a first side view of an alternate exemplary embodiment of a battery pack incorporating an alternate exemplary embodiment of a transport coupler in a first operational (decoupled) configuration; FIG. 76A2 is a second side view of the battery pack and transport coupler of FIG. 76A1; FIG. 76A3 is a simplified circuit diagram of the battery pack of FIG. 76A1; FIG. 76B1 is a first side view of the battery pack of FIG. 76A1 in a second operational (coupled) configuration; FIG. 76B2 is a second side view of the battery pack of FIG. 76A2; FIG. 76B3 is a simplified circuit diagram of the battery pack of FIG. 76B1.

FIG. 77A1 is a first side view of an alternate exemplary embodiment of a battery pack incorporating an alternate exemplary embodiment of a transport coupler in a first operational (decoupled) configuration; FIG. 77A2 is a second side view of the battery pack and transport coupler of FIG. 77A1; FIG. 77A3 is a simplified circuit diagram of the battery pack of FIG. 77A1; FIG. 77B1 is a first side view of the battery pack of FIG. 77A1 in a second operational (coupled) configuration; FIG. 77B2 is a second side view of the battery pack of FIG. 77A2; FIG. 77B3 is a simplified circuit diagram of the battery pack of FIG. 77B1.

DETAILED DESCRIPTION

Figure 1C:
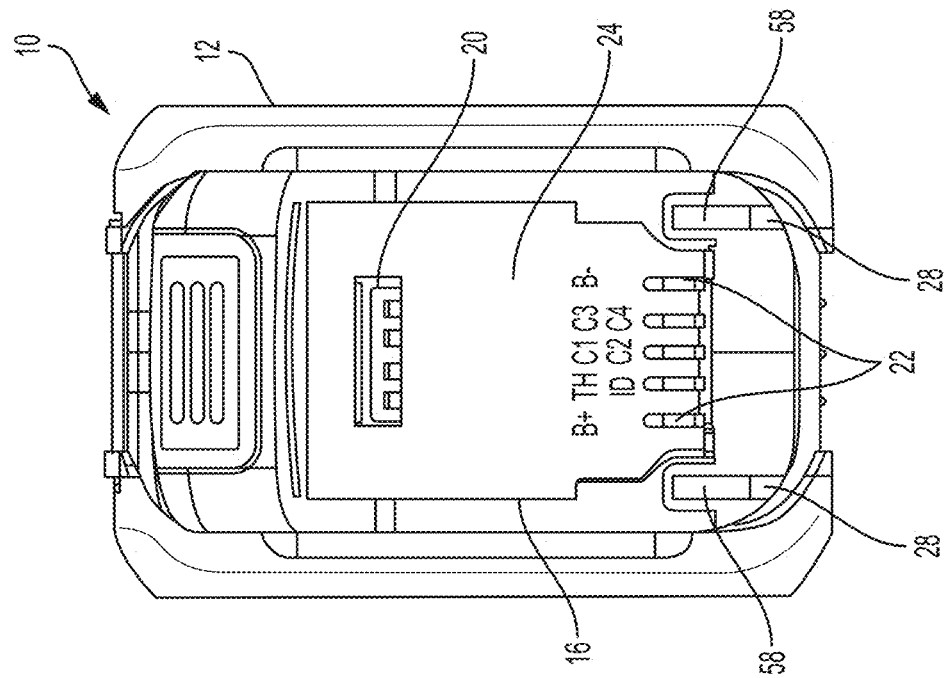
FIGS. 1A, 1B and 1C are various views of an exemplary embodiment of a battery pack.
Figure 1A:
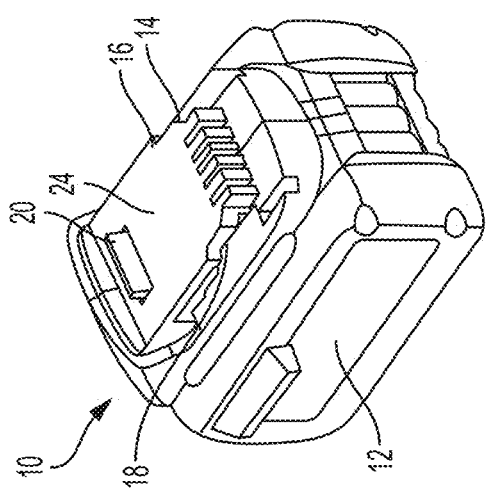
Figure 1B:
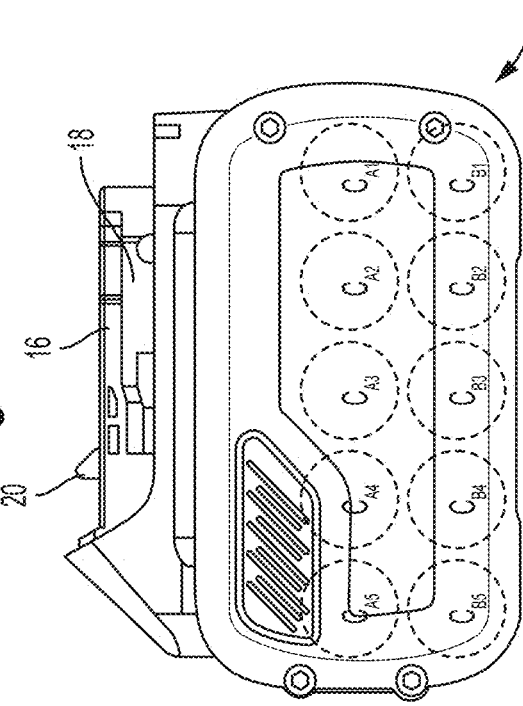

FIG. 1 illustrates three views of an exemplary embodiment of a battery pack 10, this exemplary battery pack is a convertible battery pack, for example one of the convertible battery packs disclosed in U.S. patent application Ser. No. 14/715,258. The battery pack 10 includes a housing 12. Regardless of the structure, the housing12 will form an interior cavity. The housing 12 includes a battery interface 14 for mechanically coupling with a corresponding interface of an electrical device, for example, a power tool or a battery charger. In the illustrated exemplary embodiment, the battery interface 14 includes a rail and groove system including a pair of rails 16 and a pair of grooves 18. Other types of interfaces are contemplated and encompassed by the present invention. The battery interface 14 may also include a latching system including a latch 20 for affixing the battery pack 10 to the electrical device.

The housing 12 also includes a plurality of slots 22 in a top portion 24 of the housing 12. The slots 22 may be positioned in other portions of the housing. The plurality of slots 22 forms a set of slots. The plurality of slots 22 corresponds to a plurality of battery pack terminals 26. The plurality of battery pack terminals forms a set of battery pack terminals. The plurality of slots also corresponds to a plurality of terminals of the electrical device. The plurality of electrical device terminals forms a set of electrical device terminals. The electrical device terminals are received by the battery terminal slots 22 and engage and mate with the battery pack terminals 26, as will be discussed in more detail below.

The battery pack housing 12 also includes a pair of conversion slots or raceways 28 extending along the top portion 24 of the housing 12 on opposing sides of the battery terminal slots 22. In the illustrated exemplary embodiment, the raceways 28 extend from a forward (in the orientation illustrated in FIG. 1) edge or surface of the housing 12 to a central portion of the top portion of the housing. Each raceway 28 ends at a through hole 30 in the top portion 24 of the housing 12. The through holes 30 extend from an exterior surface of the housing to the interior cavity. In the illustrated embodiment, the through holes 30 are positioned in front of the rails 16 of the battery interface 14 and adjacent to the housing slots 22. The conversion slots 28 and through holes 30 may be positioned in other portions of the housing 12. Alternate embodiments may include more or less conversion slots.

As illustrated in FIG. 1, the exemplary embodiment of the battery pack 10 includes a plurality of battery cells 32. The battery pack 10 also includes a terminal block 34 and the battery pack terminals 26. At one end, the battery pack terminals 26 are configured to electrically couple to the electrical device terminals and at another end the battery pack terminals 26 are electrically coupled to the battery cells 32, as described in more detail below.

The manner in which the battery pack converts from the low rated voltage configuration to the medium rated voltage configuration will be described in more detail below. It should be understood that the terms "low" and "medium" are simply intended to be relative terms in that the low rated voltage configuration has a voltage less than the medium rated voltage configuration and the medium rated voltage configuration has a voltage greater than the low rated voltage configuration. Reference should be made to U.S.

Pat. No. 10,056,582, for a detailed description of the operation of a convertible battery pack.

The exemplary battery pack 10 includes two sets (also referred to as strings) of battery cells 32—an A set and a B set. In this particular example, each set of cells includes five battery cells 32. The five battery cells are electrically connected in series. Each set of cells has a positive terminal and a negative terminal. As illustrated in FIGS. 2-7, a converting subsystem makes and breaks connections between the terminals of the sets of cells to effectively open and close the switches SW1-SW3 illustrated in FIGS. 7 and 15 and described above. The converting subsystem includes a converter element 50. FIG. 4 illustrates an exemplary embodiment of the converter element 50—also referred to as a coupler, a conversion card, a slider or a slider card—of the exemplary embodiment of the convertible battery pack 10 of FIG. 1.

Figure 3:
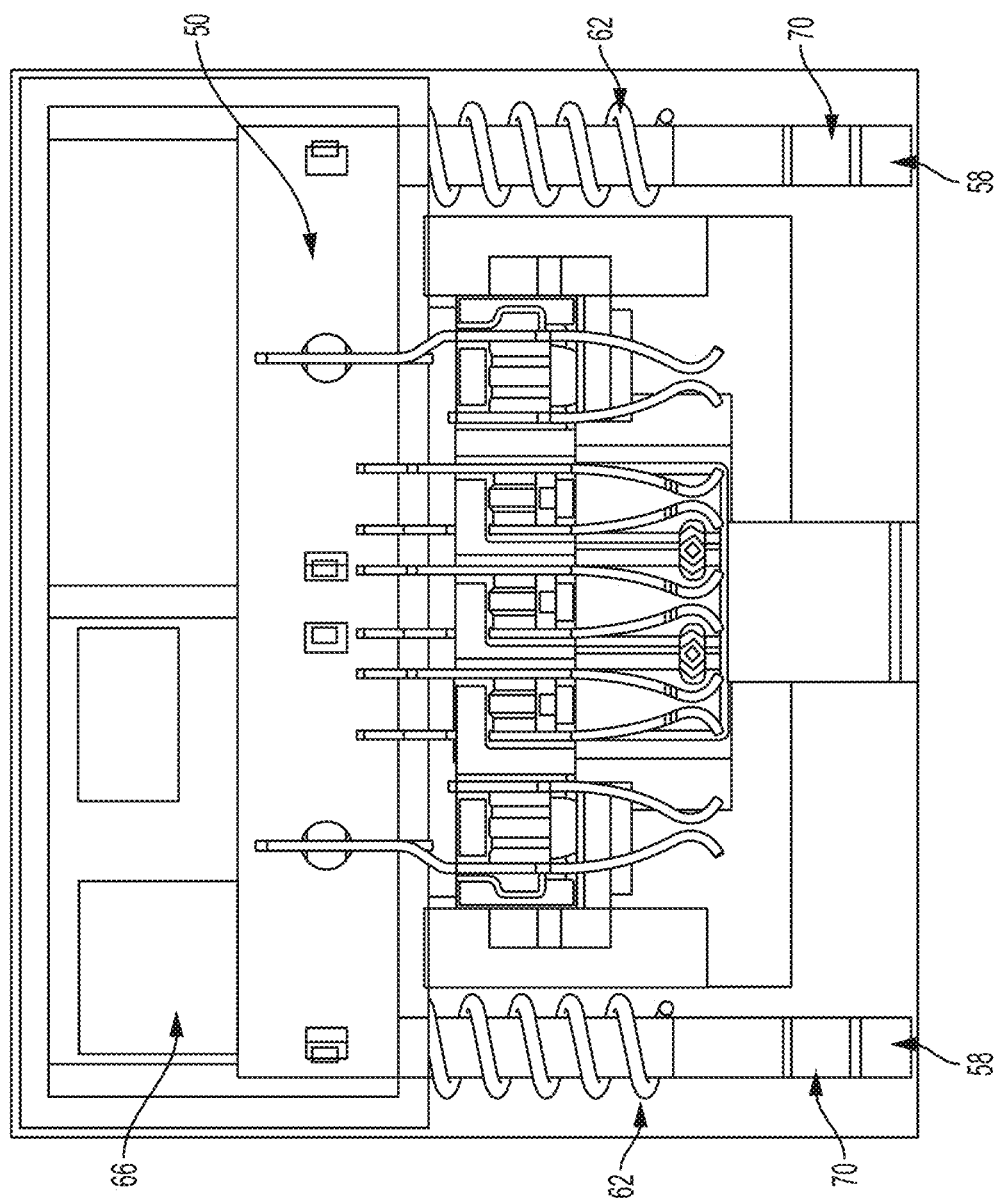
FIG. 3 is a plan view of the exemplary converting subsystem of the battery pack of FIG. 1.
Figure 4:
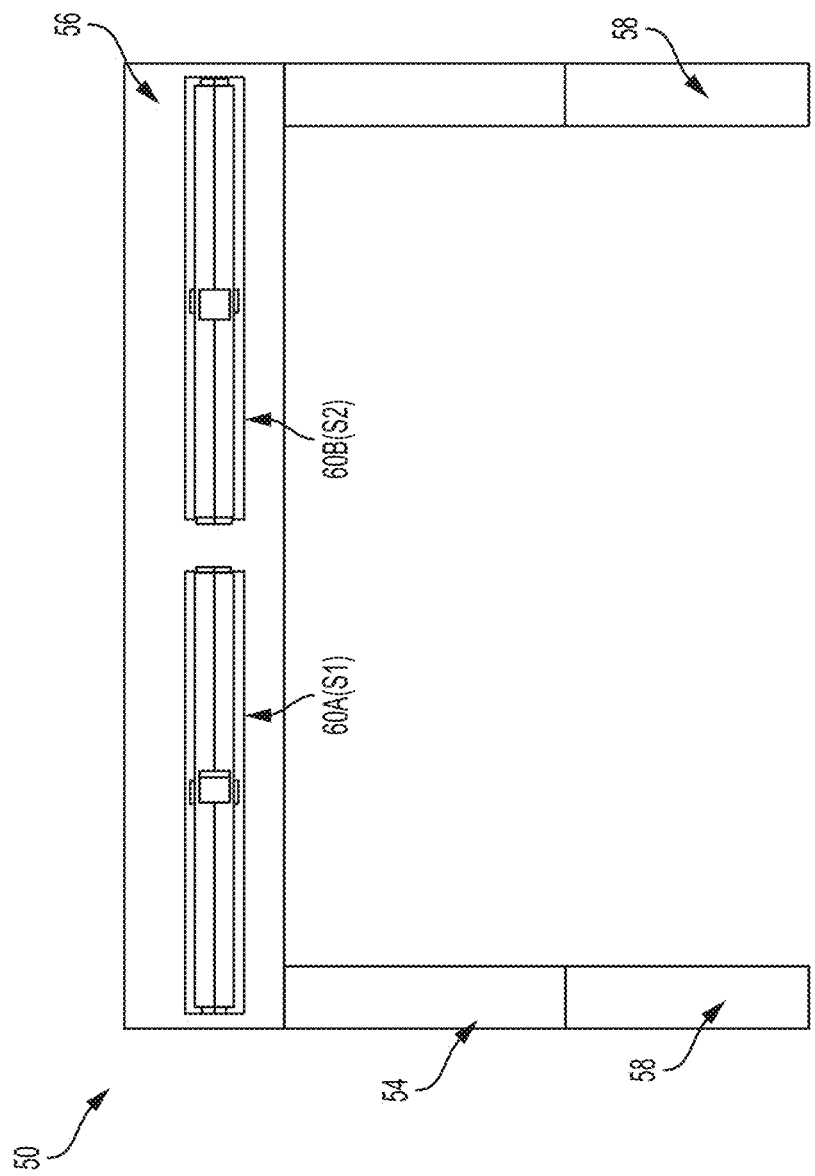
FIG. 4 is a plan view of an exemplary embodiment of a converting element of the converting subsystem of FIG. 2.

The battery pack illustrated in FIG. 3 may be placed in three configurations and is capable of presenting two different rated voltages. In other words, the battery pack may be configured to present a first rated voltage wherein the two sets of battery cells are coupled in a first manner (in parallel), may be configured to present a second rated voltage wherein the two sets of battery cells are coupled in a second manner (in series), and may be configured to present a zero voltage wherein the two sets of battery cells are decoupled.

Figure 5:
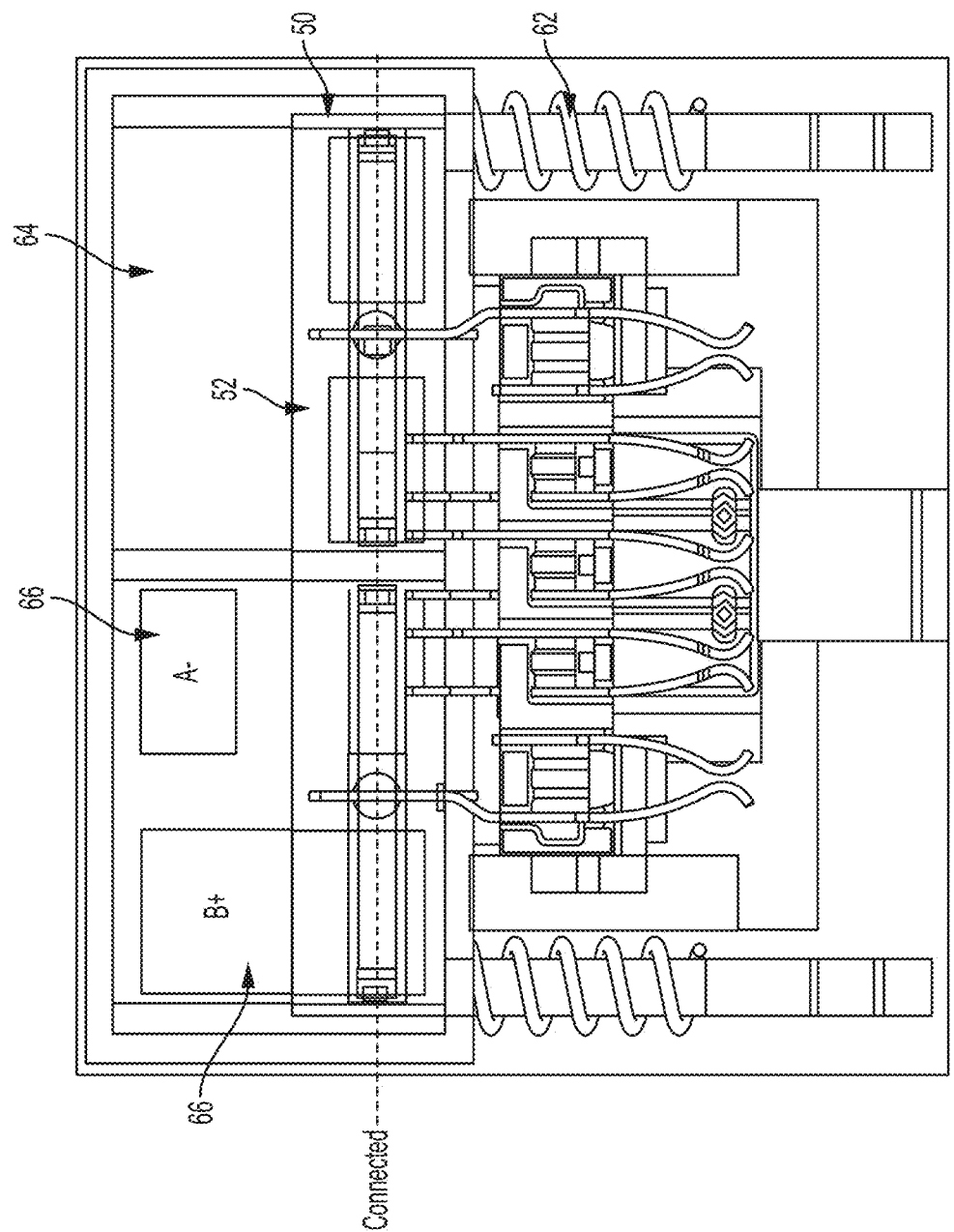
FIG. 5 is a plan view of the converting subsystem of FIG. 3 in a first operational (low rated voltage) configuration.
Figure 16:
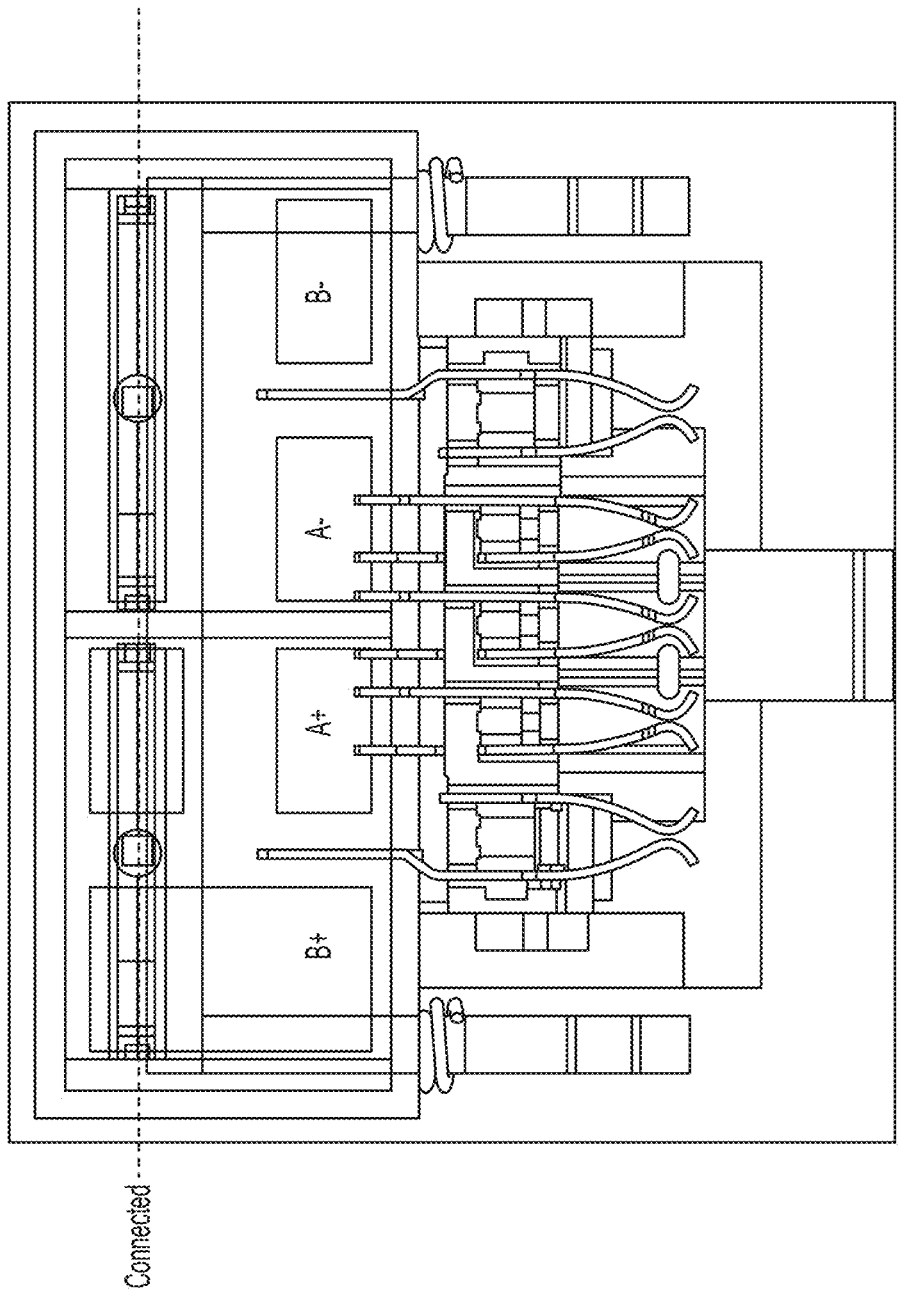
FIG. 16 is a picture view of the converting subsystem of FIG. 3 in a second operational (medium rated voltage) configuration.

The converter element 50 includes a support structure, board or housing 52. The support structure 52 may be of a plastic material or any other material that will serve the functions described below. In the illustrated exemplary embodiment the converter element support structure 52 is in the shape of a U. More specifically, the converter element support structure 52 includes two parallel legs 54 and a crossbar 56 connecting the parallel legs 54. The converter element 50 may take other shapes. The converter element 50 includes a pair of projections 58. The converter element projections 58 extend from a top surface of the converter element support structure. One of the projections 58 may extend from a surface of each of the parallel legs 54. The converter element 50 may include more or less projections 58. Each projection 58 extends through one of the through holes 30 and into the raceway 28. When the converter element 50 is in a first position, as illustrated in FIG. 5 and described below, the projections 58 are positioned at a first end of the corresponding through hole 30. When the converter element 50 is in a second position, as illustrated in FIG. 16 and described below, the projections 58 are positioned at a second end of the corresponding through hole 30.

The converter element 50 also includes a plurality of contacts 60. The plurality of contacts 60 forms a set of contacts. The support structure 52 also includes a bottom surface. The contacts 60 extend from the bottom surface of the cross bar 56.

Figure 6:
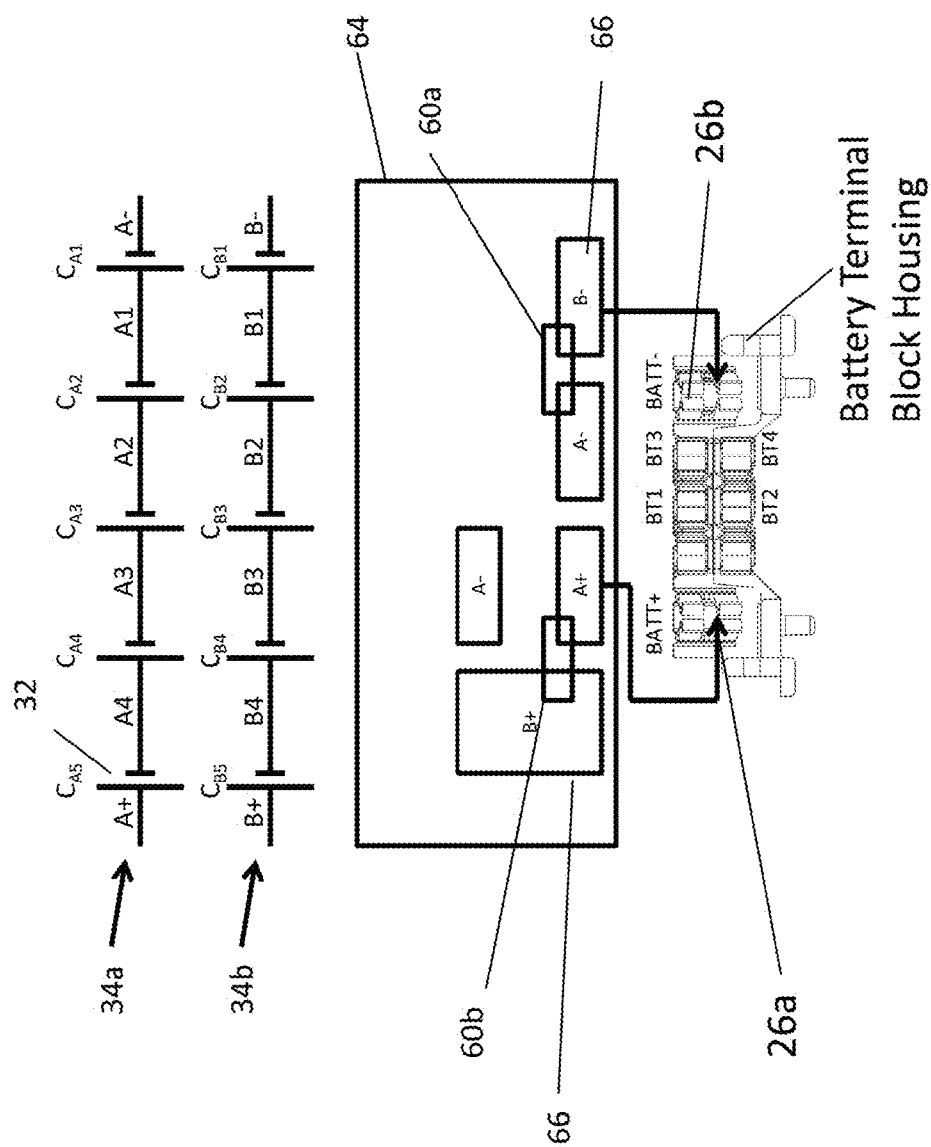
FIG. 6 is a simple block diagram of the battery pack converting subsystem corresponding to FIG. 5 in the first operational (low rated voltage) configuration and a simple circuit diagram of the strings of battery cells of the battery pack of FIG. 1.
Figure 7:
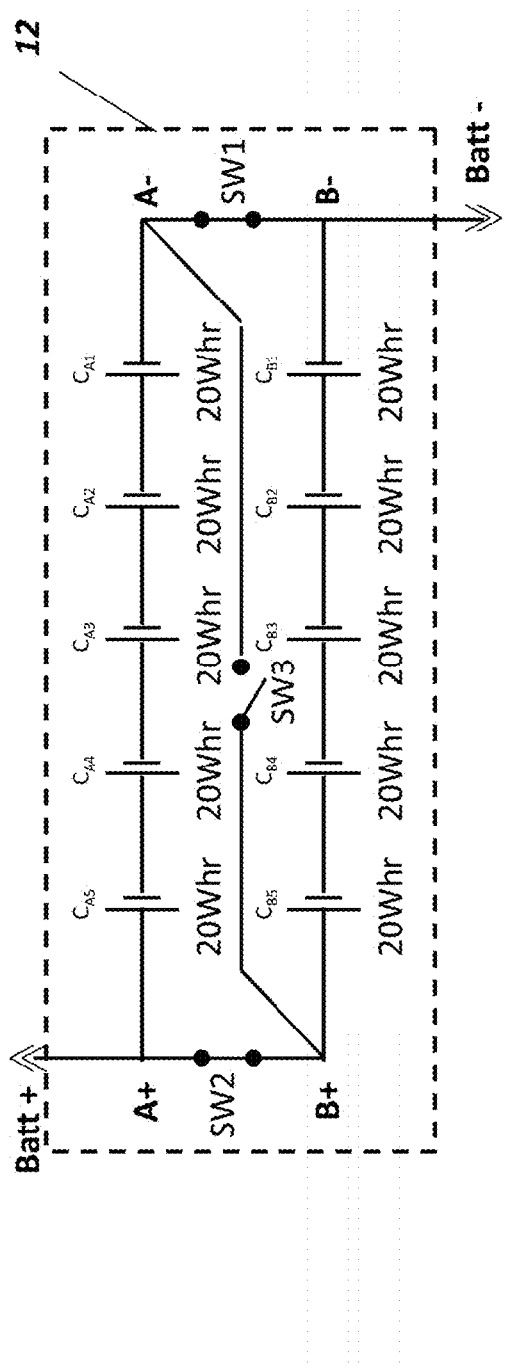
FIG. 7 is a simple circuit diagram of the battery of the battery pack of FIG. 1 in the first operational (low rated voltage) configuration of FIG. 5.
Figure 8B:
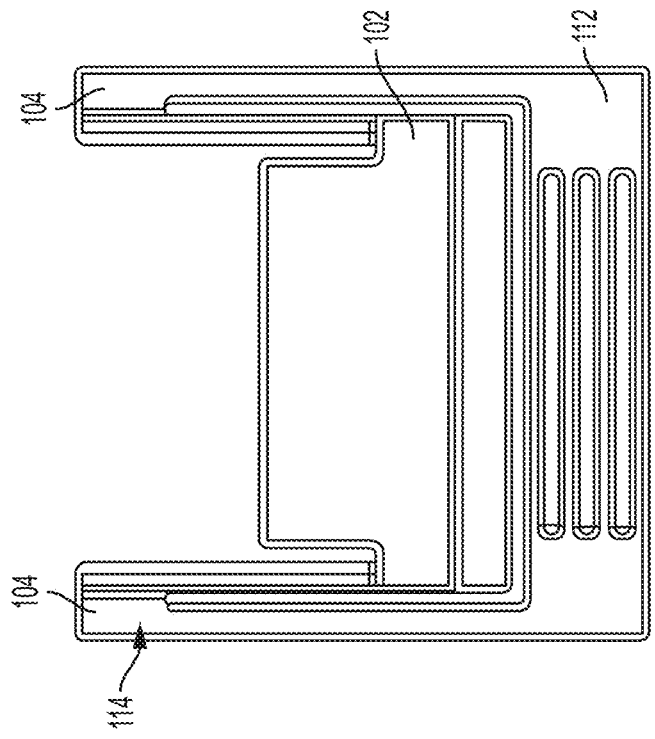
FIGS. 8A, 8B, 8C and 8D are views of an exemplary transport coupler/lock for use with the exemplary battery pack of FIG. 1.
Figure 8D:
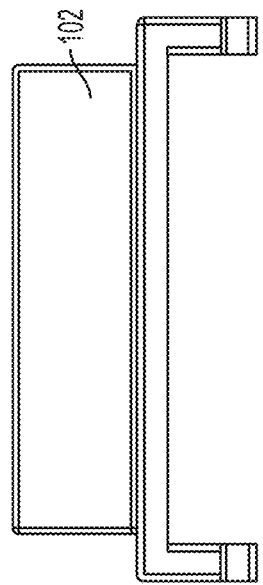
Figure 8A:
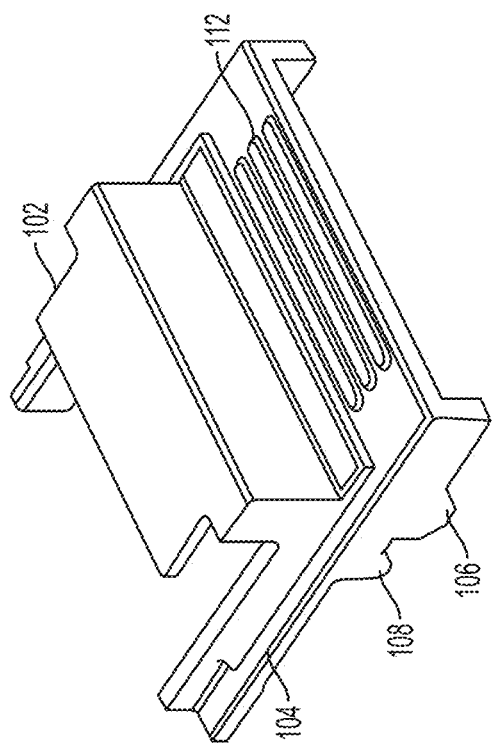
Figure 8C:
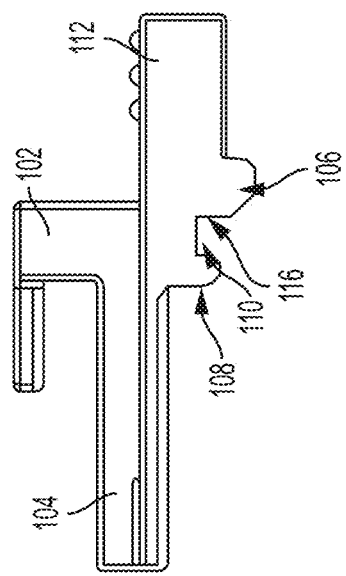

The battery pack 10 also includes a pair of compression springs 62. Alternate exemplary embodiments may include more or less springs, other types of springs and/or springs positioned in different locations. These embodiments are contemplated and encompassed by the present disclosure. Each parallel leg 54 includes a spring 62 thereabout. A first end of each compression spring 62 engages a wall of the projection 58. A second end of each compression spring 62 engages a wall of the support board 52. The compression springs 62 are configured to force the converter element 50 into the first position, as illustrated in FIG. 5. As illustrated in FIG. 5, the battery pack is configured to present a first (low) rated voltage. The sets of battery cells are coupled in parallel. In such a configuration, electrically speaking, the two switch contacts 60a (S1), 60B (S2) make mechanical and electrical contact with the contact pads 66 to couple the sets of battery cells 34a, 34b in parallel. FIG. 6 illustrates an alternate presentation of FIG. 5 in which the switch contacts 60a, 60b make mechanical and electrical contact with the contact pads 66 to couple the sets of battery cells 34a, 34b in parallel. FIG. 7 illustrates an electrical circuit diagram which illustrates electrical switches (SW1, SW2) representative of the physical switches created by the switch contacts 60 and the contact pads 66. As illustrated, when the switch contact 60a couples the A-contact pad 66 and the B-contact pad 66 the power switch SW1 is closed (in a closed state) and when the switch contact 60b couples the A+ contact pad 66 and the B+ contact pad 66 the power switch SW2 is closed (in a closed state) and as no switch contact couples the A-contact pad 66 to the B+ contact pad 66 the power switch SW3 is open (in an opened state). As such, in this low rated configuration, the A string (set) of battery cells 34a and the B string (set) of battery cells 34b are electrically connected in parallel by the switch network made up of power switches SW1, SW2 and SW3.

As described in detail in U.S. patent application Ser. No. 14/715,258, as the electrical device mates with the battery pack 10 in the mating direction and the electrical device conversion elements engage the converter element projections 58, the converter element 50 is moved from its first position (illustrated in FIG. 5) and forced to act against the spring 62 thereby compressing the spring 62. When the electrical device is fully mated with the battery pack 10, the converter element 50 will have moved from the first position to the second position and the spring 62 will be at its full compression (illustrated in FIG. 16). When the electrical device is detached from the battery pack 10, the spring 62 forces the converter element 50 to move from the second position (illustrated in FIG. 16) to the first position (illustrated in FIG. 5). The battery pack 10 may also include, for example, the PCB and/or some other type of insulating support board 64 between the converter element 50 and the cells 32, as described in more detail below.

FIG. 6 illustrates a simplified circuit diagram of an exemplary battery of the exemplary embodiment of the convertible battery pack 10.

In the exemplary embodiment, the battery pack 10 is convertible between the low rated voltage configuration and the medium rated voltage configuration. Solely for purposes of example, the low rated voltage may be 20 Volts and the medium rated voltage may be 40 Volts. Other voltages are contemplated and encompassed by the scope of this disclosure. As illustrated in FIG. 6, the exemplary battery includes two strings (also referred to as sets) 34 of cells—an "A" string 34a and a "B" string 34b—each string including 5 battery cells 32. Other exemplary, alternate embodiments may include fewer or more strings and/or fewer or more cells per string. Each string of cells 32 includes a positive terminal, e.g., A+, B+ and a negative terminal, e.g., A−, B−. Each cell 32 is denoted by the string and its position in the string, e.g., $C_{A1}$ is the first cell in the A string when moving from negative terminal to the positive terminal in the string and $C_{B5}$ is the fifth cell in the B string when moving from the negative terminal to the positive terminal. This denotation is merely exemplary and other denotations may be used to the same effect. A node between adjacent cells is denoted by the string and its position in the string, e.g., A2 is a node in the A string between cell $C_{A2}$ and cell $C_{A3}$. And B3 is a node in the B string between cell $C_{B3}$ and cell $C_{B4}$.

Referring to FIGS. 6 and 7, the battery also includes a plurality of switches—also referred to as a switching network. The plurality of switches may be mechanical switches, electronic switches or electromechanical switches or any combination thereof.

When the battery pack 10 is in the low rated voltage state or configuration—not connected to any electrical device or connected to a low rated voltage electrical device, the switches SW1, SW2 are in a closed state and the switch SW3 is in an opened state. When the battery pack 10 is in the medium rated voltage state-connected to a medium rated voltage electrical device, the switches SW1 and SW2 are in an opened state and switch SW3 is in a closed state. The conventional power terminals are typically referred to a DEVICE+ (or TOOL+) and DEVICE− (TOOL−) terminals and couple to the BATT+ and BATT− terminals, respectively. FIGS. 5 and 6 also clearly illustrate the exemplary contact pad layout. Each of the contact pads 66 (A+, B+, A−, B−) is electrically coupled to a denoted cell string terminal, specifically the A+ contact pad 66 is electrically coupled to the A+ terminal of the A string of cells (positive terminal of the "A" set of cells), the B+ contact pad 66 is electrically coupled to the B+ terminal of the B string of cells (positive terminal of the "B" set of cells), the A− contact pad 66 is electrically coupled to the A− terminal of the A string of cells (negative terminal of the "A" set of cells), and the B− contact pad 66 is electrically coupled to the B-terminal of the B string of cells (negative terminal of the "B" set of cells).

Furthermore, the A+ contact pad 66 is electrically coupled to the BATT+ battery pack terminal 26a. And, the B− contact pad is electrically coupled to the BATT− battery pack terminal 26b.

In the exemplary embodiment, the plurality of contact pads 66 allow for the converter element contacts 60 to slide along the support board 64 and the contact 60 to break and make connections between the discrete contact pads 66—effectively opening and closing the power switches SW1-SW3, as described above. This process is described in more detail below.

Figure 2:
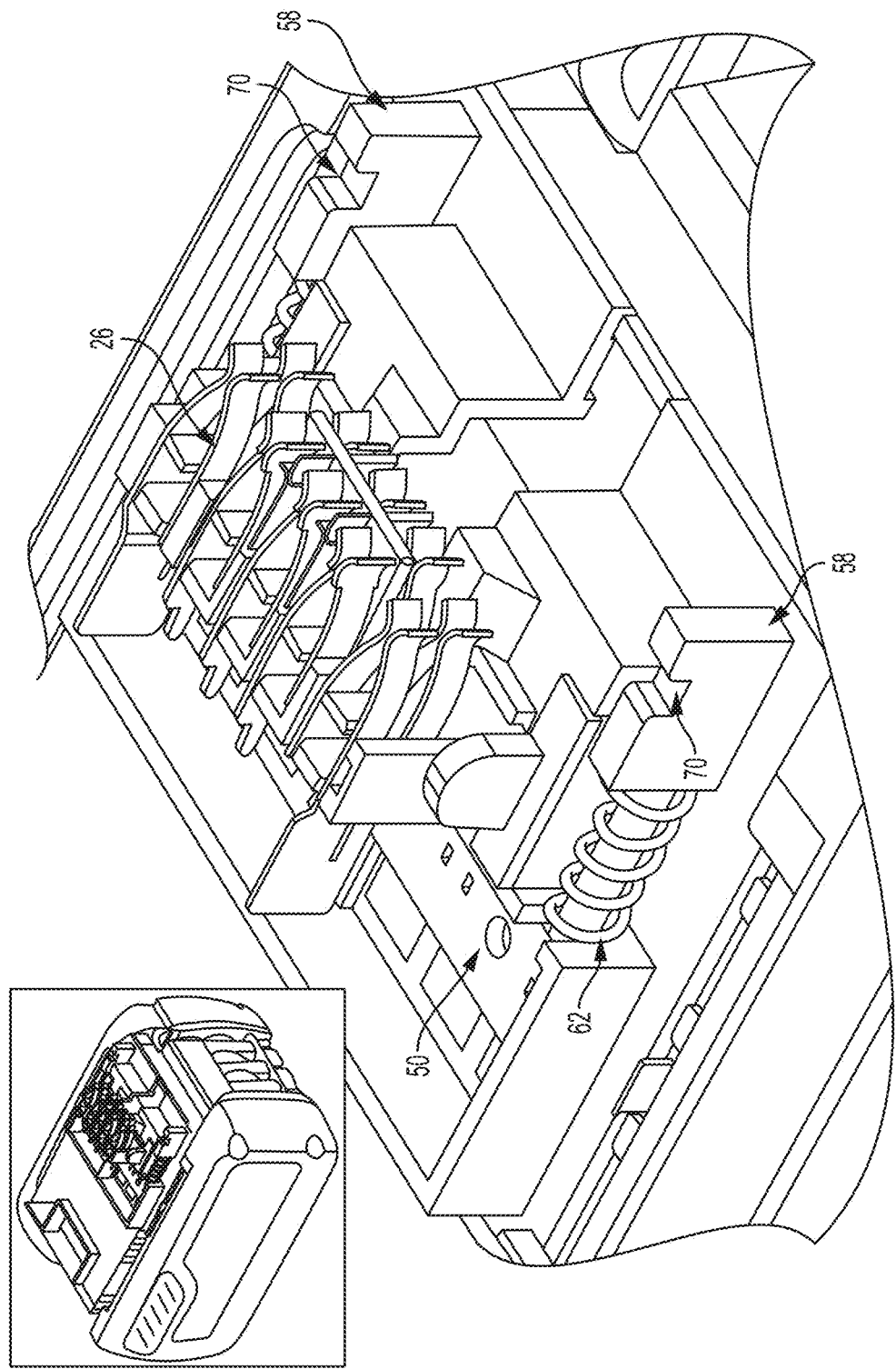
FIG. 2 is a partial view of an exemplary embodiment of a converting subsystem of the battery pack of FIG. 1.

FIGS. 2 and 3 illustrate, in more detail, the exemplary battery pack 10. The battery pack 10 includes the converting subsystem. The converting subsystem includes the support board and the converter element 50. FIG. 6 illustrates the plurality of contact pads and the converter element contacts in the first operational position but without the converter element housing. The contact pad configuration illustrated in FIG. 6 is an exemplary configuration. Alternate exemplary embodiments may include other contact pad configurations and are contemplated and encompassed by the present disclosure.

Figure 14:
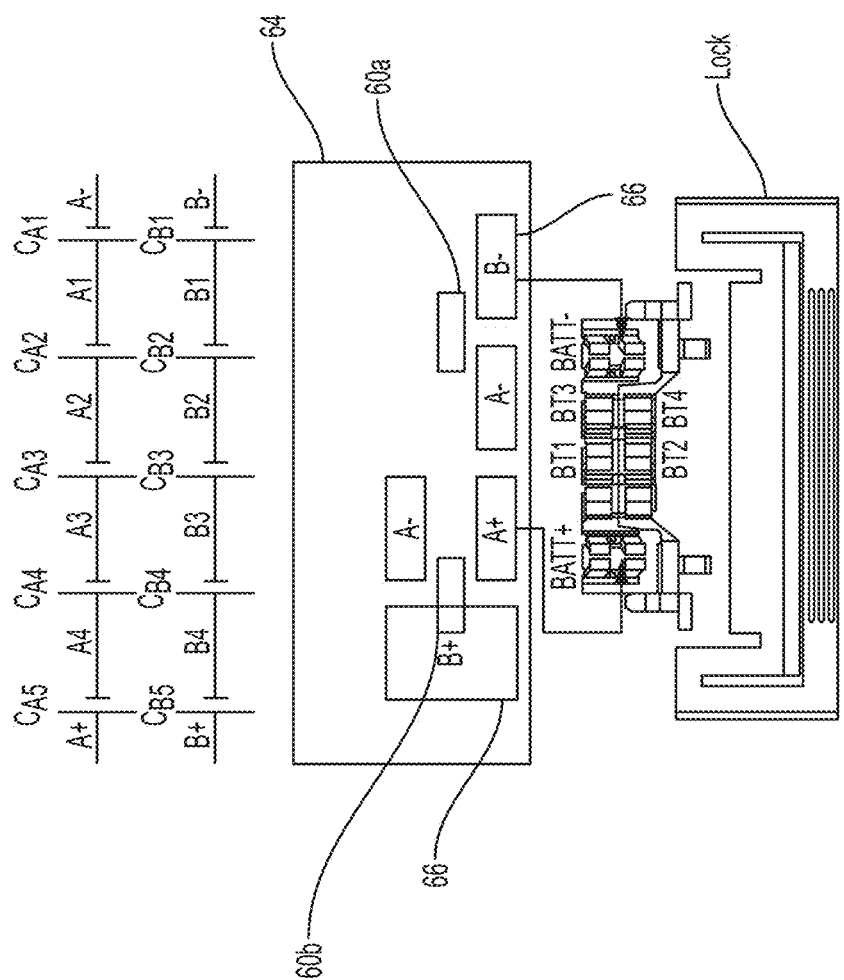
FIG. 14 is a simple block diagram of the battery pack converting subsystem corresponding to FIG. 13 in the second operational (transport) configuration and a simple circuit diagram of the strings of battery cells of the battery pack of FIG. 1.

FIGS. 6 and 14 illustrate the low rated voltage configuration and the medium rated voltage configuration, respectively.

Referring to FIGS. 6 and 14, the low rated voltage configuration will be described. When the exemplary battery pack of FIG. 1 is not coupled to an electrical device or when it is coupled to a low rated voltage tool, it is in the low rated voltage configuration. When in this low rated voltage configuration, a first converter element contact electrically couples the A+ contact pad and the B+ contact and a second converter element contact electrically couples the A− contact pad and the B− contact pad. This effectively places switches SW1 and SW2, in the closed state and as there is no connection between the A− contact pad and the B+ contact pad this effectively places switch SW3 in the opened state. As such, the positive terminals of the A string of cells and the B string of cells are all electrically connected and coupled to the BATT+ battery terminal and the negative terminals of the A string of cells and the B string of cells are electrically connected and coupled to the BATT− battery terminal. Therefore the strings of cells are all in parallel.

When the battery pack mates with a medium rated voltage tool, the tool projections will engage the converter element projections and force the converter element to move to its second position.

When the converter element moves to its medium rated voltage position, the first converter element contact will decouple from the A+ and B+ contact pads and couple the B+ and A− contact pads and the second converter element contact will decouple from the A− and B− contact pads. This effectively places switches SW1 and SW2 in the opened state and effectively places switch SW3 in the closed state. As such, BATT− battery terminal is coupled to the B− terminal of the B string of cells, the B+ terminal of the B string of cells is coupled to the A− terminal of the A string of cells and the A+ terminal of the A string of cells is coupled to the BATT+ terminal. Therefore the strings of cells are all in series.

Of course, as the electrical device disconnects from the convertible battery pack in a direction opposite the mating direction—also referred to as the unmating direction—the converter element will move from the second position to the first position and the converter element contacts will connect and disconnect to the contact pads in a reverse order described above. In addition, it is contemplated that the convertible battery pack could be configured such that when the battery pack is not mated with the electrical device and the converter element is in the first position the battery pack is in the medium rated voltage configuration and when the battery pack is mated with the electrical device the battery pack is in the low rated voltage configuration. Of course, the various connections and switches would be adjusted accordingly.

Figure 9:
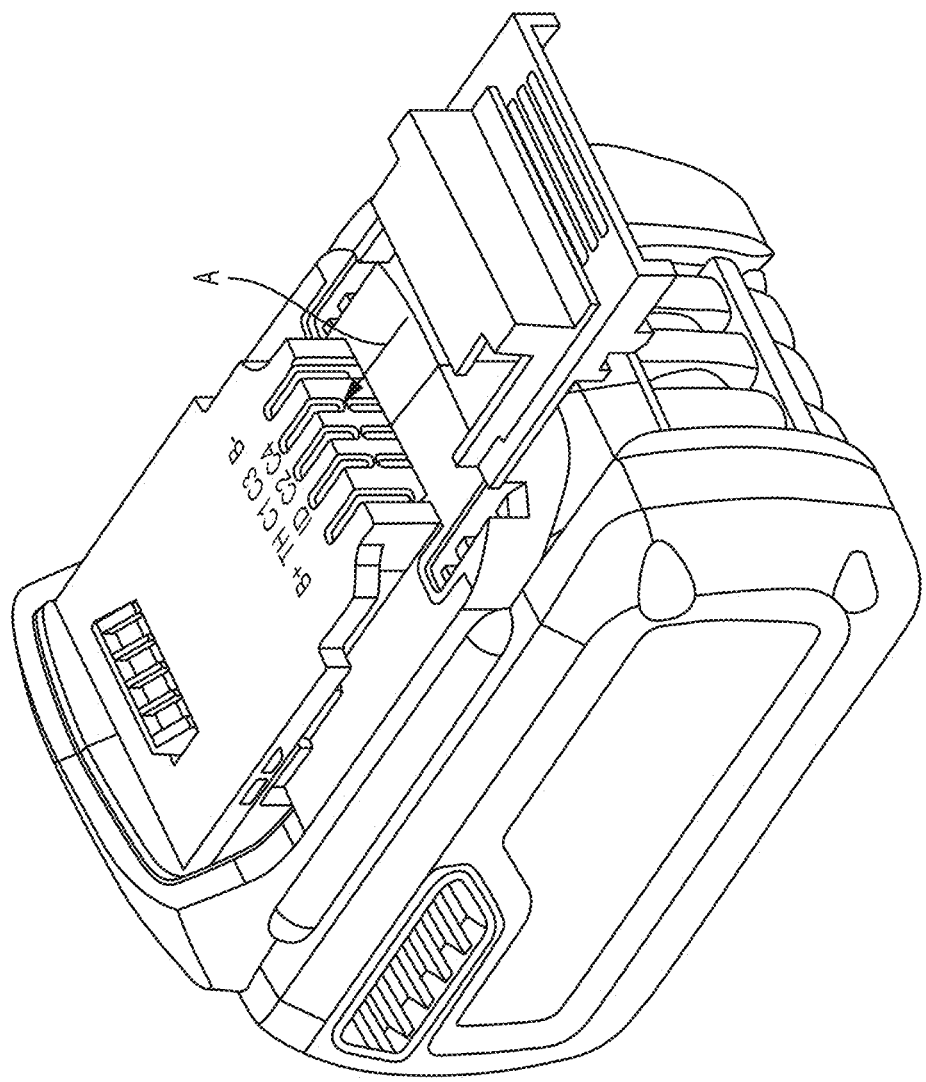
FIG. 9 is a perspective view of the exemplary transport coupler/lock of FIG. 8 and the exemplary battery pack of FIG. 1.

FIG. 8 illustrates several views of an exemplary transport coupler (also referred to as a transport lock or transport cap) 100 of the present disclosure, that mates with the convertible battery pack to place the battery pack in a transport configuration. FIG. 9 illustrates the transport lock 100 about to mate with the battery pack 10. The transport lock 100 includes an interface for coupling with the battery pack. The lock 100 includes a cover plate 102 for covering the battery terminal housing slots 22 and a pair of parallel legs 104 that extend from opposing sides of the cover plate 102. The legs 104 are configured to slide into the grooves 18 of the battery pack 10 similar to rails of an electrical device that is configured to mate with the battery pack 10.

The lock 100 also includes a pair of conversion elements or actuators 106 positioned parallel with the parallel legs 104. These actuators 106 are configured to be received in the battery pack raceways 28 similar to the conversion elements of the electrical device. In the exemplary embodiment, the actuators 106 may be simple projections or protrusions that may extend down from the lock 100. The actuators 106 are sized and positioned to be received in corresponding battery pack conversion slots 28. The lock 100 also includes a locking projection 108 spaced forward from the actuator 106 and separated by a notch 110. As the lock 100 slides into mating engagement with the battery pack 10 in a mating direction—as indicated by arrow A—a handle 112 is raised and a living hinge 114 allows the actuator 106 and locking projection 108 to rise, relative to the battery pack 10, while the parallel legs 104 are received in the battery pack grooves 18. As the handle 112 rises and the lock 100 moves into engagement with the battery pack 10 the locking projection 108 moves up, over and past a leading, engaging surface 72 of the converting element 50 of the battery pack converting subsystem. As the lock 100 moves into further engagement with the battery pack 10 an engaging surface 116 of the actuator 106 engages the engaging surface 72 of the converting element 50. As the lock 100 further engages the converter element 50 the converter element 50 is forced further into the battery pack housing 12. When the converter element 50 reaches a certain point in the mating direction, the handle 112 of the lock 100 moves downward as the actuator 106 moves into a space of the through hole 30 vacated by the movement of the converter element 50. As the handle 112 moves downward and the actuator 106 moves into the through hole 30 the locking projection 108 of the lock 100 moves into a notch or catch 70 of the converter element projection 58. By the actuator 106 being in the through hole 30 the converter element 50 is prevented from moving in a direction opposite to the mating direction A and by the locking projection 108 being in the catch 70 the converter element 50 is prevented from moving further in the mating direction A.

Figure 11B:
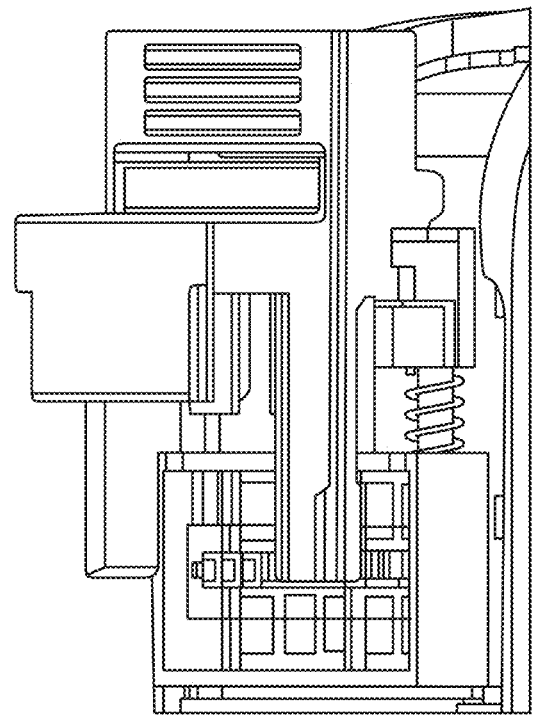
FIGS. 11A and 11B are views of the transport coupler/lock of FIG. 8 and the battery pack of FIG. 1 in an engaged state.
Figure 11A:
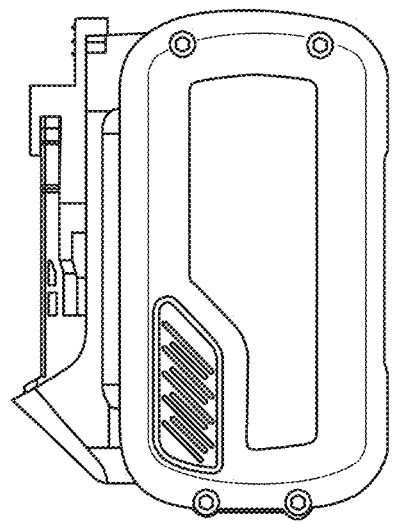
Figure 12:
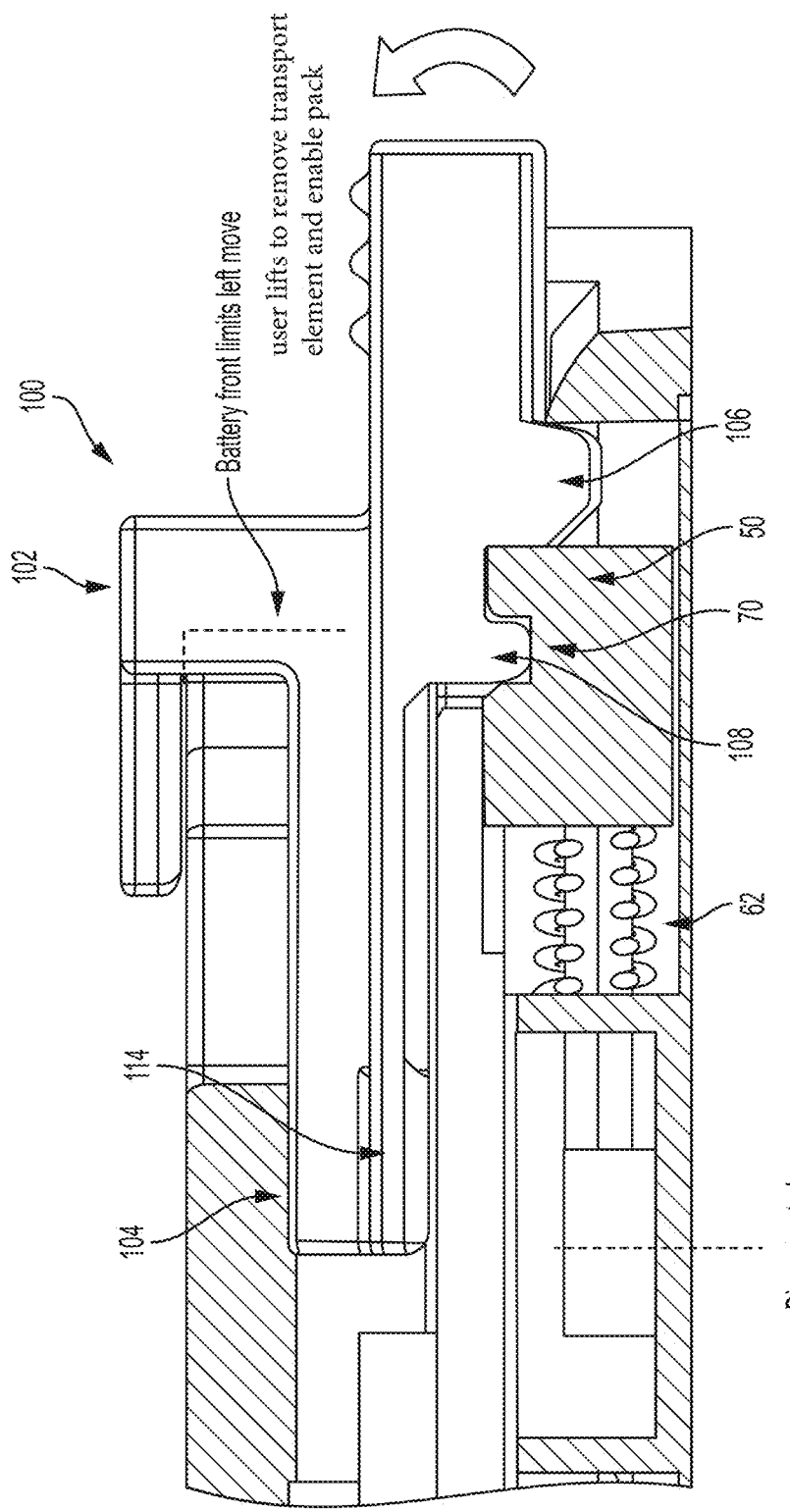
FIG. 12 is a cross sectional view of the transport coupler/lock and the battery pack of FIG. 11.
Figure 13:
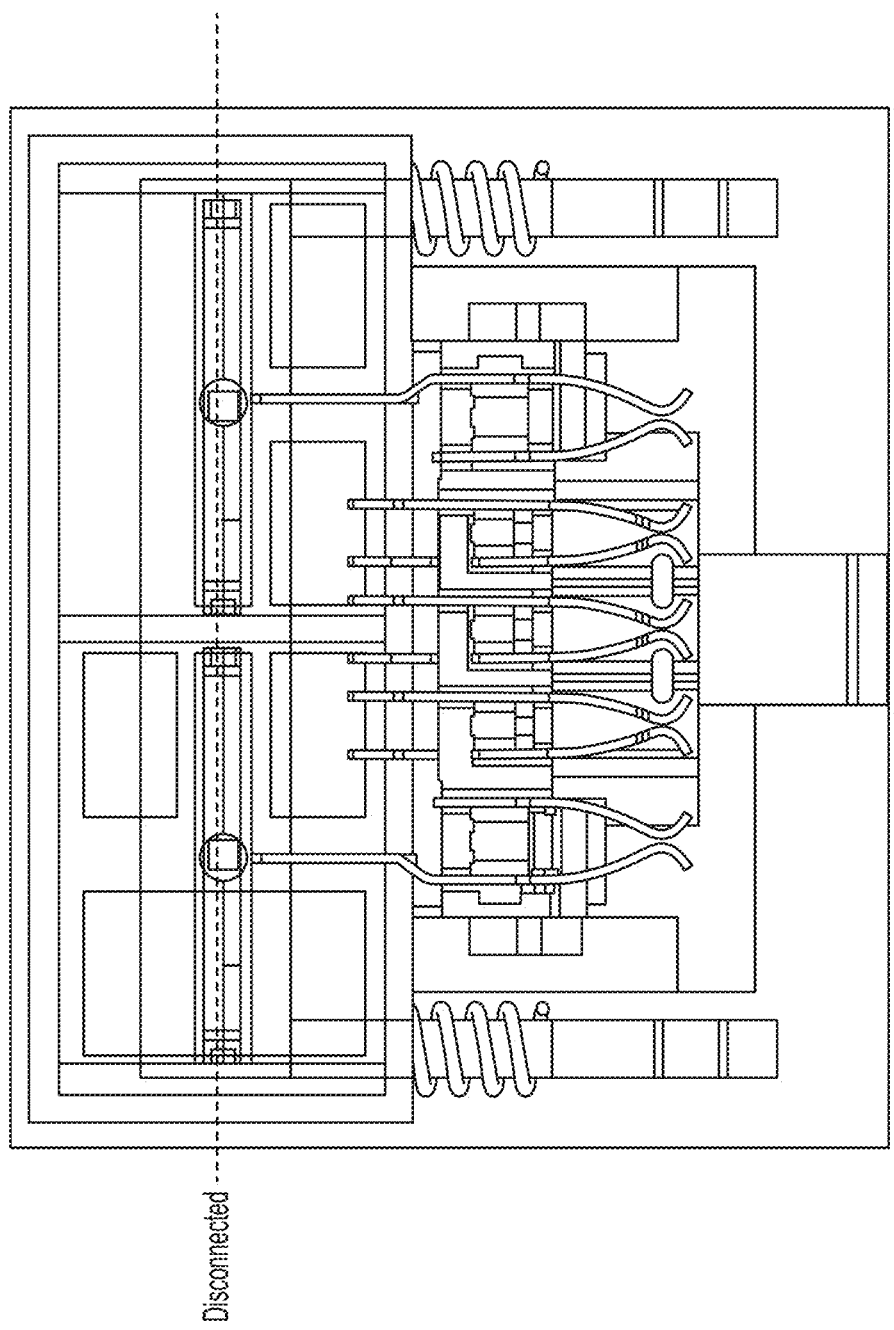
FIG. 13 is a picture view of the converting subsystem of FIG. 3 in a second operational (transport) configuration.
Figure 15:
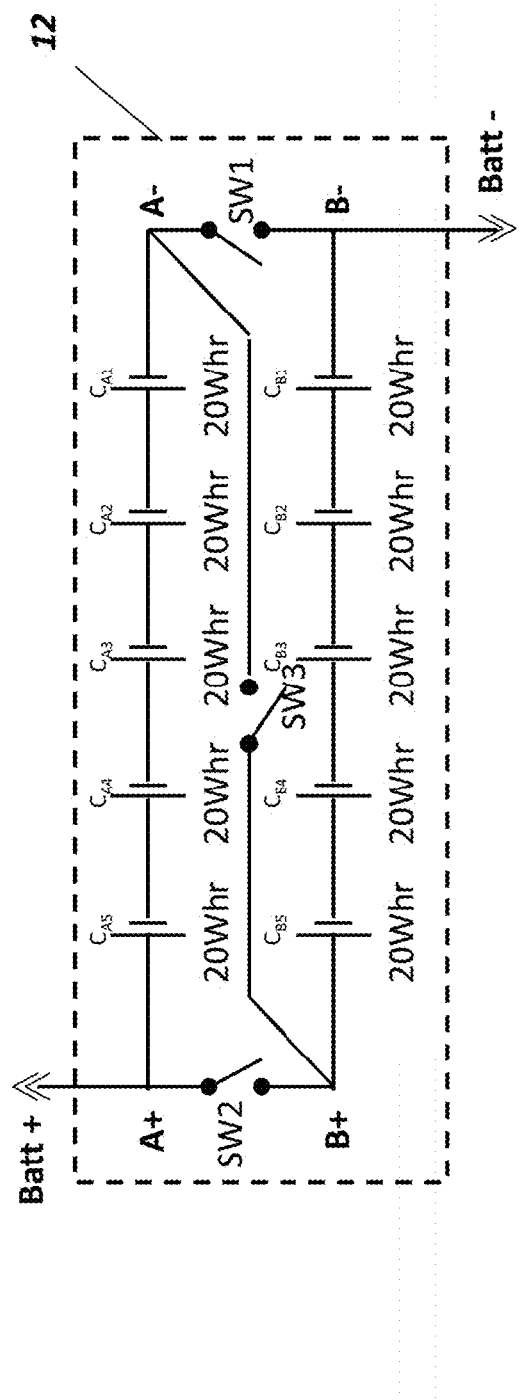
FIG. 15 is a simple circuit diagram of the battery cells of the battery pack of FIG. 1 in the transport configuration of FIG. 13.

As described above, when the lock 100 fully engages the battery pack 10, as illustrated in FIGS. 11 and 12, the converter element 50 is placed in an intermediate position between the first operational (low rated voltage) position/configuration and the second operational (medium rated voltage) position/configuration. As illustrated in FIG. 13, when the transport lock 100 is mated with the battery pack 10 the battery pack 10 is configured to present a zero voltage. The sets of battery cells 34a, 34b are decoupled. In such a configuration, electrically speaking, the two switch contacts 60a (S1), 60B (S2) do not make mechanical and electrical contact with any of the contact pads 66. FIG. 14 illustrates an alternate presentation of FIG. 13 in which the switch contacts 60a, 60b do not make mechanical and electrical contact with the contact pads 66 and decouple the sets of battery cells 34a, 34b. FIG. 15 illustrates an electrical circuit diagram which illustrates electrical switches (SW1, SW2) representative of the physical switches created by the switch contacts 60 and the contact pads 66. As illustrated, when the switch contact 60a decouples the A− contact pad 66 and the B− contact pad 66 the power switch SW1 is opened (in an opened state) and when the switch contact 60b decouples the A+ contact pad 66 and the B+ contact pad 66 the power switch SW2 is opened (in an opened state) and as no switch contact couples the A− contact pad 66 to the B+ contact pad 66 the power switch SW3 is open (in an opened state). As such, in this opened/transport configuration, the A string (set) of battery cells 34a and the B string (set) of battery cells 34b are electrically disconnected by the switch network made up of power switches SW1, SW2 and SW3.

As the underlying support board holding the contact pads is of a nonconductive material, when the converter element is in the intermediate position the converter element contacts do not couple a pair of contact pads. As such, switches SW1, SW2 and SW3 are all in an opened state. As illustrated in FIG. 15, this effectively electrically separates and isolates the A string of battery cells from the B string of battery cells. In addition, a zero voltage potential will exist between the BATT+ and BATT− battery terminals.

Figure 17:
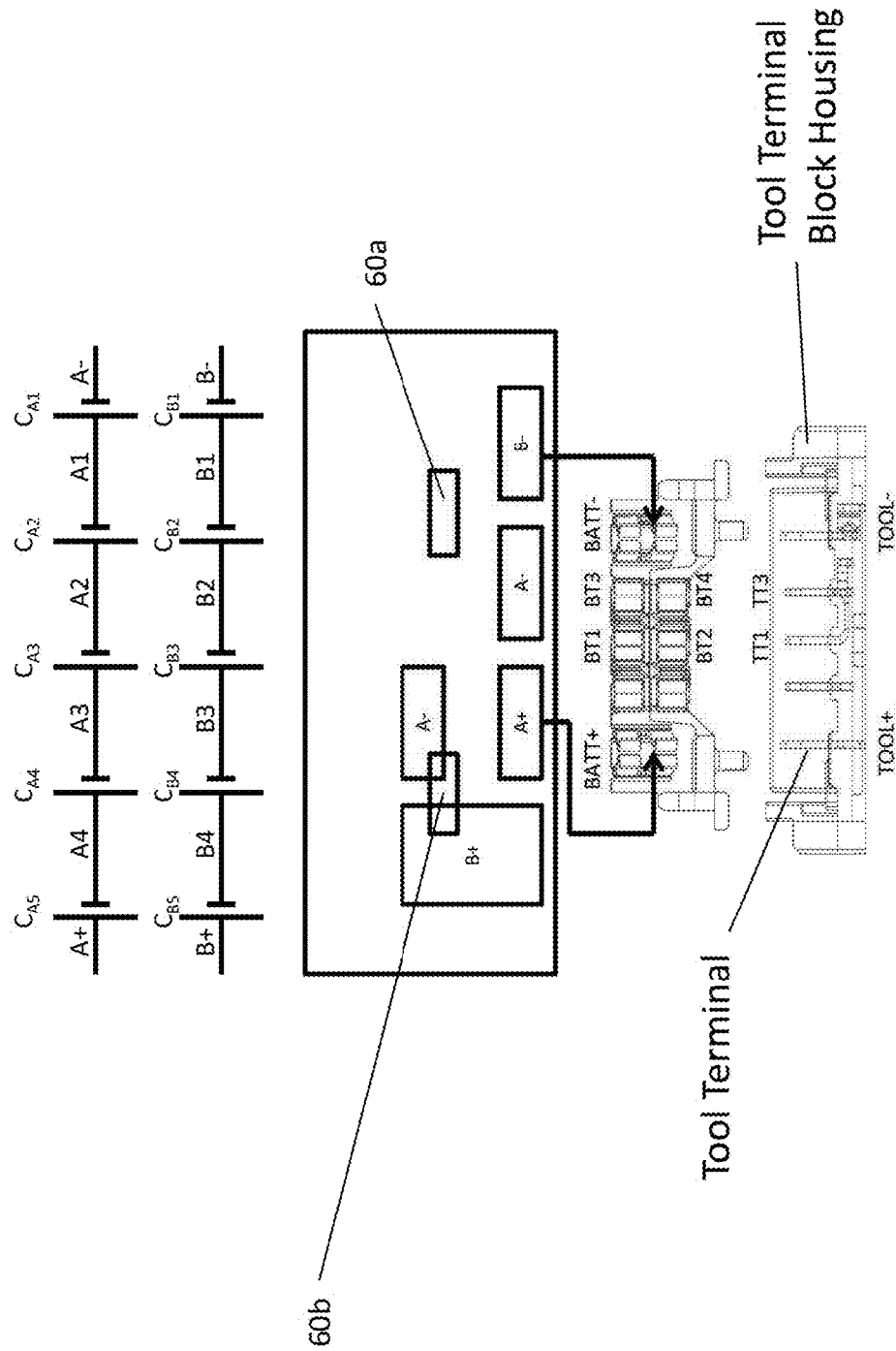
FIG. 17 is a simple block diagram of the battery pack converting subsystem of FIG. 16 in the second operational (medium rated voltage) configuration and a simple circuit diagram of the battery cells of the battery pack of FIG. 1.
Figure 18:
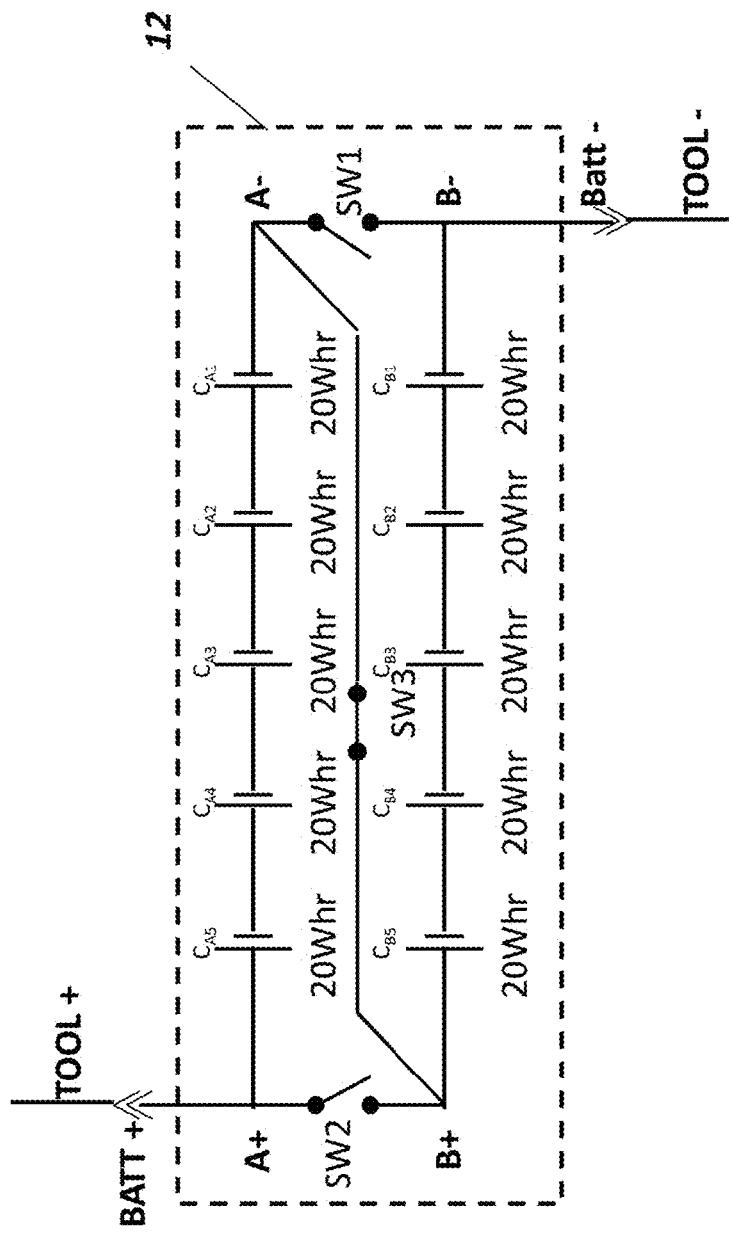
FIG. 18 is a simple circuit diagram of the battery cells of the battery pack of FIG. 1 in the second operational (medium rated voltage) configuration of FIG. 16.
Figure 19:
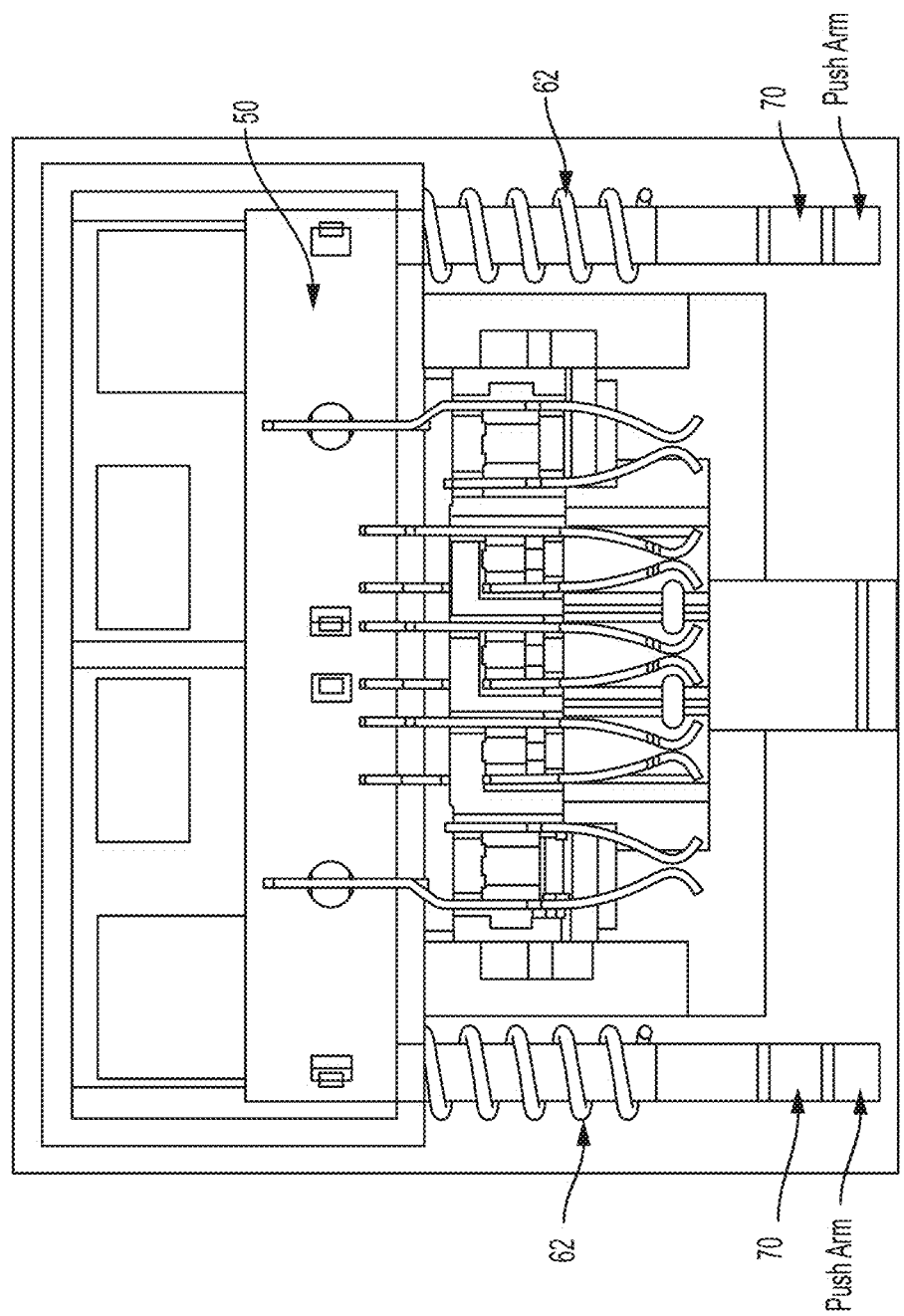
FIG. 19 an alternate exemplary embodiment of a converting subsystem of an alternate exemplary convertible battery pack of FIG. 1.

As illustrated in FIG. 16, the battery pack is configured to present a second (medium) rated voltage. The sets of battery cells 34a, 34b are coupled in series. In such a configuration, electrically speaking, the two switch contacts 60a (S1), 60B (S2) make mechanical and electrical contact with the contact pads 66 to couple the sets of battery cells 34a, 34b in series. FIG. 17 illustrates an alternate presentation of FIG. 16 in which the switch contacts 60a, 60b make mechanical and electrical contact with the contact pads 66 to couple the sets of battery cells 34a, 34b in series. FIG. 18 illustrates an electrical circuit diagram which illustrates electrical switches (SW1, SW2) representative of the physical switches created by the switch contacts 60 and the contact pads 66. As illustrated, as the switch contact 60a does not couple the A− contact pad 66 and the B− contact pad 66 the power switch SW1 is open (in an opened state) and the switch contact 60b does not couple the A+ contact pad 66 and the B+ contact pad 66 the power switch SW2 is opened (in an opened state) and as the switch contact 60B couples the A− contact pad 66 to the B+ contact pad 66 the power switch SW3 is closed (in a closed state). As such, in this medium rated configuration, the A string (set) of battery cells 34a and the B string (set) of battery cells 34b are electrically connected in series by the switch network made up of power switches SW1, SW2 and SW3.

FIGS. 19-28 illustrate operation of an alternate exemplary converting subsystem of an alternate exemplary battery pack 10 when engaged by a transport lock 10 similar to the transport lock of FIG. 8. This battery pack illustrated in FIGS. 19-28 may be placed in three configurations but is only capable of presenting a single rated voltages. In other words, the battery pack may be configured to present a first rated voltage wherein the two sets of battery cells are coupled in a first manner (in parallel), may be configured to present the same first rated voltage wherein the two sets of battery cells are coupled in the same manner (in parallel) but the converter element 50 is in a different location than in the first configuration, and may be configured to present a zero voltage wherein the two sets of battery cells are decoupled. As such, the battery pack 10 includes a converting subsystem that converts from a first operational configuration (a first rated voltage) to an open state configuration (for transport) to a second operational configuration (also the first rated voltage). The transport lock 10 operates in the same manner as described above.

Figure 20:
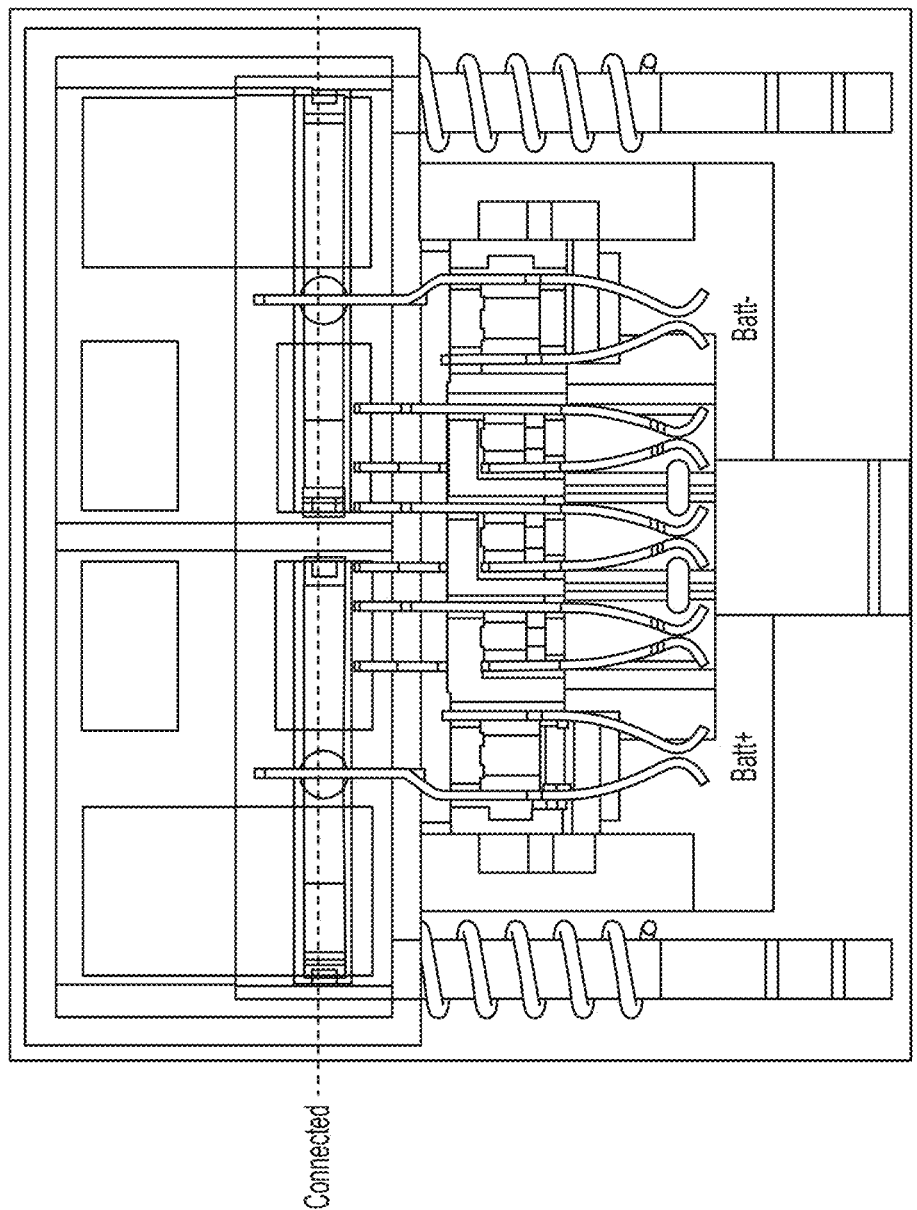
FIG. 20 is a picture view of the converting subsystem of FIG. 19 in a first operational configuration.
Figure 21:
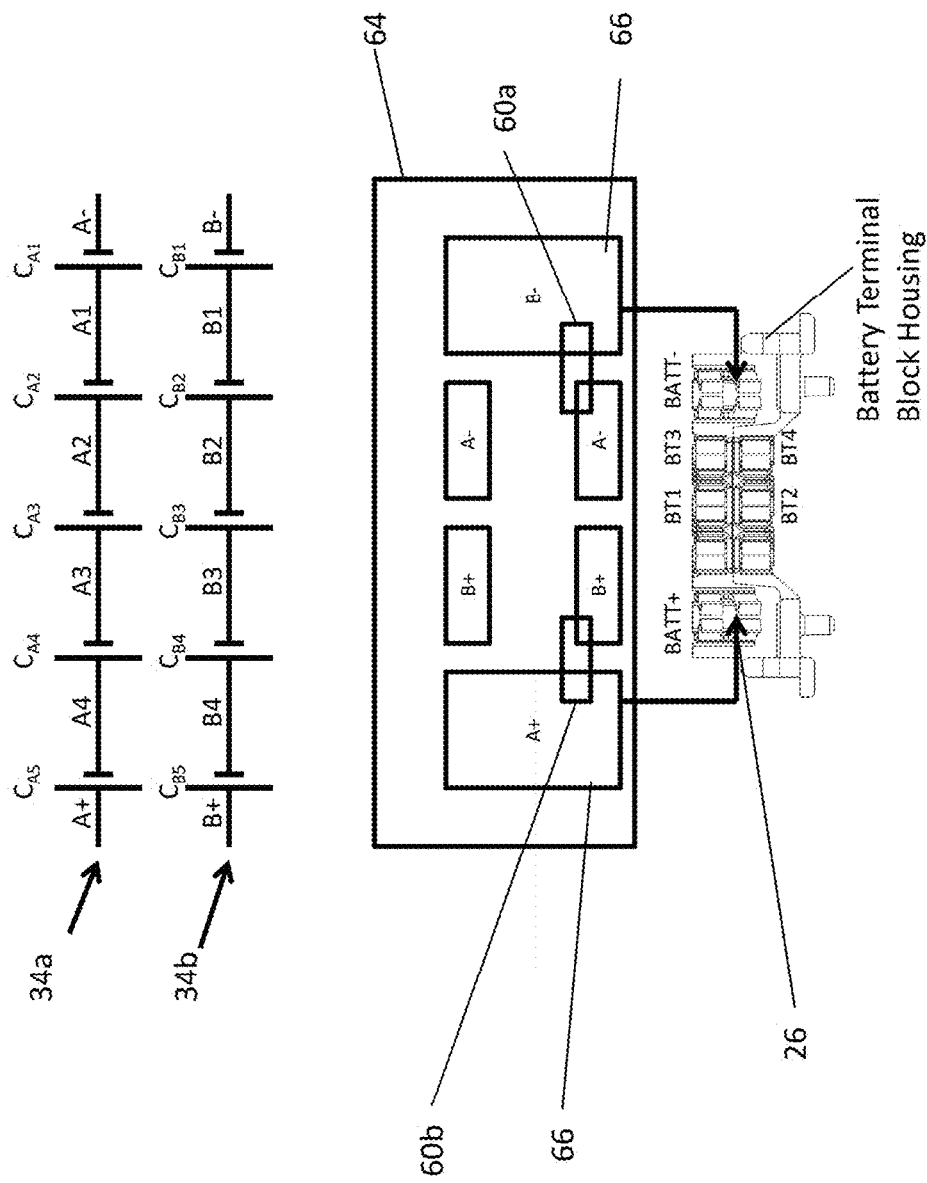
FIG. 21 is a simple block diagram of the battery pack converting subsystem of FIG. 20 in the first operational configuration and a simple circuit diagram of the battery cells of the battery pack of FIG. 1.
Figure 22:
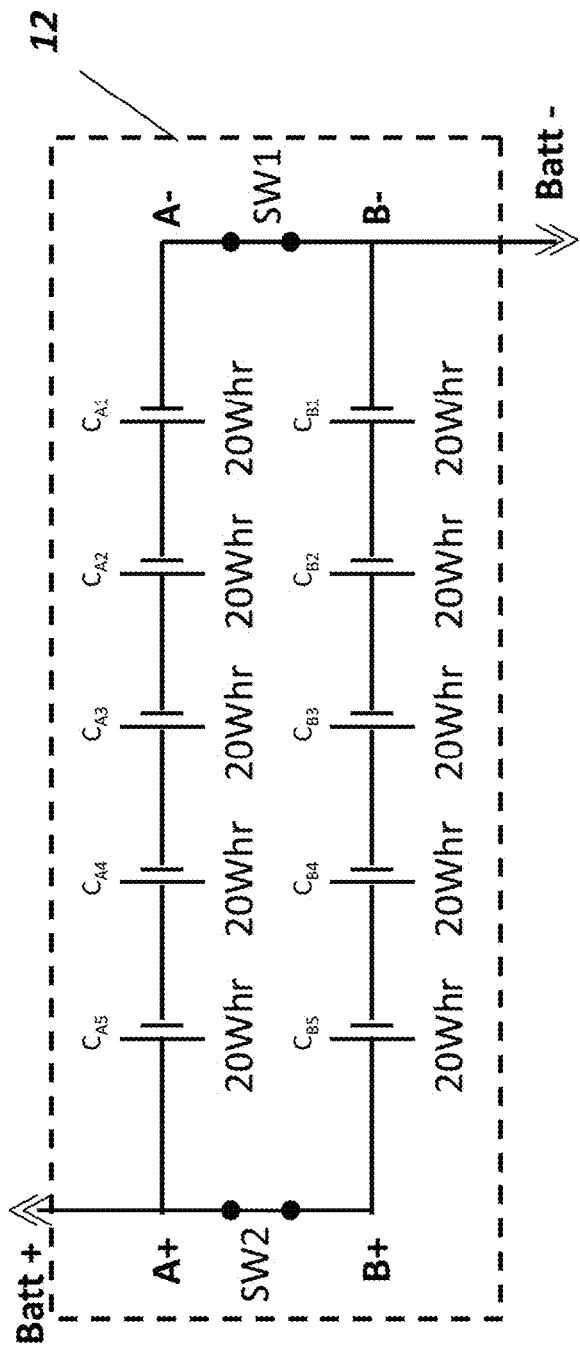
FIG. 22 is a simple circuit diagram of the battery cells of the battery pack of FIG. 1 in the first operational configuration of FIG. 20.

As illustrated in FIG. 20, the battery pack is in a first operational configuration and as such is configured to present a rated voltage. The sets of battery cells are coupled in parallel. In such a configuration, electrically speaking, the two switch contacts 60a (S1), 60B (S2) make mechanical and electrical contact with the contact pads 66 to couple the sets of battery cells 34a, 34b in parallel. FIG. 21 illustrates an alternate presentation of FIG. 20 in which the switch contacts 60a, 60b make mechanical and electrical contact with the contact pads 66 to couple the sets of battery cells 34a, 34b in parallel. FIG. 22 illustrates an electrical circuit diagram which illustrates electrical switches (SW1, SW2) representative of the physical switches created by the switch contacts 60 and the contact pads 66. As illustrated, when the switch contact 60a couples the first A− contact pad 66 and the B− contact pad 66 the power switch SW1 is closed (in a closed state) and when the swith contact 60b couples the first A+ contact pad 66 and the B+ contact pad 66 the power switch SW2 is closed (in a closed state). As such, in this rated configuration, the A string (set) of battery cells 34a and the B string (set) of battery cells 34b are electrically connected in parallel by the switch network made up of power switches SW1 and SW2. In this configuration (sometimes referred to as a working state or configuration), the strings of cells 34a, 34b are electrically coupled by the contact switches 66a, 66b. The return springs 62 force the converter element 50 into this operational configuration.

Figure 23:
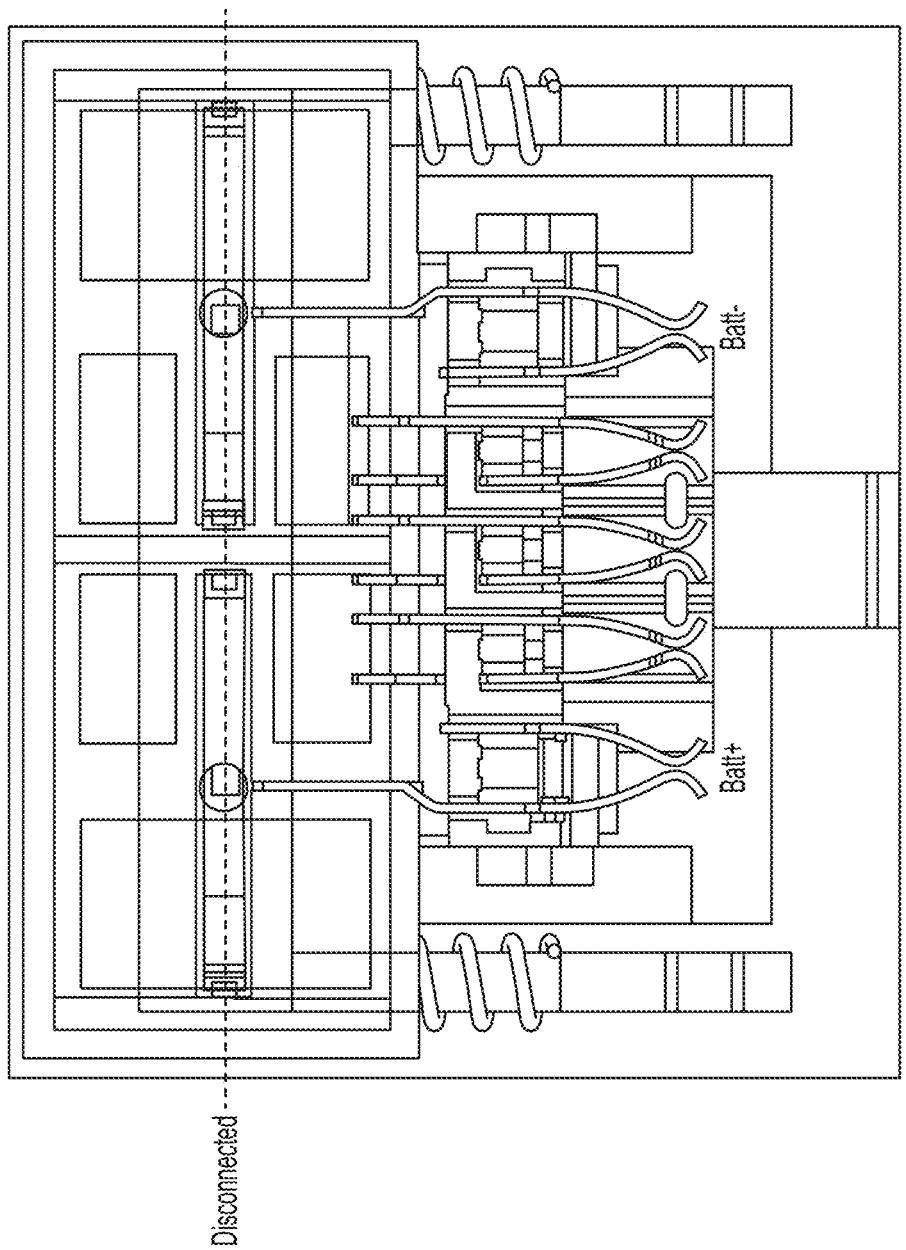
FIG. 23 is a picture view of the converting subsystem of FIG. 19 in a transport configuration.
Figure 24:
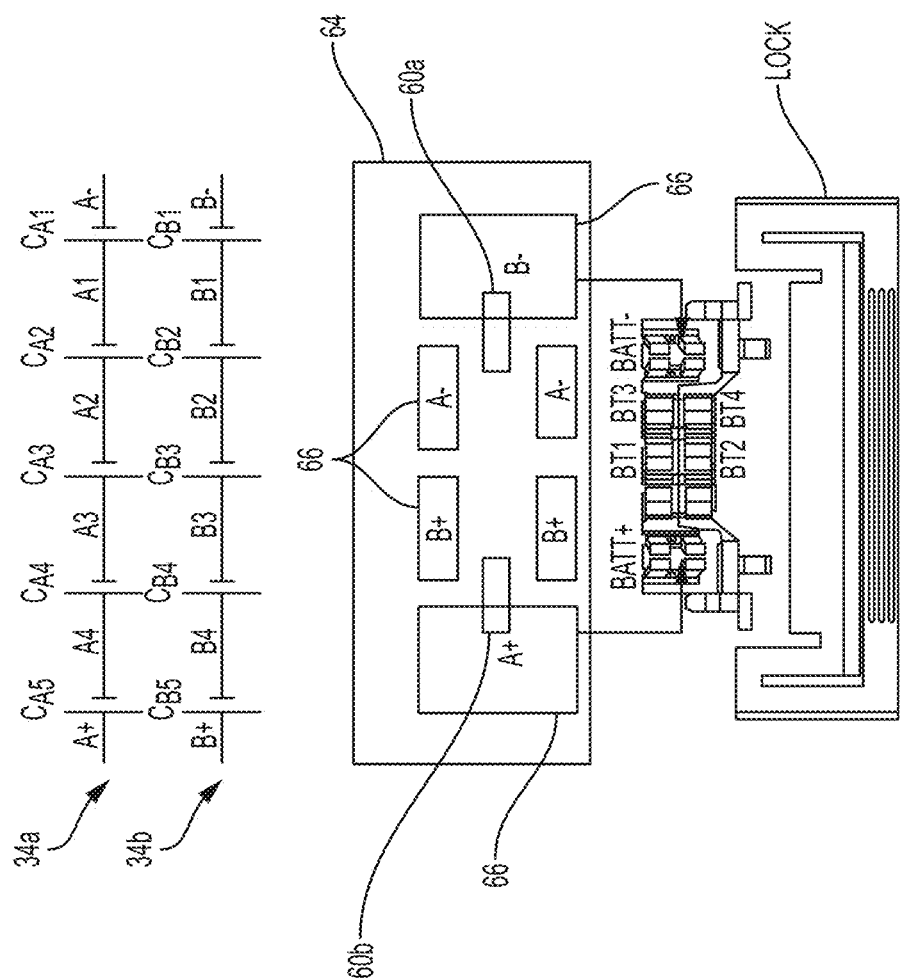
FIG. 24 is a simple block diagram of the battery pack converting subsystem of FIG. 23 in the transport configuration and a simple circuit diagram of the battery cells of the battery pack of FIG. 1.
Figure 25:
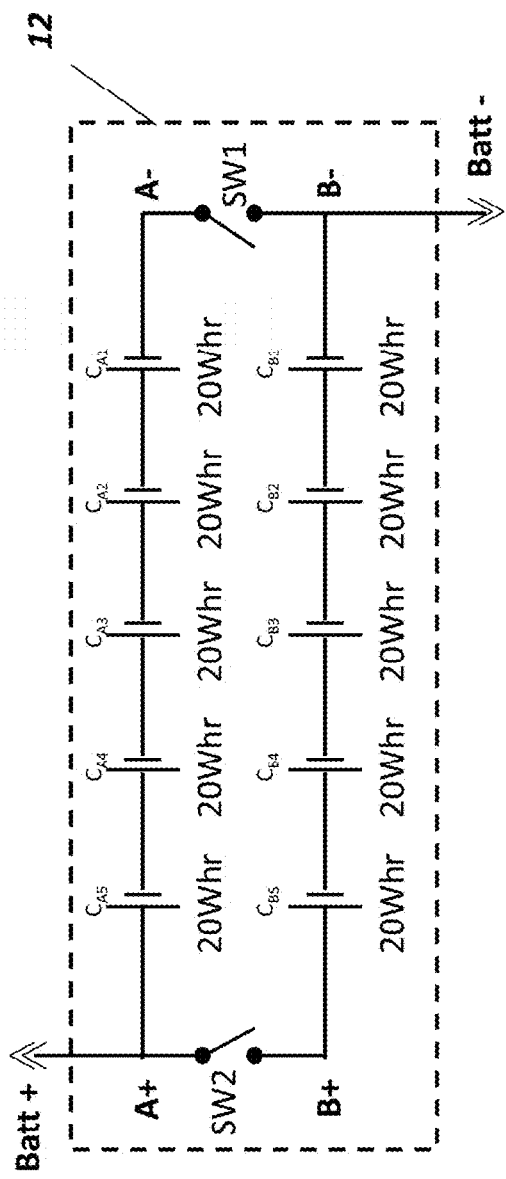
FIG. 25 is a simple circuit diagram of the battery cells of the battery pack of FIG. 1 in the transport configuration of FIG. 23.

As illustrated in FIG. 23, the battery pack is configured to present a zero voltage. The sets of battery cells 34a, 34b are decoupled. In such a configuration, electrically speaking, the two switch contacts 60a (S1), 60B (S2) do not make mechanical and electrical contact with any of the contact pads 66. FIG. 24 illustrates an alternate presentation of FIG. 23 in which the switch contacts 60a, 60b do not make mechanical and electrical contact with the contact pads 66 and decouple the sets of battery cells 34a, 34b. FIG. 25 illustrates an electrical circuit diagram which illustrates electrical switches (SW1, SW2) representative of the physical switches created by the switch contacts 60 and the contact pads 66. As illustrated, when the switch contact 60a decouples the first A– contact pad 66 and the B– contact pad 66 the power switch SW1 is opened (in an opened state) and when the switch contact 60b decouples the A+ contact pad 66 and the first B+ contact pad 66 the power switch SW2 is opened (in an opened state). As such, in this opened/transport configuration, the A string (set) of battery cells 34a and the B string (set) of battery cells 34b are electrically disconnected by the switch network made up of power switches SW1, SW2 and SW3.

Figure 26:
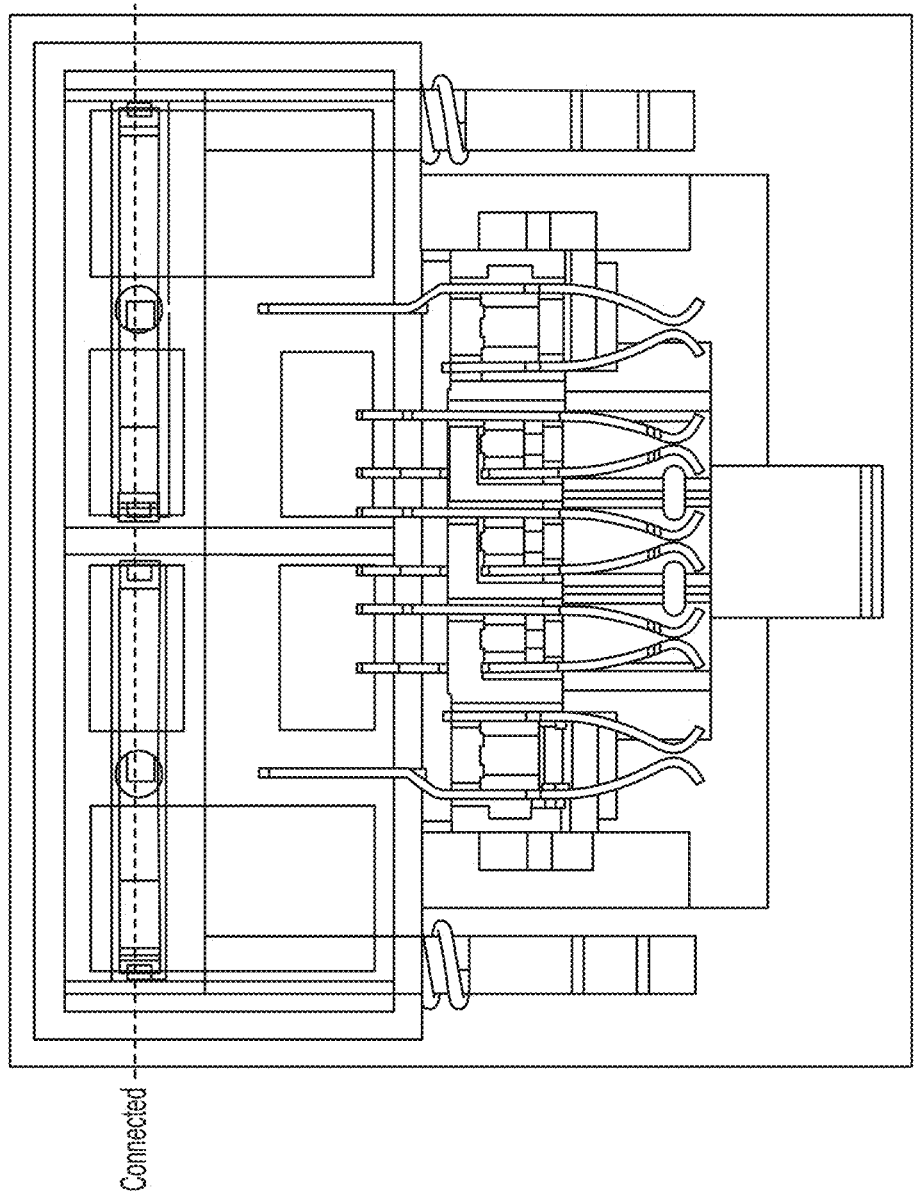
FIG. 26 is a picture view of the converting subsystem of FIG. 19 in a second operational configuration.
Figure 27:
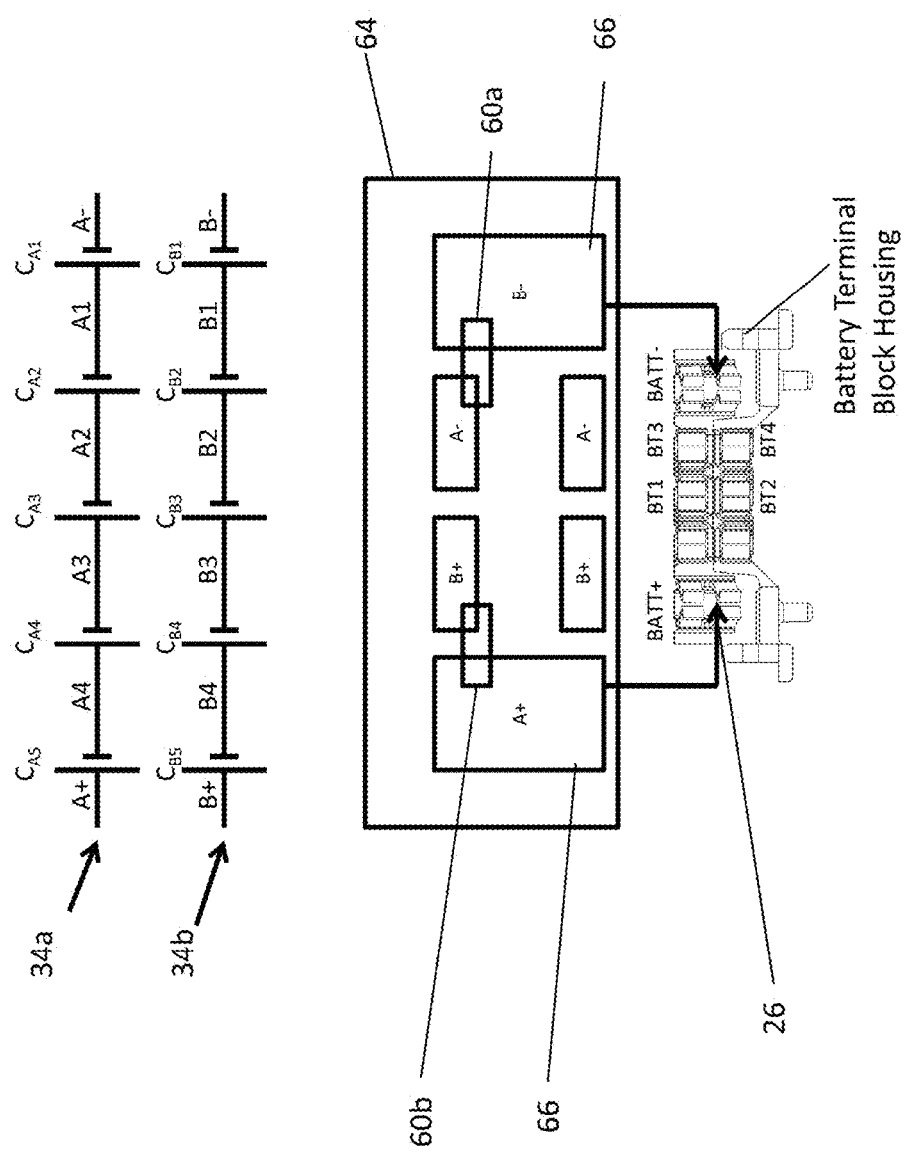
FIG. 27 is a simple block diagram of the battery pack converting subsystem of FIG. 26 in the second operational configuration and a simple circuit diagram of the battery cells of the battery pack of FIG. 1.
Figure 28:
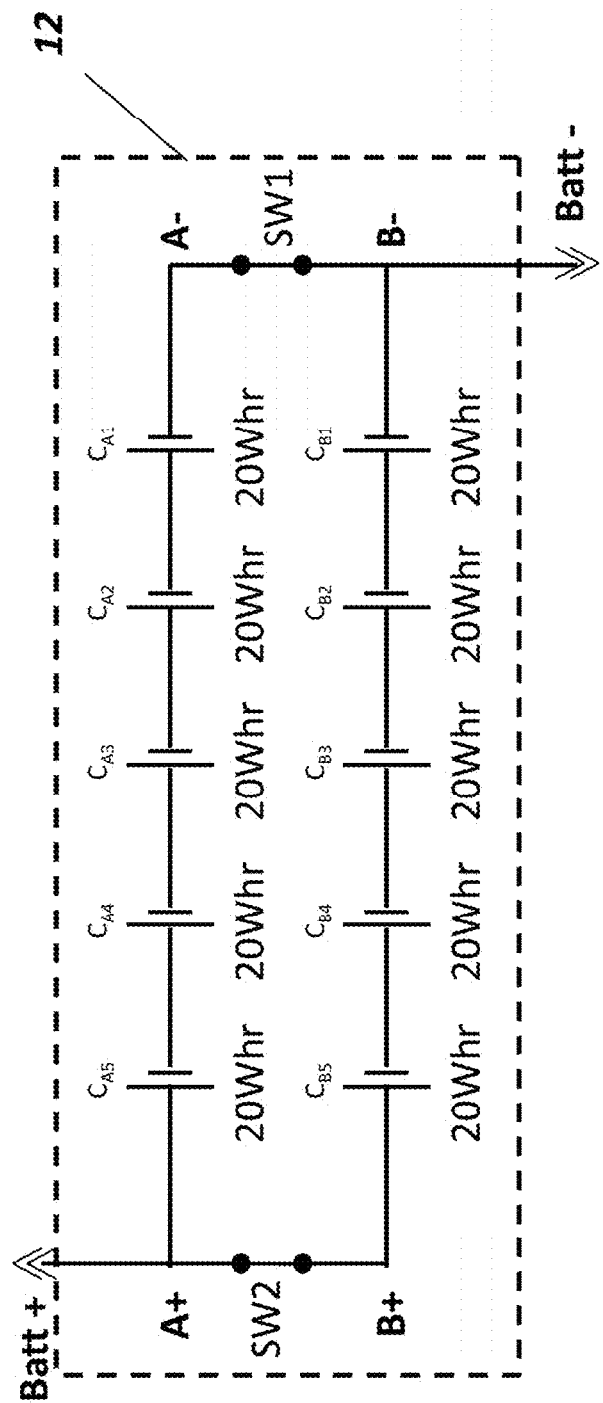
FIG. 28 is a simple circuit diagram of the battery cells of the battery pack of FIG. 1 in the second operational configuration of FIG. 26.

As illustrated in FIG. 26, the battery pack is configured to present the first rated voltage. The sets of battery cells 34a, 34b are coupled in parallel. In such a configuration, electrically speaking, the two switch contacts 60a (S1), 60B (S2) make mechanical and electrical contact with the contact pads 66 to couple the sets of battery cells 34a, 34b in parallel. FIG. 27 illustrates an alternate presentation of FIG. 26 in which the switch contacts 60a, 60b make mechanical and electrical contact with the contact pads 66 to couple the sets of battery cells 34a, 34b in parallel. FIG. 28 illustrates an electrical circuit diagram which illustrates electrical switches (SW1, SW2) representative of the physical switches created by the switch contacts 60 and the contact pads 66. As illustrated, as the switch contact 60a couples the A– contact pad 66 and the B– contact pad 66 the power switch SW1 is closed (in a closed state) and the switch contact 60b couples the A+ contact pad 66 and the B+ contact pad 66 the power switch SW2 is closed (in a closed state). As such, in this rated configuration, the A string (set) of battery cells 34a and the B string (set) of battery cells 34b are electrically connected in parallel by the switch network made up of power switches SW1 and SW2.

Alternate exemplary embodiments may include other contact pad layouts and are contemplated and encompassed by the present disclosure. As noted above, these exemplary pad layouts may be supported on a PCB, a support board or some other support structure.

Figure 29:
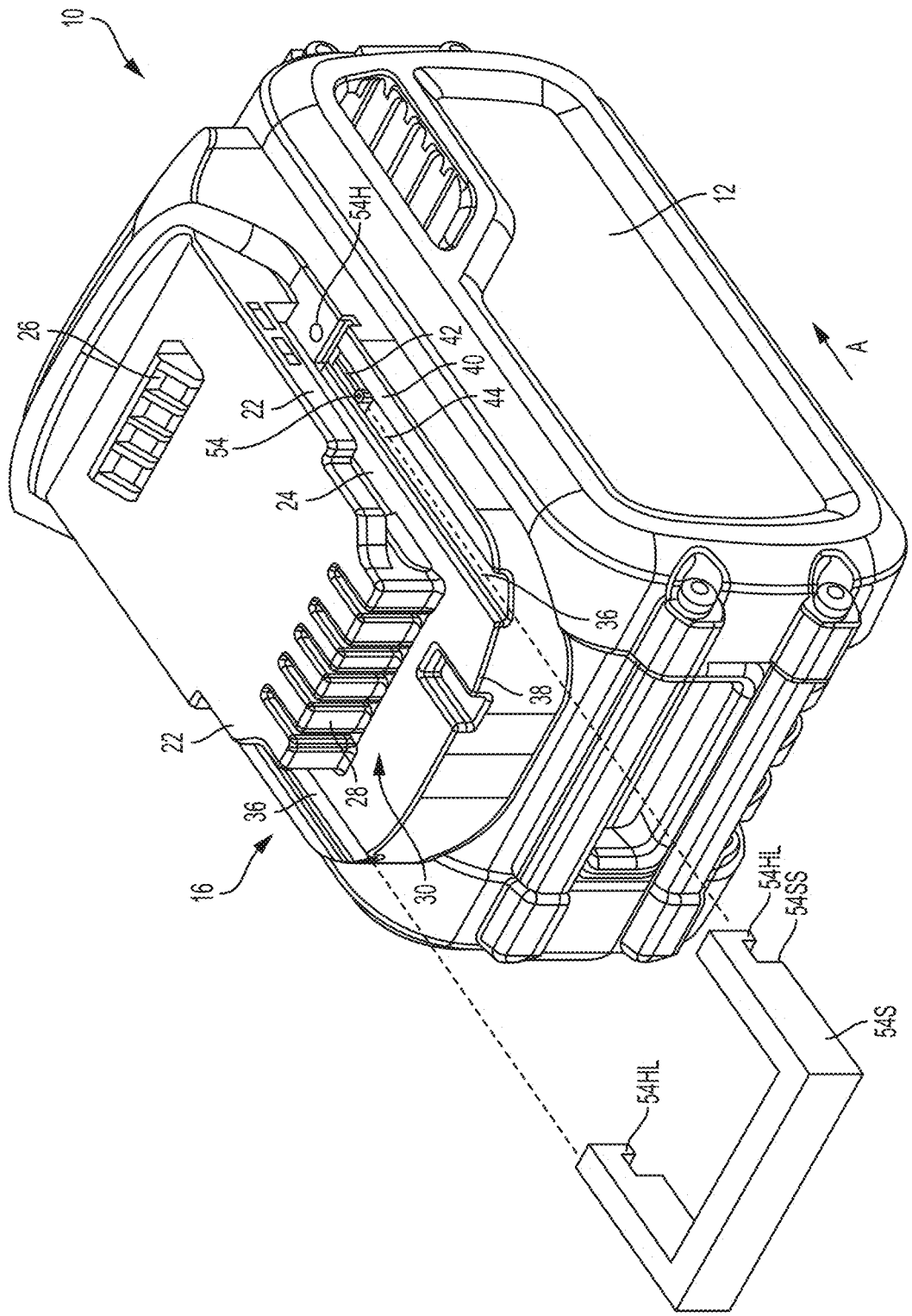
FIG. 29 is a view of an exemplary coupler for use with an exemplary convertible battery pack.

Another alternate exemplary embodiment of a coupler/transport lock (also referred to as a separator) is shown in FIG. 29. In this embodiment, the separator is shown as a sliding member 54S, which preferably has at least one contact surface 54SS for contacting the projection(s) 54. The contact surface 54SS may move the projection(s) 54 from the first end of the through hole 42 to an intermediate position between the first and second ends of through hole 42. In such a position, the switches SW1, SW2 are in an open state so that each string of battery cells has an energy equal to or less than 100 Watt-hours, as the different subsets A, B, C of cells 48 ($C_{A1}$-$C_{A5}$, $C_{B1}$-$C_{B5}$ and $C_{C1}$-$C_{C5}$) are electrically disconnected, thus complying with shipping regulations.

In order to maintain the projection(s) 54 in the intermediate position, it is preferable to provide a locking mechanism on sliding member 54S. In particular, sliding member 54S may have projections 54HL which engage holes 54H on battery pack 10. Persons skilled in the art shall recognize that the projections 54HL and holes 54H may be provided instead on battery pack 16 and sliding member 54S, respectively.

In order to maintain the projection(s) 54 in the intermediate position, it is preferable to provide a locking mechanism on sliding member 54S. In particular, sliding member 54S may have projections 54HL which engage holes 54H on battery pack 16. Persons skilled in the art shall recognize that the projections 54HL and holes 54H may be provided instead on battery pack 16 and sliding member 54S, respectively.

Figure 30:
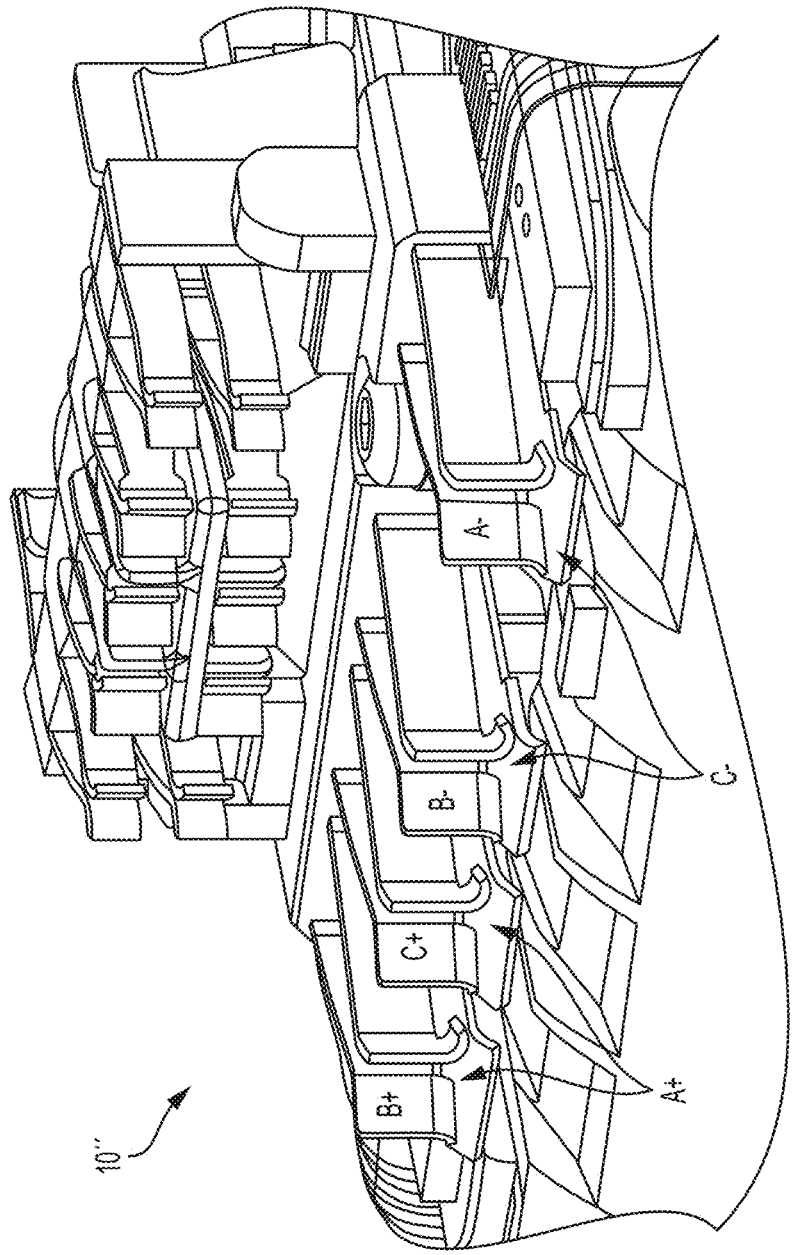
FIG. 30 is an alternate exemplary embodiment of a set of battery pack terminals of a convertible battery pack.
Figure 31:
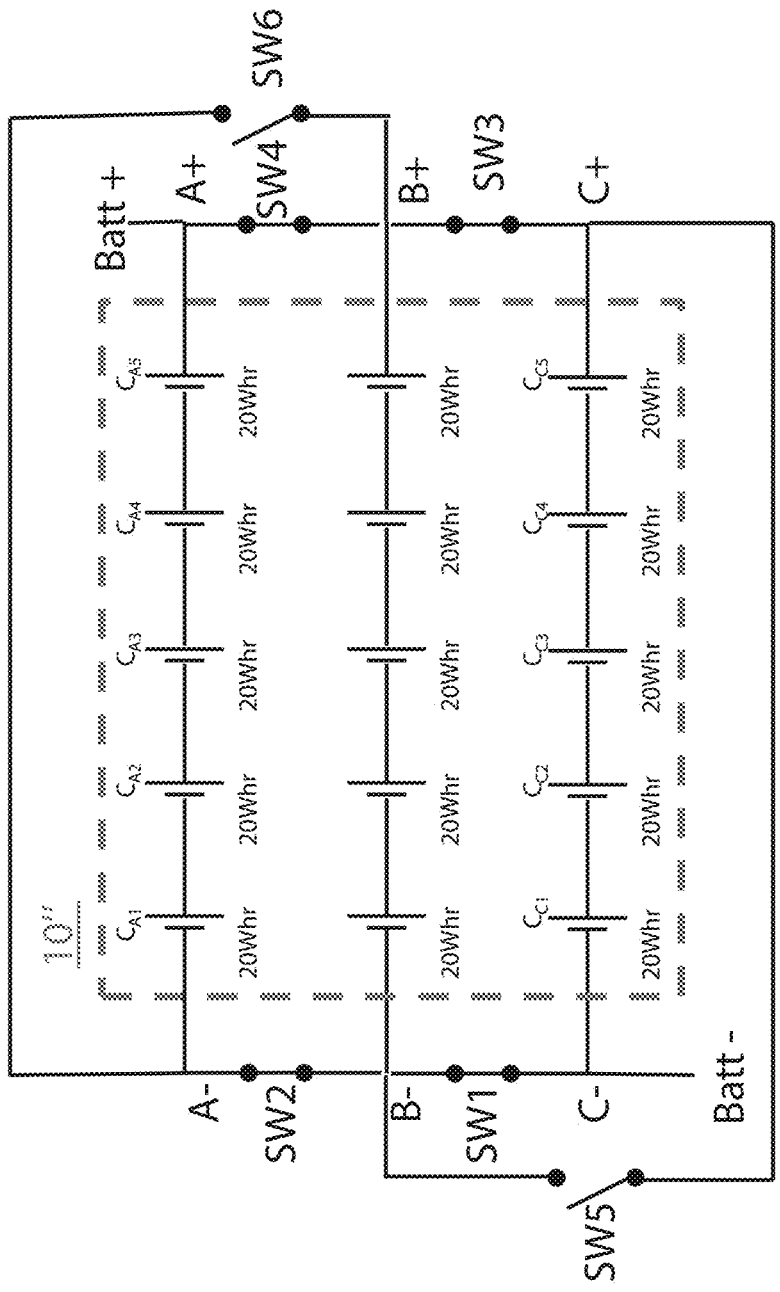
FIG. 31 is a simple circuit diagram of the battery cells of the battery pack of FIG. 30 in a first operational (low rated voltage) configuration.
Figure 32:
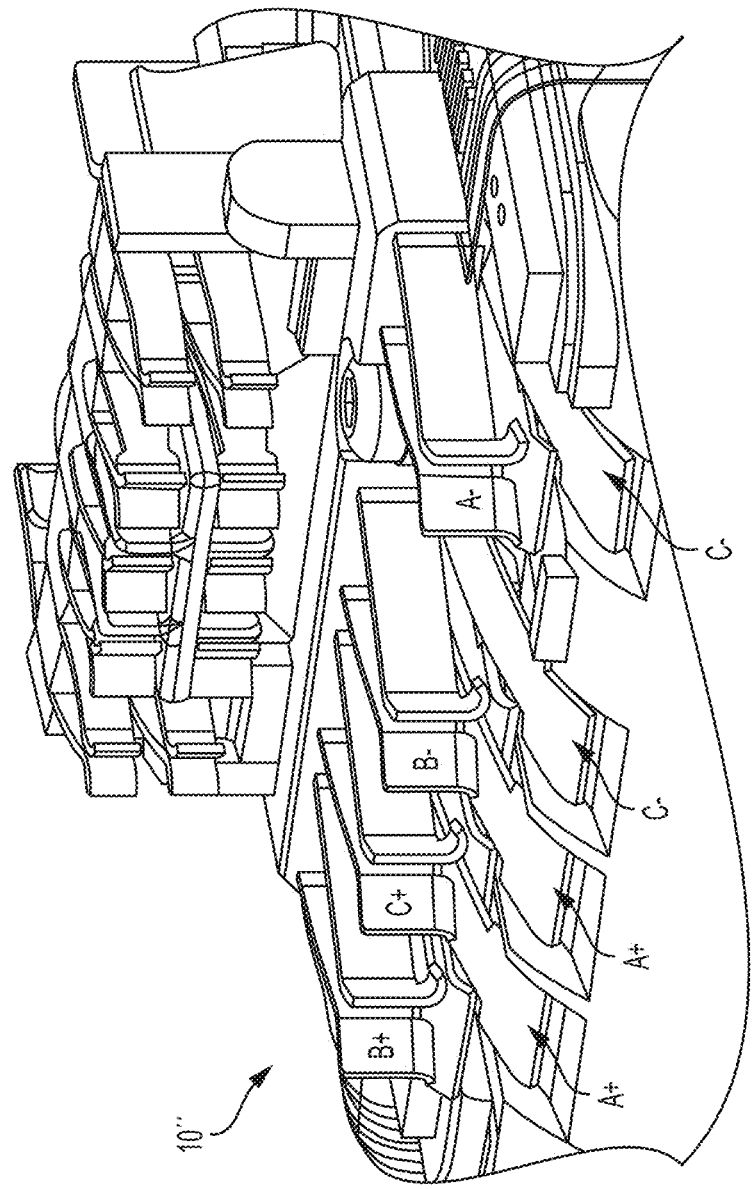
FIG. 32 is a picture view of the set of battery pack terminals of the convertible battery pack of FIG. 30 in an open state.
Figure 34:
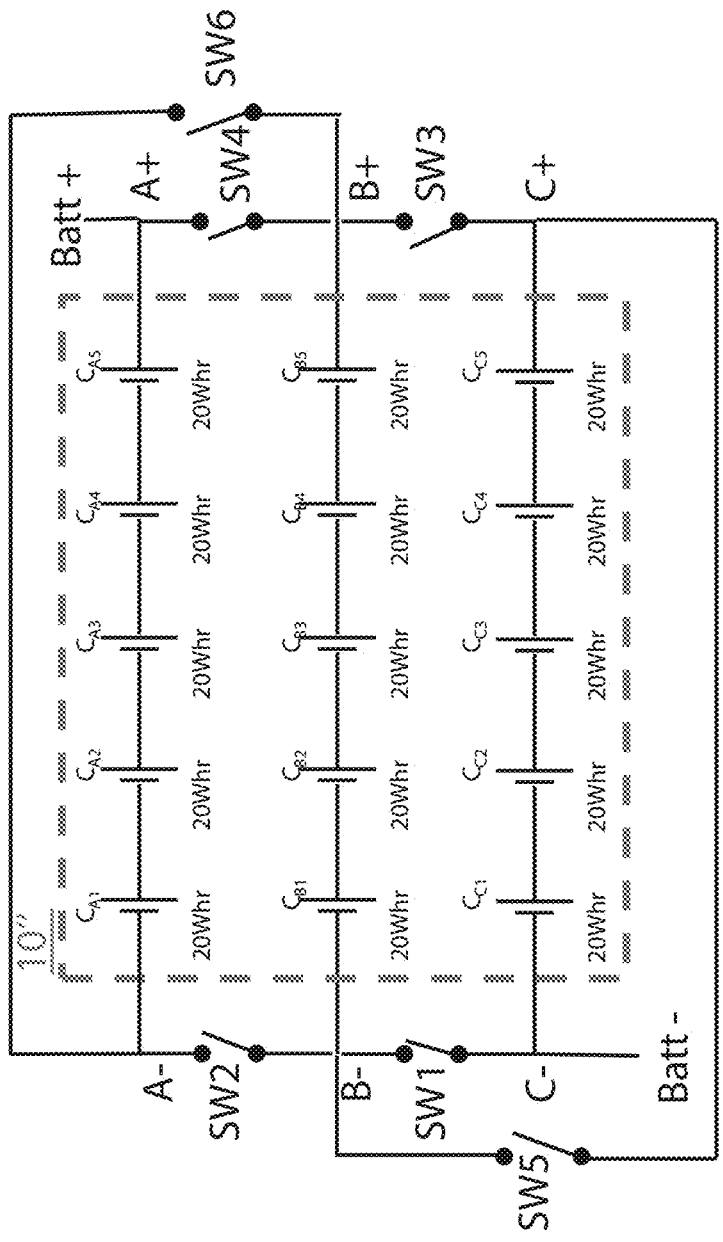
FIG. 34 is a simple circuit diagram of the battery cells of the battery pack of FIG. 30 in a transport configuration.
Figure 35:
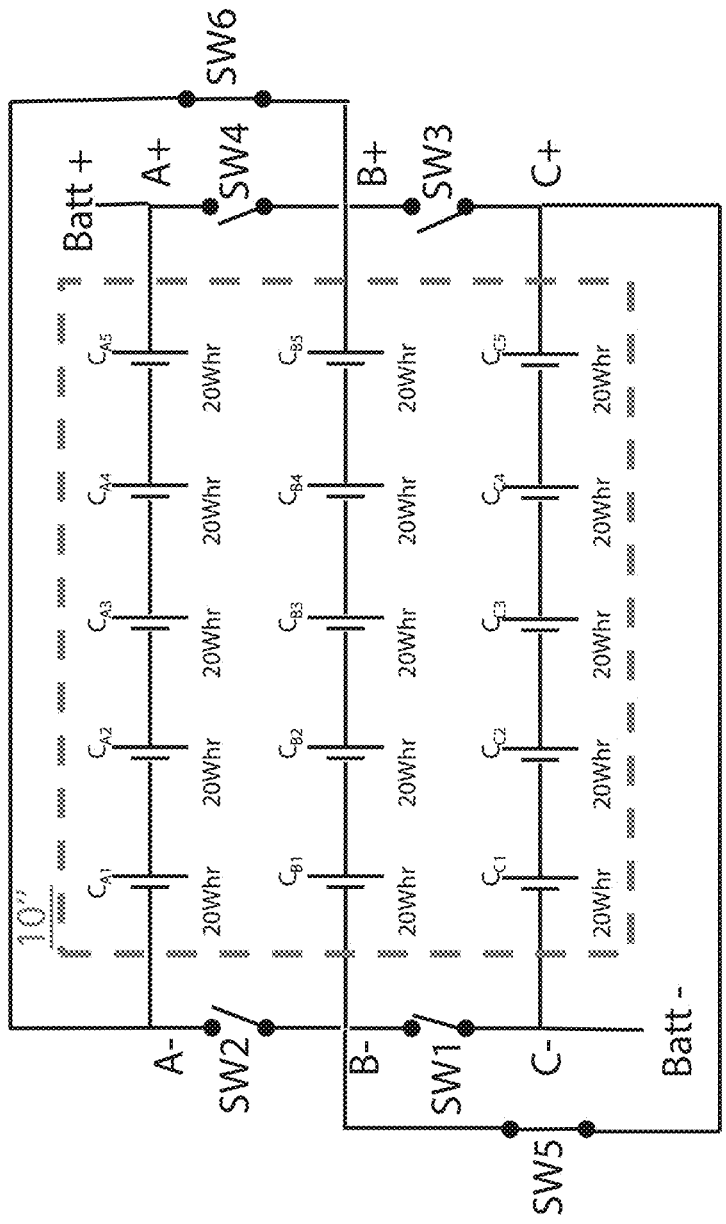
FIG. 35 is a simple circuit diagram of the battery cells of the battery pack of FIG. 30 in a second operational (medium rated voltage) configuration.
Figure 36:
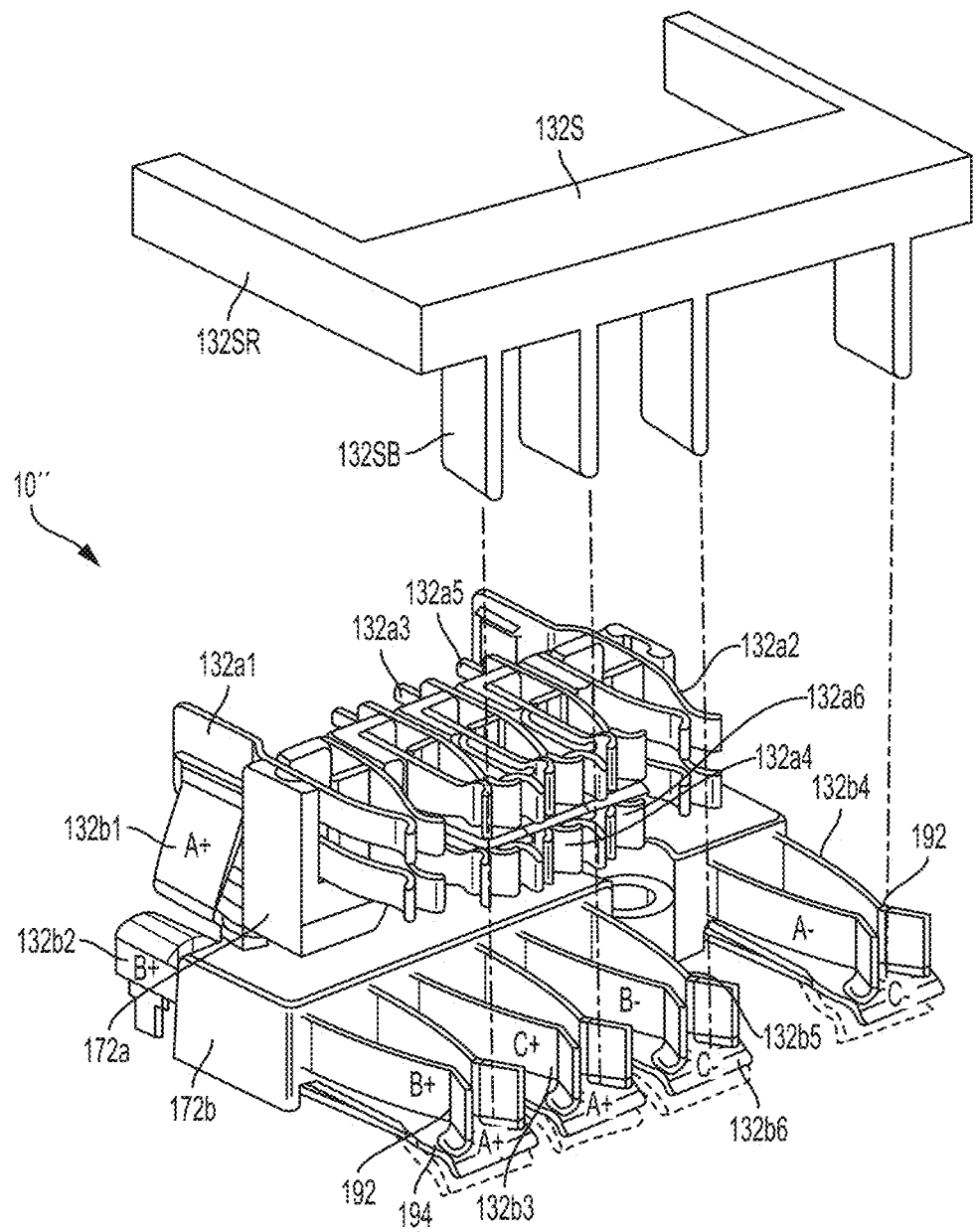
FIG. 36 is a view of an alternate exemplary embodiment of a coupler for use with the exemplary set of battery pack terminals of FIG. 32.
Figure 37B:
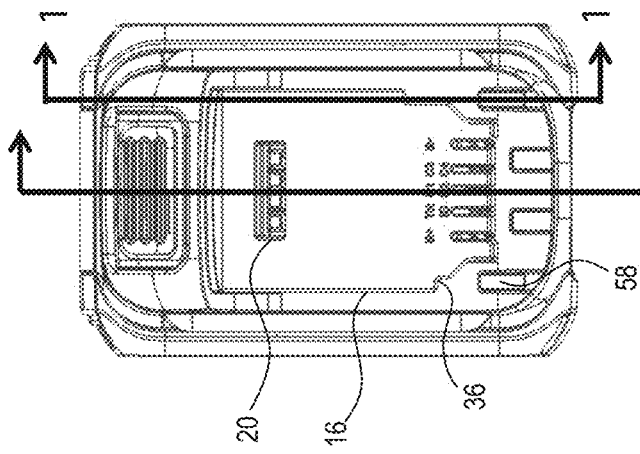
FIGS. 37A, 37B, and 37C are various views of another example of a convertible battery pack.
Figure 37C:
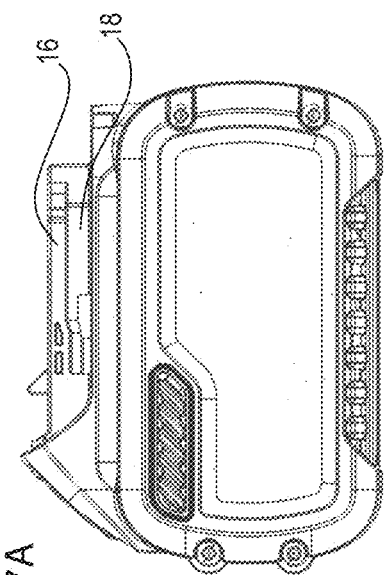
Figure 37A:
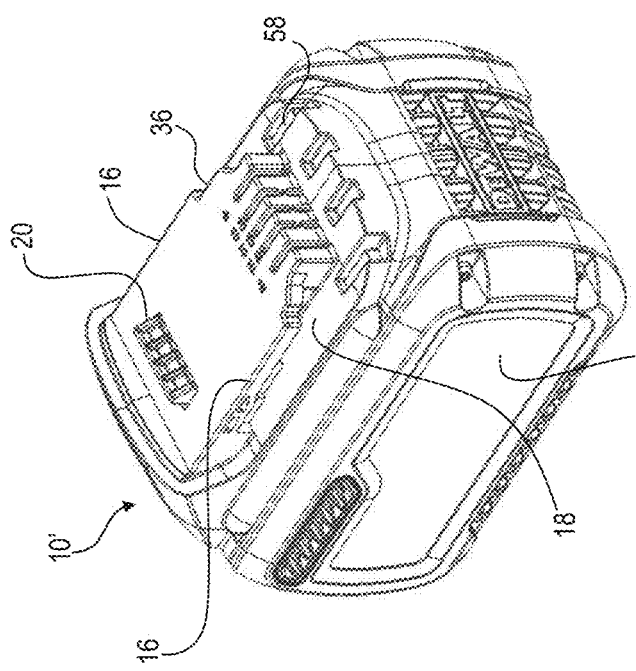
Figure 40:
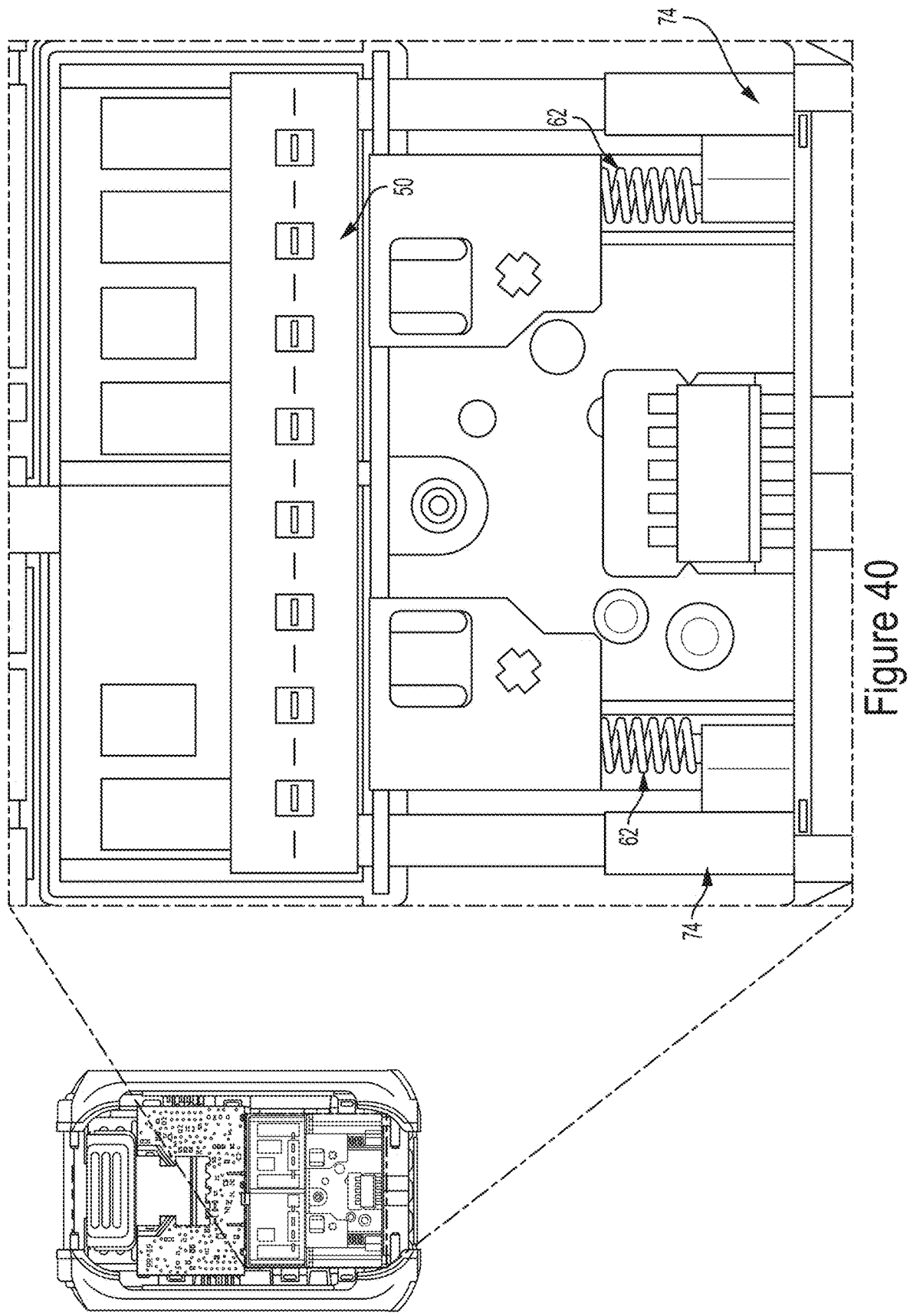
FIG. 40 is a pictorial of the converter element of the exemplary battery pack of FIG. 37 in a first position.
Figure 41:
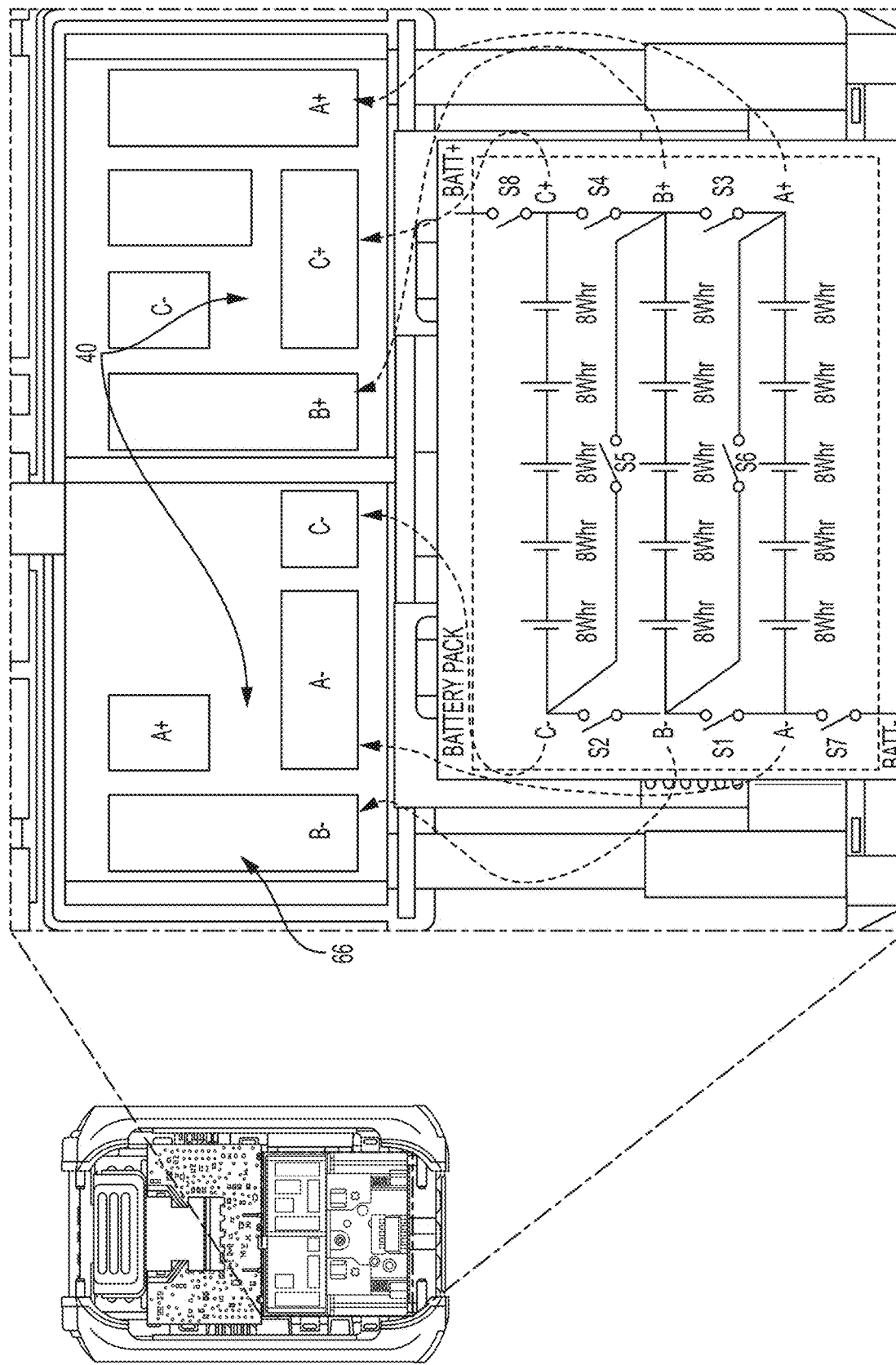
FIG. 41 is a partial schematic/partial pictorial illustration of terminal connections in the exemplary convertible battery pack of FIG. 37.
Figure 42:
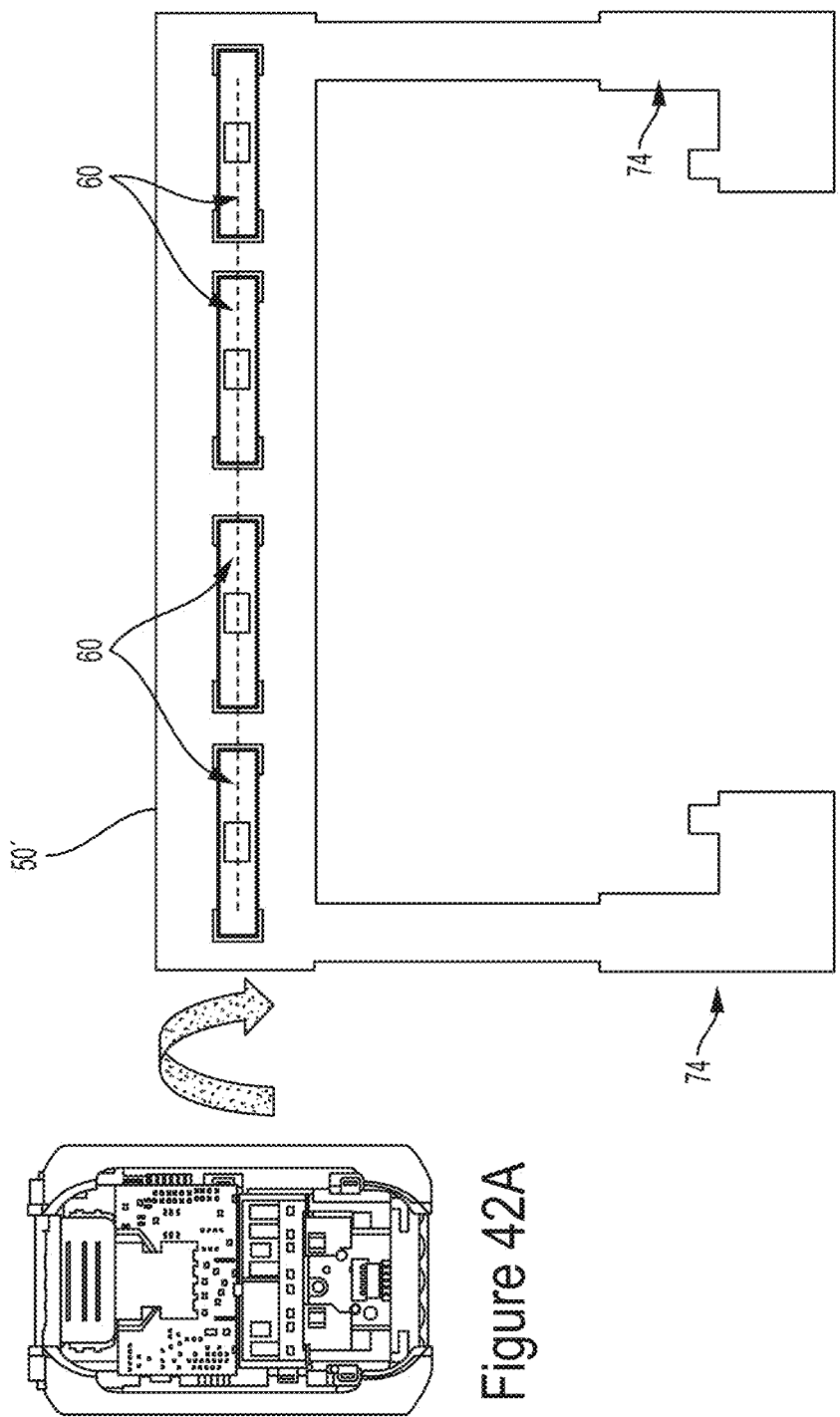
FIG. 42A is a pictorial of the exemplary battery pack of FIG. 37 including the converter element and 42B is a is a pictorial of an underside of the converter element of the exemplary battery pack of FIG. 37.
Figure 43:
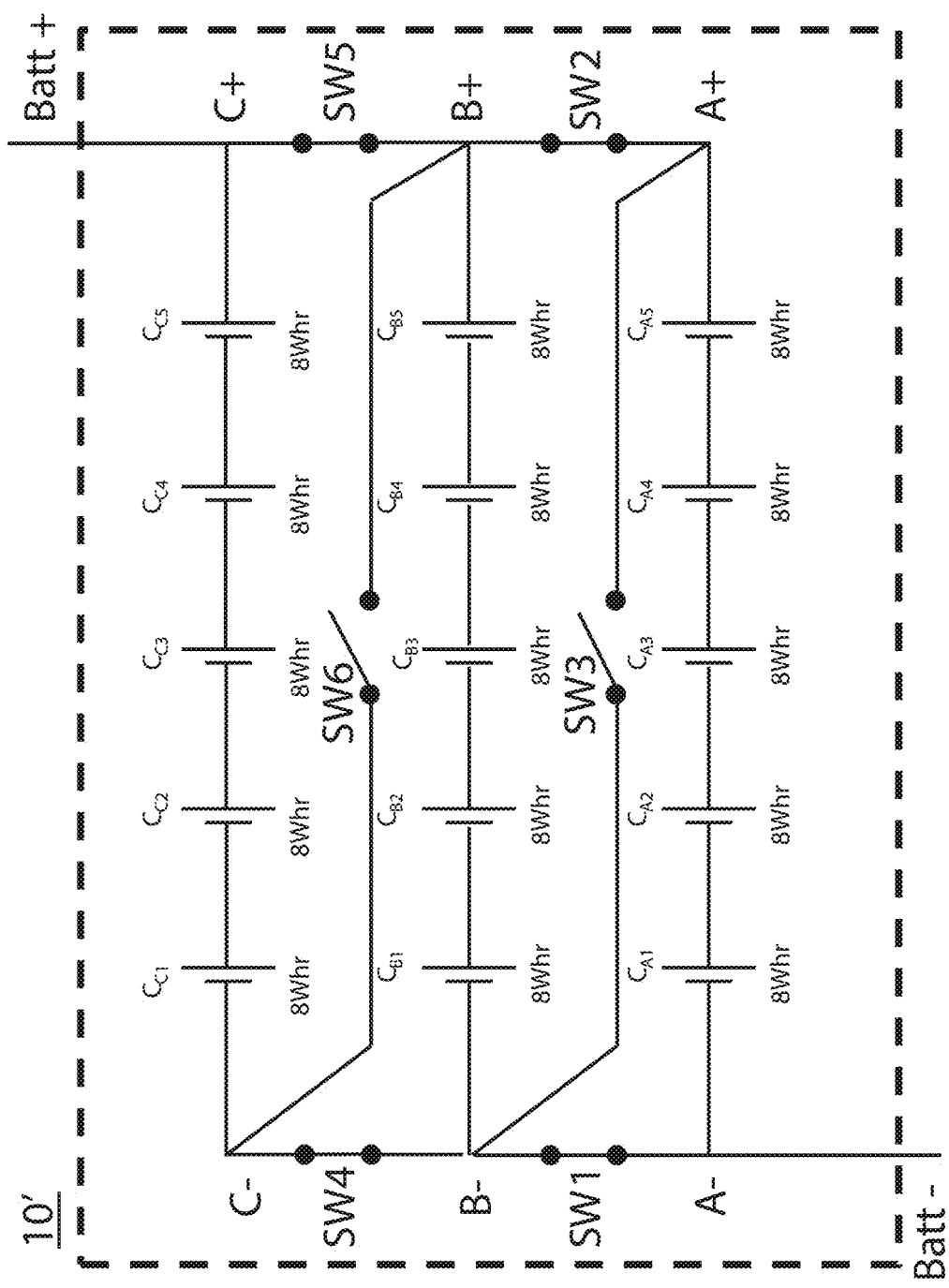
FIG. 43 is a schematic diagram of the exemplary convertible battery pack of FIG. 37 in a first operational mode.
Figure 44B:
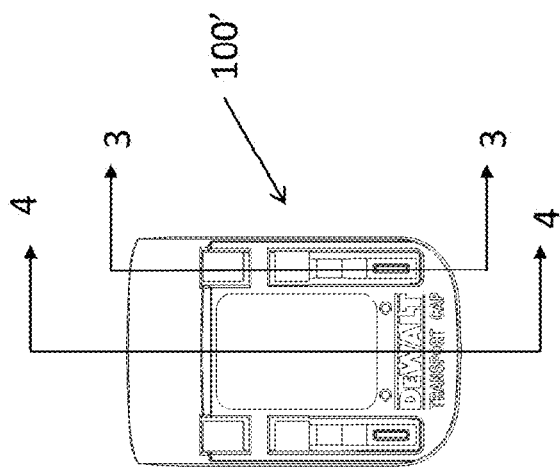
Figure 44C:
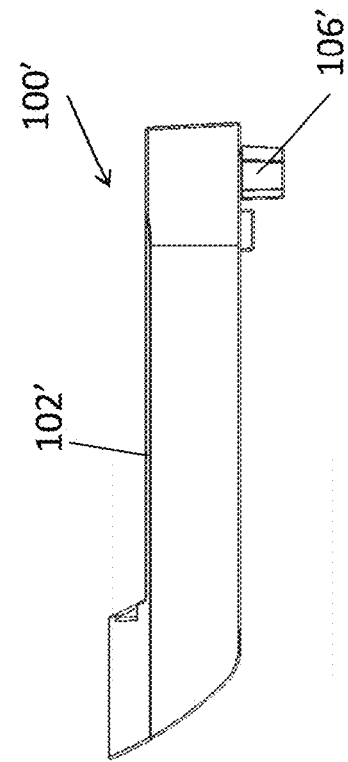
Figure 44A:
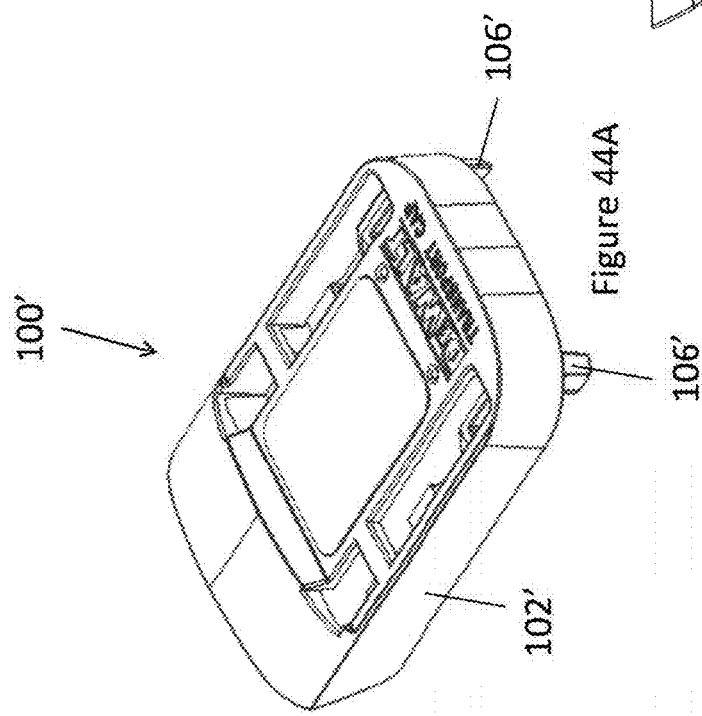
Figure 48:
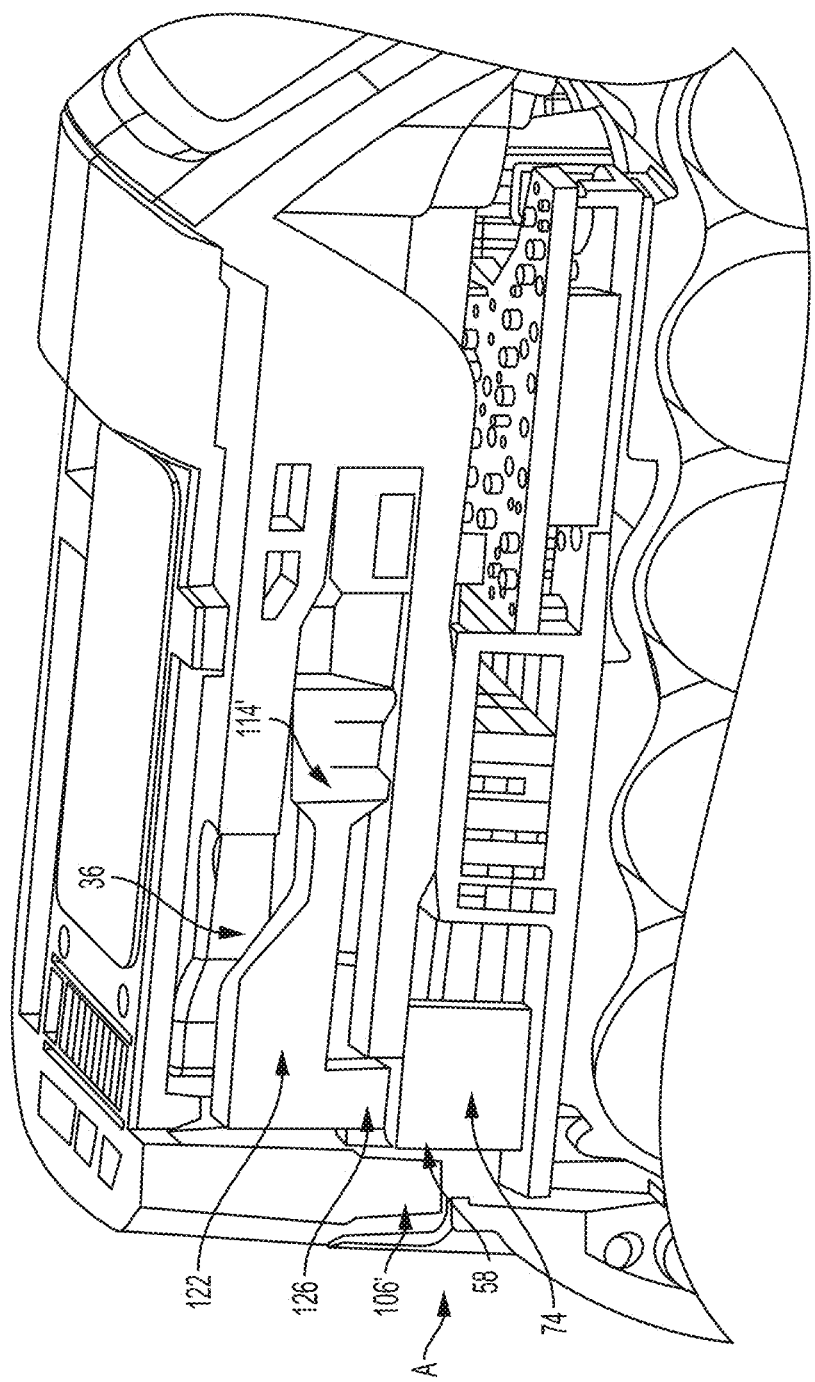
FIG. 48 is a schematic diagram of the exemplary convertible battery pack of FIG. 37 in a second operational mode.

FIGS. 30-35 illustrate an alternate exemplary embodiment of a convertible battery pack 10" and a lock 100" that may be used in conjunction with the battery pack 10" for transport purposes. As illustrated in FIG. 30, the battery pack 10" includes a first set of battery pack terminals It may be desirable to allow the end user to set battery pack 10" to shipping mode for transportation thereof, even after the end user has used battery pack 10". FIG. 36 provides a possible solution for the battery terminal block 172 illustrated in FIG. 30. A terminal coupler/decoupler 132S preferably has blades 132SB made of an electrically non-conductive or insulating material, such as a non-conductive plastic. Blades 132B can be inserted between (and thus separating) the tulip sections 192 of the conversion terminals 132b2, 132b3, 132b4, 132b5. In addition, blades 132SB are long enough that they extend beyond the tulip sections 192 and push against the contact section 194 of the associated conversion terminal 132b1, 132b6, so that the contact section 194 of the conversion terminals 132b1, 132b6 move toward the position shown in broken lines in FIG. 36. In such position, the contact section 194 of the conversion converting terminals 132b1, 132b6 do not contact the tulip sections 192 of each conversion terminal 132b2, 132b3, 132b4, 132b5. For example, blade 132SB would push the contact section 194 of the conversion terminal 132b6 away from tulip section 192 of the conversion terminal 132b5.

Persons skilled in the art will recognize that battery pack 10" can be transported with terminal separator 132S in place. With such arrangement, battery pack 10" would comply with the shipping regulations as each battery cell has a power output equal to or less than 20 Watt-hours and the total power output of the battery pack to equal to or less than 100 Watt-hours per battery pack, as the different subsets of cells 32 (A1-A5, B1-B5 and C1-C5) are electrically disconnected. In order for the end user to use battery pack 10", the end user needs only to remove terminal separator 132S from the housing of battery pack 10". This will allow the conversion terminals to contact and connect, allowing battery pack 10" to operate as discussed above. In addition, end user could re-install terminal separator 132S to separate the converting terminals as disclosed above, readying battery pack 10" for transportation.

As shown in FIG. 36, terminal separator 132S can be inserted by moving downwardly, i.e., in a direction of arrow C substantially perpendicular to the longitudinal axes of rails 16 and grooves 18. Persons skilled in the art will also recognize that an alternative terminal separator 132S may have extensions 132SR that can engage rails 16 and/or grooves 18. Such alternative terminal separator 132S may be inserted into the terminals by moving it along a direction substantially parallel to the longitudinal axes of rails 16 and grooves 18, so that the extensions 132SR can engage rails 16 and/or grooves 18. As before, blades 132SB would contact and push downward the contact section 194 of the associated conversion terminal 132b1, 132b6, so that the contact section 194 of the conversion terminals 132b1, 132b6 move toward the position shown in broken lines in FIG. 36. In such position, the contact section 194 of the conversion converting terminals 132*b*1, 132*b*6 do not contact the tulip sections 192 of each conversion terminal 132*b*2, 132*b*3, 132*b*4, 132*b*5. Blades 132SB would also preferably separate) the tulip sections 192 of the conversion terminals 132*b*2, 132*b*3, 132*b*4, 132*b*5.

FIGS. 37-52 illustrate an alternate exemplary embodiment of a convertible battery pack 10' and a transport lock 100' that may be used in conjunction with the battery pack 10" for transport purposes. The battery pack 10' is very similar to the battery pack 10 illustrated in FIGS. 1-18 and described above, except that the battery pack 10' includes three strings (sets) of battery cells 34 and includes additional switches SW4, SW5, SW6. The converter element 50' operates very similarly to the converter element 50 of battery pack 10. As illustrated in FIGS. 44-50 and described herein, the transport lock or cap 100' places the battery pack 10' in an open state such that it is in neither a low rated voltage configuration or state (20V mode) nor a medium rated voltage configuration or state (60V mode) very similarly to the transport lock 100 described above. From an electrical connections perspective, the conversion from the low rated voltage state (20V mode) to the medium rated voltage state (60V mode) is the same as described above and is implemented by movement of the converter element 50'. In other words, operation of the battery pack 10' described in this embodiment is very similar to the battery pack 10 described above with reference to FIGS. 1-18.

The transport lock 100', illustrated in FIGS. 44-48 slides onto the battery pack 10' in a manner similar to the transport lock 100 described above. The transport lock 100' inclues a pair of locking arms 122 that are connected to an underside of the cover plate 102' by a living hinge 114'. The locking arms 122 include a rail that is received in the battery groove 18. The locking arm 122 includes a locking projection 126 that extends from the locking arm 122 towards the battery pack 10'. The transport lock 100' also includes a conversion projection 106' that engages and pushes the converter element projection 58. The transport lock 100' also includes a catch 120 for receiving the battery pack latch 20 for locking the transport lock 100' to the battery pack 10'.

FIGS. 46A, 46B, 46C, 47A, 47B and 48 illustrate the transport lock 100' mated to the battery pack 10' thereby placing the battery pack 10' into the transportation configuration. As the transport lock 100' moves the direction A and mates with the battery pack 10', the rails of the locking arms 122 move into the grooves 18 of the battery pack 10' and the conversion projections 106' move into the raceways 28 of the battery pack 10' and engage the push arms 74 of the converter element projections 58. As the transport lock 100' continues to move in the A direction and moves the converter element 50, the converter element 50 moves the switch contacts 60 out of engagement with the contact pads 66, as described above, decoupling the strings of battery cells 34 thereby placing the battery pack 10' into the transport configuration. Simultaneously, as the transport lock 100' moves in the A direction, the battery rail shoulder 36 engages the locking arm 122 forcing the locking arm 122 to rotate about the connection point of the living hinge 114' and forces the locking projection 126 to press on the converter element projection 58 which in turn forces the converter element projection 58 to press on the converter element PCB 64 creating a frictional force between the converter element 50 and the PCB 64 to assist keeping the converter element 50 in the transport configuration.

As the transport lock 100' reaches the end of its travel, a forward portion of the cover plate 102' will begin to engage the battery pack latch 20 forcing the latch into the battery pack housing 12. When the transport lock 100' reaches its final position the battery pack latch 20 will be received in the transport lock catch 70. This will keep the transport lock 100' attached to the battery pack 10'.

As illustrated in FIG. 49, when the transport lock 100' is mated with the battery pack 10' the battery pack 10' is configured to present a zero voltage. The sets of battery cells 34*a*, 34*b* are decoupled. In such a configuration, electrically speaking, the four switch contacts 60*a* (S1), 60*b* (S2), 60*c* (S3), 60*d* (S4) do not make mechanical and electrical contact with any of the contact pads 66.

Figure 50:
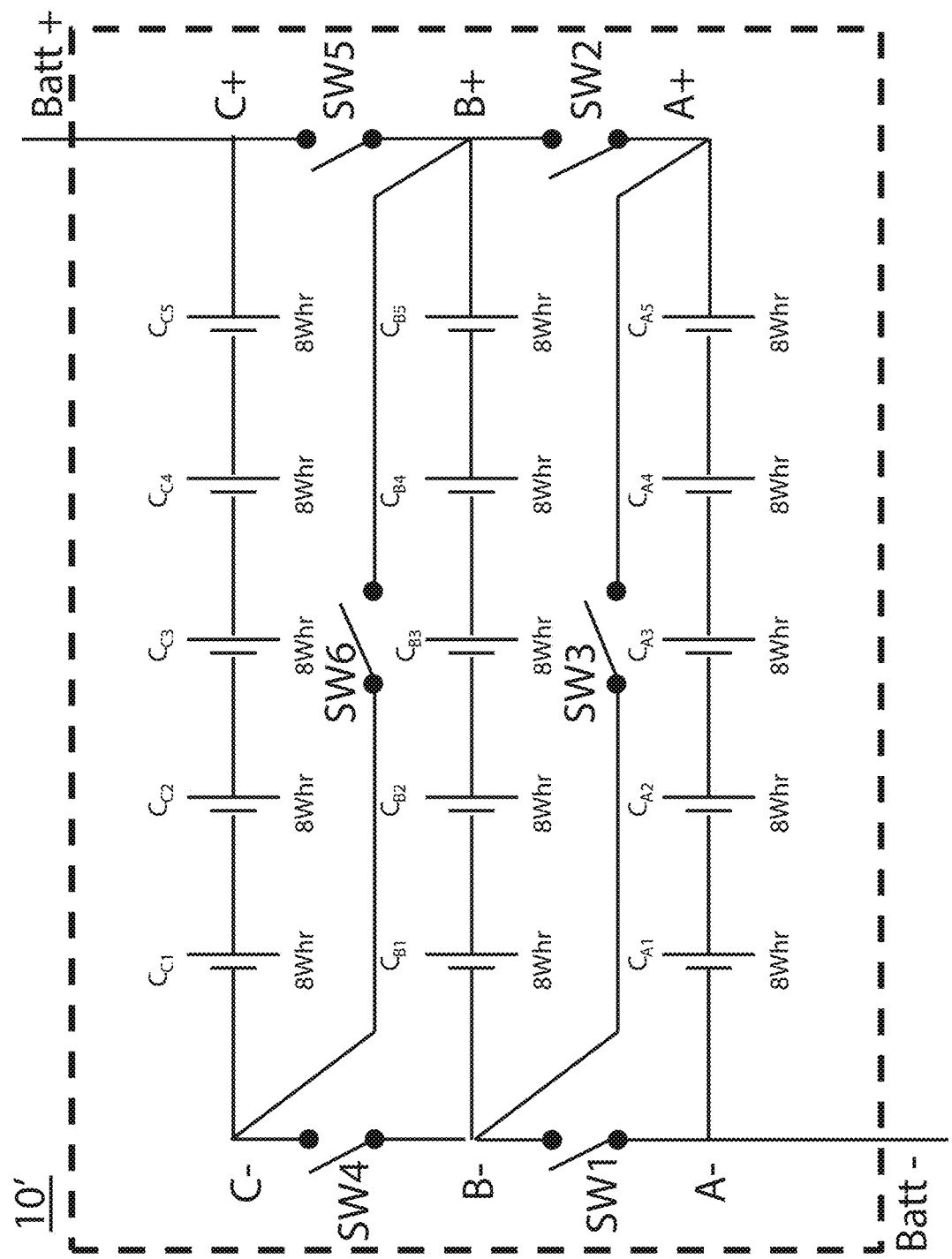
FIG. 50 is a pictorial section view of the exemplary battery pack mated to the exemplary transport lock.

FIG. 50 illustrates an electrical circuit diagram which illustrates electrical switches (SW1, SW2, SW3, SW4) representative of the physical switches created by the switch contacts 60 and the contact pads 66. As illustrated, when the switch contact 60*a*, 60*b*, 60*c* and 60*d* are moved along with the converter element 50 the A− contact pad 66 is decoupled from the B− contact pad 66, the A− contact pad 66 is decoupled from the C-contact pad 66, the C+ contact pad 66 is decoupled from the B+ contact pad 66 and the C+ contact pad 66 is decoupled from the A+ contact pad 66 effectively causing the power switch SW1 to open (in an opened state), the power switch SW2 to open (in an opened state), the power switch SW3 to open (in an opened state) and the power switch SW4 to open (in an opened state) and as no switch contact couples the A+ contact pad 66 to the B− contact pad 66 and no switch contact couples B+ contact pad 66 to the C-contact pad 66, the power switches SW5 and SW6 are open (in an opened state). As such, in this opened/transport configuration, the A string (set) of battery cells 34*a*, the B string (set) of battery cells 34*b*, and the C string (set) of battery cells 34*c* are electrically disconnected by the switch network made up of power switches SW1, SW2, SW3, SW4, SW5, and SW6.

Figure 51:
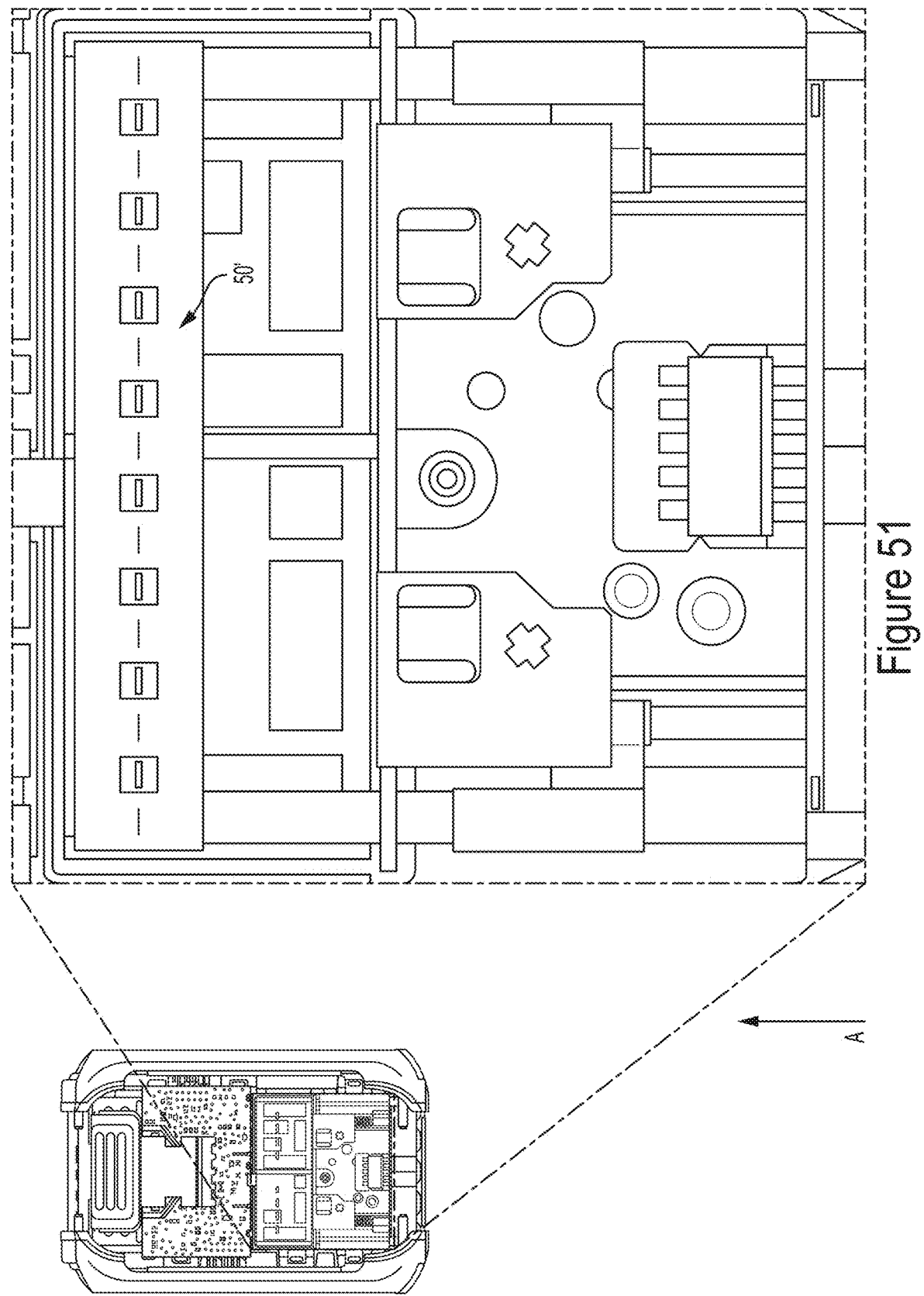
FIG. 51 is a pictorial of the converter element of the exemplary battery pack of FIG. 37 in a third position.
Figure 52:
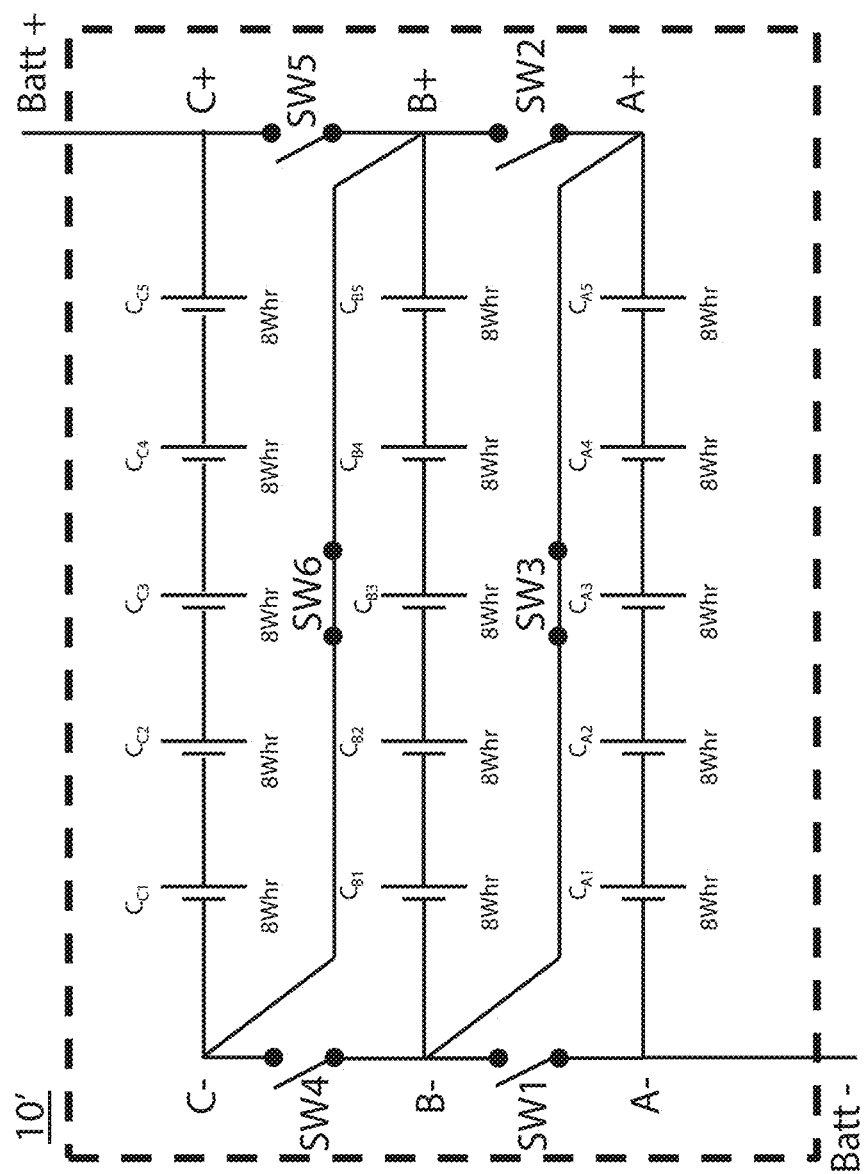
FIG. 52 is a schematic diagram of the exemplary convertible battery pack of FIG. 37 in a third operational mode.
Figure 55:
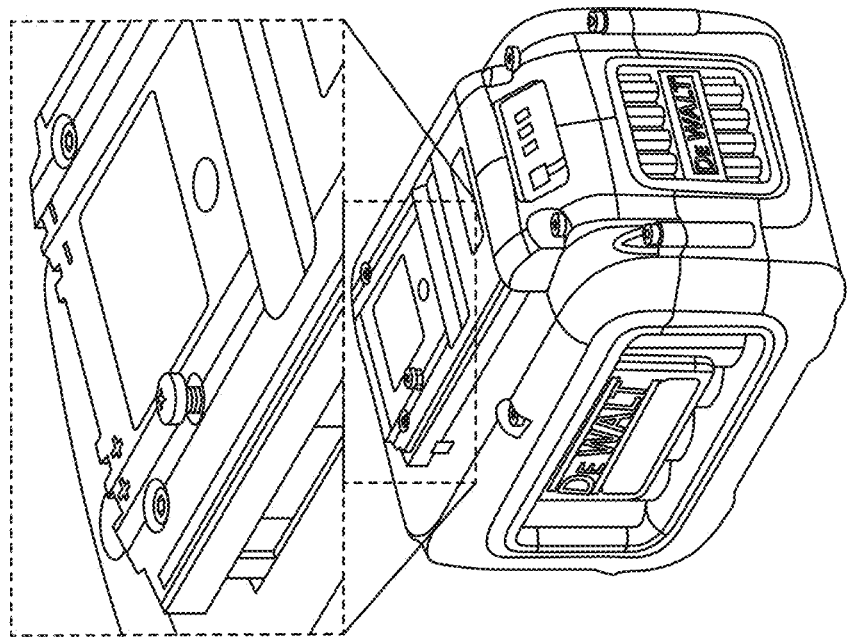
FIG. 55 is an alternate exemplary embodiment of a battery pack including an alternate exemplary embodiment of a transport system.

As illustrated in FIG. 51, the battery pack is configured to present a second (medium) rated voltage. The sets of battery cells 34*a*, 34*b*, 34*c* are coupled in series. In such a configuration, electrically speaking, the four switch contacts 60*a* (S1), 60*b* (S2), 60*c* (S3), 60*d* (S4) make mechanical and electrical contact with the contact pads 66 to couple the sets of battery cells 34*a*, 34*b*, 34*c* in series. FIG. 52 illustrates an electrical circuit diagram which illustrates electrical switches (SW1, SW2, SW3, SW4) are representative of the physical switches created by the switch contacts 60 and the contact pads 66. As illustrated, as the switch contact 60*a* does not couple the A+ contact pad 66 and the C+ contact pad 66, the switch contact 60*b* does not cououpled the C+ contact pad and the B+ contact pad, the switch contact 60*c* does not couple the A− contact pad 66 and the C-contact pad 66 and the switch contact 60*d* does not couple the A− contact pad 66 and the B− contact pad 66, the power switch SW1 is open (in an opened state), the power switch SW2 is open (in an opened state), the power switch SW3 is open (in an opened state), and the power switch SW4 is open (in an opened state).

As the switch contact 60*b* couples the C-contact pad 66 to the B+ contact pad 66 the power switch SW6 is closed (in a closed state) and as the switch contact 60*d* couples the A+ contact pad 66 to the B+ contact pad 66 the power switch SW5 is closed (in a closed state). As such, in this medium rated configuration, the A string (set) of battery cells 34*a*, the B string (set) of battery cells 34*b*, and the C string (set) of battery cells 34*c* are electrically connected in series by the switch network made up of power switches SW1, SW2, SW3, SW4, SW5, and SW6.

FIG. 53A1 illustrates an alternate exemplary embodiment of a battery pack 500. The battery pack 500 includes two strings (sets) of battery cells 534*a*, 534*b*. Each string—the A string and the B string—includes five battery cells 532 connected in series. Each string of battery cells 534 has a positive terminal 536 and a negative terminal 538. In alternate embodiments, the battery pack 500 may include more strings of battery cells and each string may include fewer or more battery cells. The battery pack 500 includes a housing 512 that holds the battery cells 532. The battery pack 500 also includes a cell holder that maintains the position of each battery cell 532 relative to the other battery cells. The battery pack 500 also includes a battery pack terminal block 540. The battery pack terminal block 540 houses a plurality (set) of battery pack terminals 550. In this embodiment, the plurality of battery pack terminals 550 includes a positive battery pack terminal corresponding to each string of battery cells and a negative terminal corresponding to each string of battery cells. In this embodiment, there is a positive battery pack terminal for the A string of battery cells 550*a*, a positive battery pack terminal for the B string of battery cells 550*b*, a negative battery pack terminal for the A string of battery cells 550*c*, and a negative battery pack terminal for the B string of battery cells 550*d*.

The battery pack terminals 550 are electrically coupled to a corresponding terminal of the string of battery cells. More specifically, the positive A string battery pack terminal 550*a* is electrically connected to the positive terminal of the A string of battery cells 536*a*, the positive B string battery pack terminal 550*b* is electrically connected to the positive terminal of the B string of battery cells 536*b*, the negative A string battery pack terminal 550*c* is electrically connected to the negative terminal of the A string of cells 538*a* and the negative B string battery pack terminal 550*d* is electrically connected to the negative terminal of the B string of battery cells 538*b*. Furthermore, in a default state the positive battery pack terminals 550*a*, 550*b* are electrically connected to each other and the negative battery pack terminals 550*c*, 550*d* are electrically connected to each other. The positive terminals and the negative terminals may be formed in a tulip contacts configuration. Other configurations are contemplated by this disclosure.

As illustrated in FIG. 53A1, when the battery pack 500 is not connected to an electrical device, the positive A string battery pack terminal 550*a* is electrically connected to the positive B string battery pack terminals 550*b* and the negative A string battery pack terminal 550*c* is electrically connected to the negative B string battery pack terminal 550*d*. As such, as illustrated in FIG. 53A2, the two strings of battery cells 534 are connected to each other in parallel. This configuration is referred to as a coupled configuration or a working configuration.

As illustrated in FIG. 53B1, in order to separate the strings of battery cells 534 and thereby reduce the power level of the battery pack 500 for transport, a transport coupler/lock such as an insulator 560 is mated to the battery pack terminal block 540. The insulator 560 may be housed in a housing 562. The insulator 560 is made of any insulating material and shaped to extend from the coupler housing 562 and be inserted between the positive battery pack terminals 550*a*, 550*b* and the negative battery pack terminals 550*c*, 550*d*.

As illustrated in FIG. 53B2, when the insulator 560 is mated to the battery pack 500 and inserted between the battery pack terminals 550*a*, 550*b*, 550*c*, 550*d* an effective electrical switch is opened between the strings of battery cells 534*a*, 534*b* thereby decoupling the strings of battery cells from each other. In this configuration, referred to as a transport state, the strings of battery cells 534 are electrically separated from each other. When the insulator 560 is removed from the battery pack 500, the battery pack terminals once again mate thereby coupling the strings of battery cells 534.

When the battery pack 500 mates with a corresponding mating interface of an electrical device (power tool) 566, a power tool terminal block 568 housing the power terminals 570 of the power tool 566 mate with the corresponding battey pack terminals 550 to provide power from the battery pack 500 to the tool 566. As illustrated in FIG. 53B2, once again, the strings of battery cells are electrically connected to each of in parallel.

FIG. 54 illustrates an alternate exemplary embodiment of a battery pack 600 and an alternate exemplary transport coupler/cap for use in conjunction with the battery pack 600. FIG. 54A1 illustrates the battery pack 600 mated to an electrical device (power tool) 610. The battery pack 600 includes a battery pack interface 602 that is configured to mate with a corresponding power tool interface 604. The interfaces 602, 604 may comprise a set of mating rails and grooves. The battery pack also includes a terminal block 606 for housing a set of battery pack terminals 607. The power tool also includes a terminal block 608 for housing a set of tool terminals 609. The battery pack terminal block 606 and battery pack terminals 607 are configured to mate with the tool terminal block 608 and tool terminals 609, as is well known in the art. The battery pack 600 includes battery cells and strings of battery cells similar to the battery cells and strings of battery cells described with regard to FIG. 53. The battery pack also includes a battery pack latch 620 for latching to the electrical device 610 and a compression spring 618 that forces the latch 620 to extend at least partially out of the battery pack housing 612 to be received by a corresponding catch 626 of a power tool 610. This is referred to as the up position.

The battery pack 600 also includes a first switch contact 622*a* attached to a first side of the battery pack latch 620 and a second switch contact 622*b* attached to a second side of the battery pack latch 620, the second side being opposed to the first side. Both sides of the latch 620 are located within the battery pack housing. The battery pack 600 also includes a positive A string contact pad 616*a*, a positive B string contact pad 616*b*, a negative A string contact pad 616*c*, and a negative B string contact pad 616*d*. The positive contact pads 616*a*, 616*b* are fixed to a first interior surface of the battery pack housing 612 adjacent to the first side of the battery pack latch 620 and the negative contact pads 616*c*, 616*d* are fixed to a second interior surface of the battery pack housing 612 adjacent to the second side of the battery pack latch 620. The positive contact pads 616*a*, 616*b* are positioned relative to each other such that they do not touch each other but so that they mate with the first switch contact 622*a* when the latch is in the up position and the negative contact pads 616*c*, 616*d* are positioned relative to each other such that they not touch each other but so that they mate with the second switch contact 622*b* when the latch is in the up position.

As illustrated in FIGS. 54A1 and 54A2, the battery pack 600 is mated to the power tool 610 and the latch 620 is in the up position received in the power tool catch. As such, the positive switch contact 622*a* couples the positive contact pads 616*a*, 616*b* effectively closing a switch SW2 between a positive A string terminal 550*a* and a positive B string terminal 550*b* and the negative switch contact 622*b* couples the negative contact pads 616*c*, 616*d* effectively closing a switch SW1 between a negative A string terminal 550*c* and a negative B string terminal 550*d* the corresponding contact pads 616*a*, 616*b*, 616*c*, 616*d*.

As illustrated in FIGS. 54B1, 54B2, 54B3, in order to place the battery pack 600 in a reduced power capacity state, a transport lock or cap 630 is attached to the battery pack 600. The cap 630 includes a connector 632 for connecting the cap to the battery pack housing 612. In this exemplary embodiment, the connector 632 comprises a set of legs and receiving catches to allow the cap 630 to be snapped onto the battery pack 600. The cap 630 has an interior cavity that receives the battery pack terminal block and latch 620. The interior height of the interior cavity is such that when the cap 630 is attached to the battery pack 600 an interior surface of the interior cavity forces the latch 618 into the battery pack housing 612 against the force of the spring 618. When the cap 630 is attached to the battery pack 600 and the latch 630 is forced into the battery pack housing 612, the switch contacts 622*a*, 622*b* decouple from the corresponding contact pads 616*a*, 616*b*, 616*c*, 616*d* effectively opening the switches SW1, SW2 between the corresponding battery string terminals. FIG. 54B3 illustrates the open switches SW1, SW2 between the string terminals.

FIGS. 55-60 illustrate an alternate embodiment of a shipping system for a battery pack. In this shipping system the battery pack includes a screw (or an equivalent component) that is received by the battery housing. The screw may be placed in two positions. A first, up or extended position in which the screw extends from the housing but is still held by the housing and a second down or inserted position in which the screw is screwed into the housing and lies generally flush with an outer surface of the housing.

Figure 57:
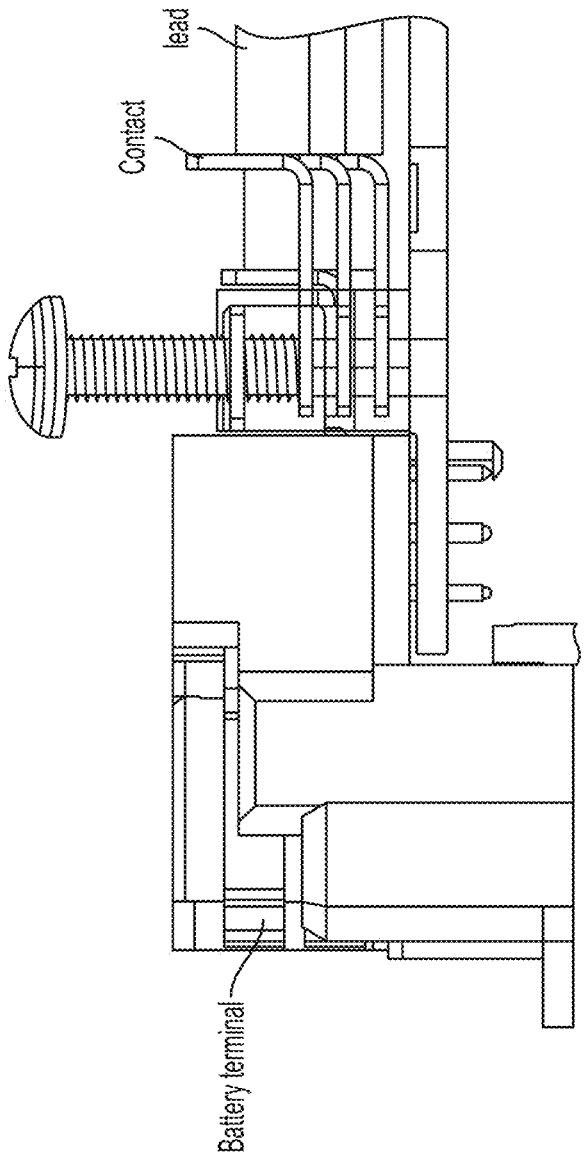
FIG. 57 is a picture view of the transport system of FIG. 56 in the transport configuration.
Figure 58:
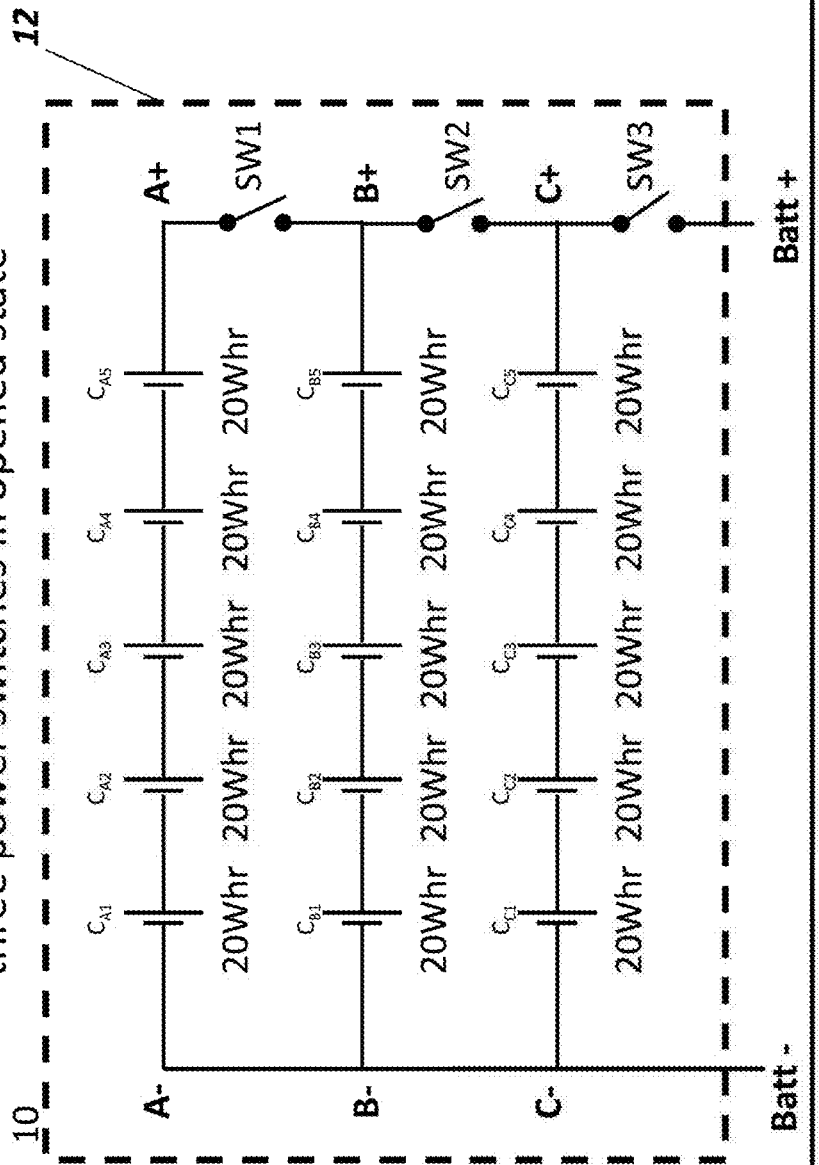
FIG. 58 is a simple circuit diagram of the battery cells of the battery pack of FIG. 1 in the transport configuration of FIG. 57.
Figure 59:
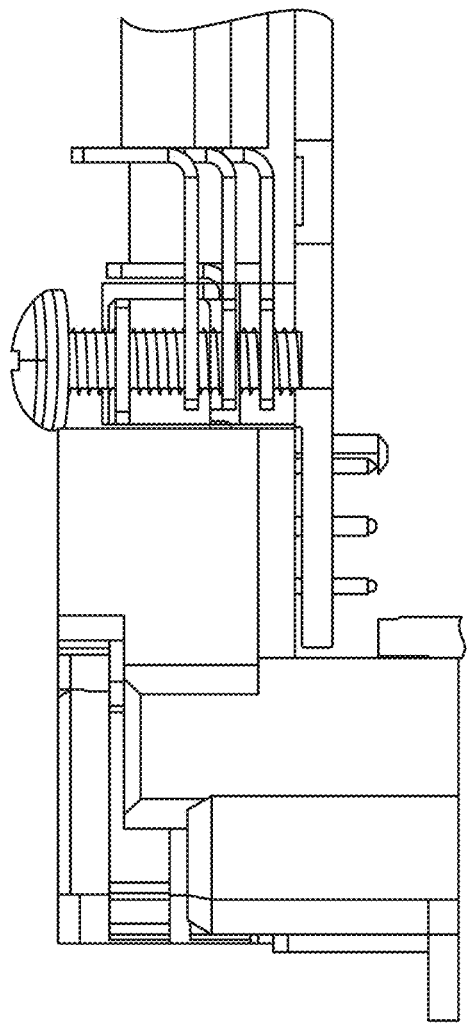
FIG. 59 is a picture view of the transport system of FIG. 55 in the operational configuration.
Figure 60:
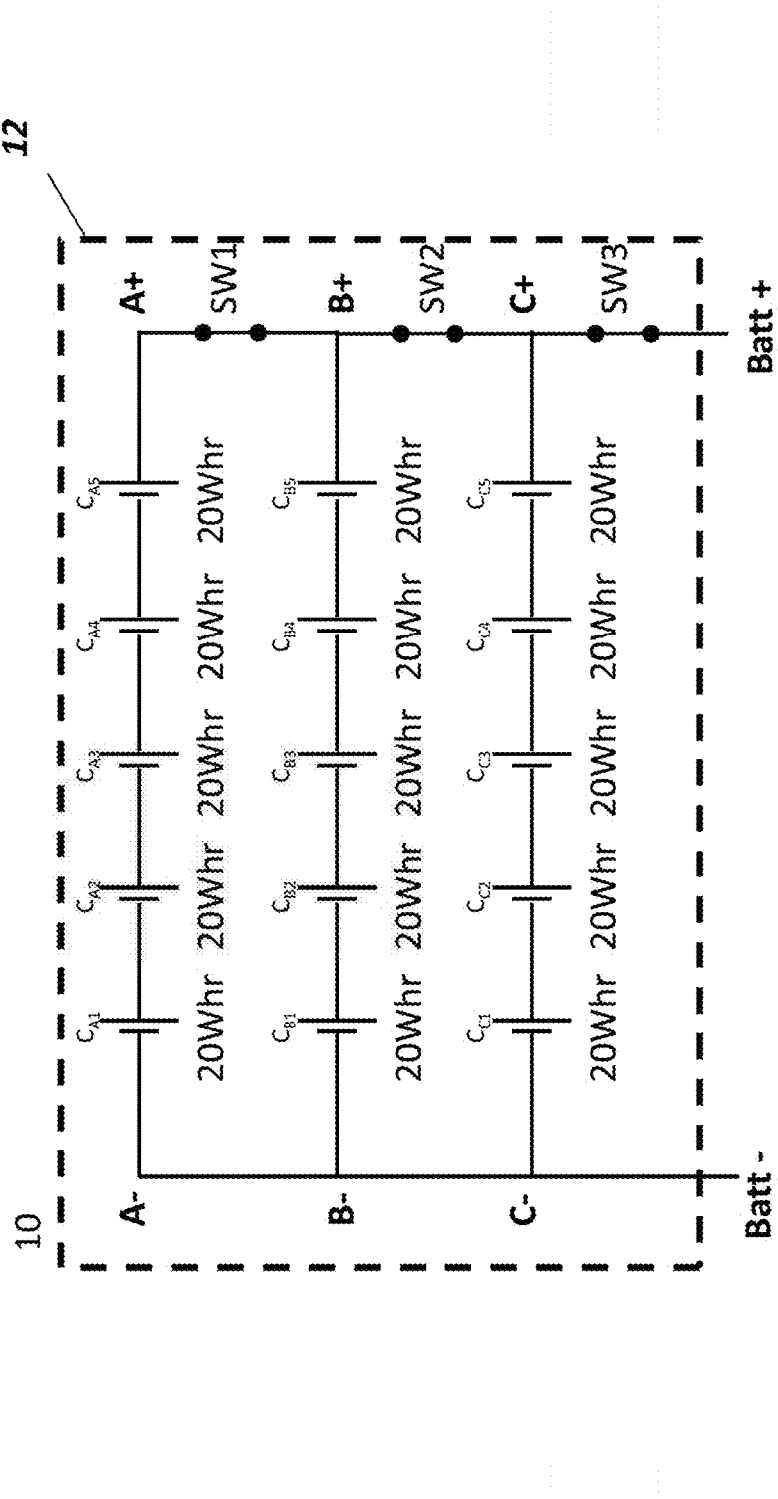
FIG. 60 is a simple circuit diagram of the battery cells of the battery pack of FIG. 1 in the operational configuration of FIG. 59.

As illustrated in FIG. 56, the battery includes a lead coupled to a positive terminal of each of three strings of battery cells (an A string, a B string and a C string of battery cells). Each of the leads is also connected to discrete contact. The screw is also coupled to a discrete contact. This screw contact is coupled to the BATT+ battery terminal. Referring to FIGS. 57 and 58, when the screw is in the up position the connection between the BATT+ battery terminal and the A+ contact/lead (SW3) is open, the connection between the A+ contact/lead and the B+ contact/lead (SW2) is open and the connection between the B+ contact/lead (SW1) is open. As such, the strings of battery cells are electrically disconnected and isolated from each other. As such, there is zero voltage potential between the BATT+ and BATT− battery terminals. Referring to FIGS. 59 and 60, when the screw is in the down position the connection between the BATT+ battery terminal and the A+ contact/lead (SW3) is closed, the connection between the A+ contact/lead and the B+ contact/lead (SW2) is closed and the connection between the B+ contact/lead (SW1) is closed. As such, the strings of battery cells are electrically connected to each other in parallel. As such, there is a voltage potential between the BATT+ and BATT− battery terminals, dependent upon the battery cells.

Figure 61B:
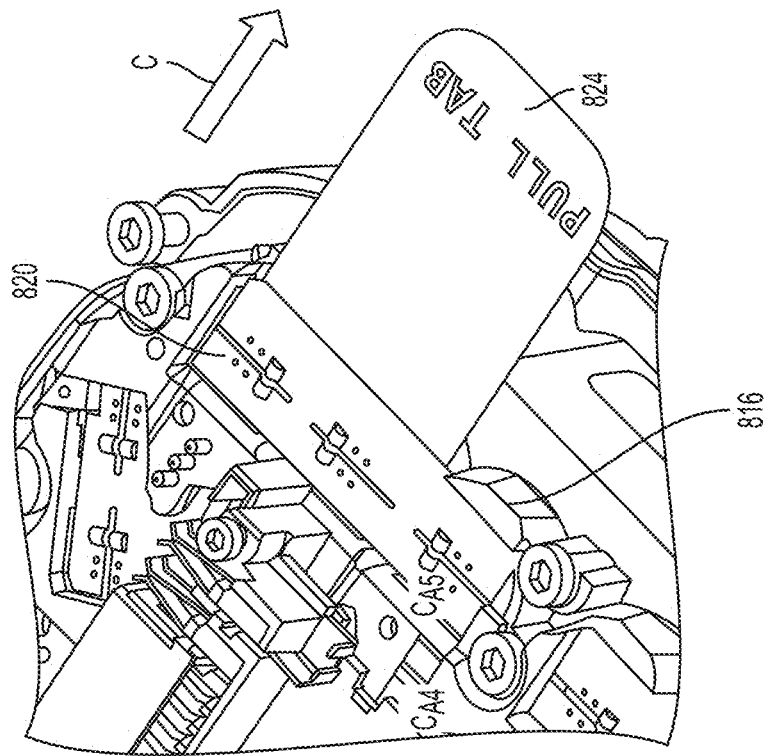
FIGS. 61A and 61B is an alternate exemplary embodiment of a battery pack including an alternate exemplary embodiment of a transport system.
Figure 61A:
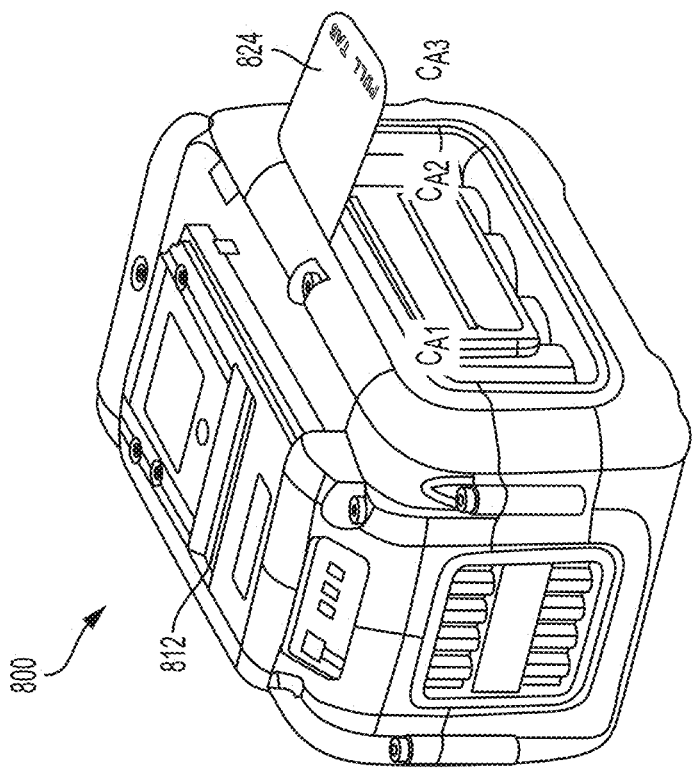
Figure 62:
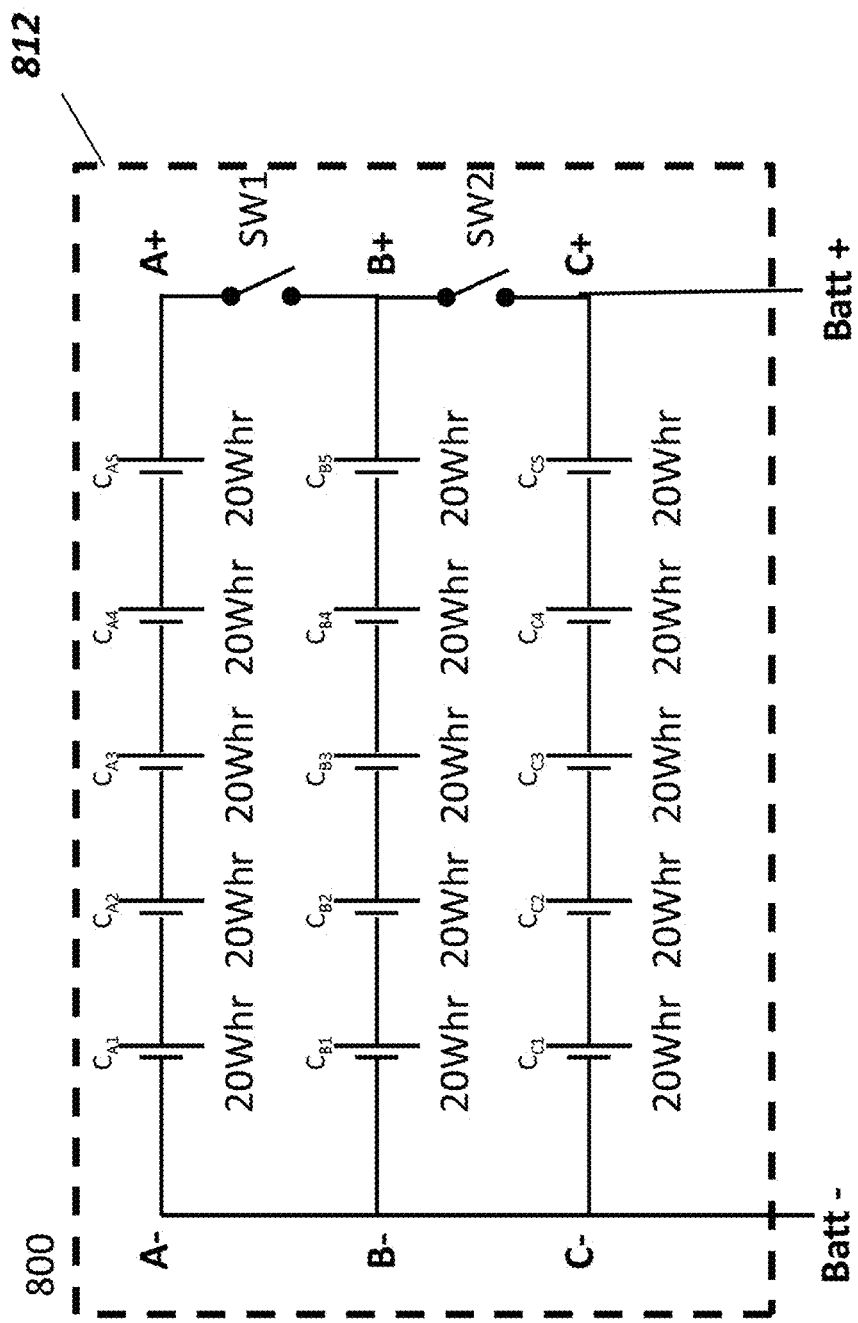
FIG. 62 is a simple circuit diagram of the battery cells of the battery pack of FIG. 61 in an operational configuration.
Figure 63:
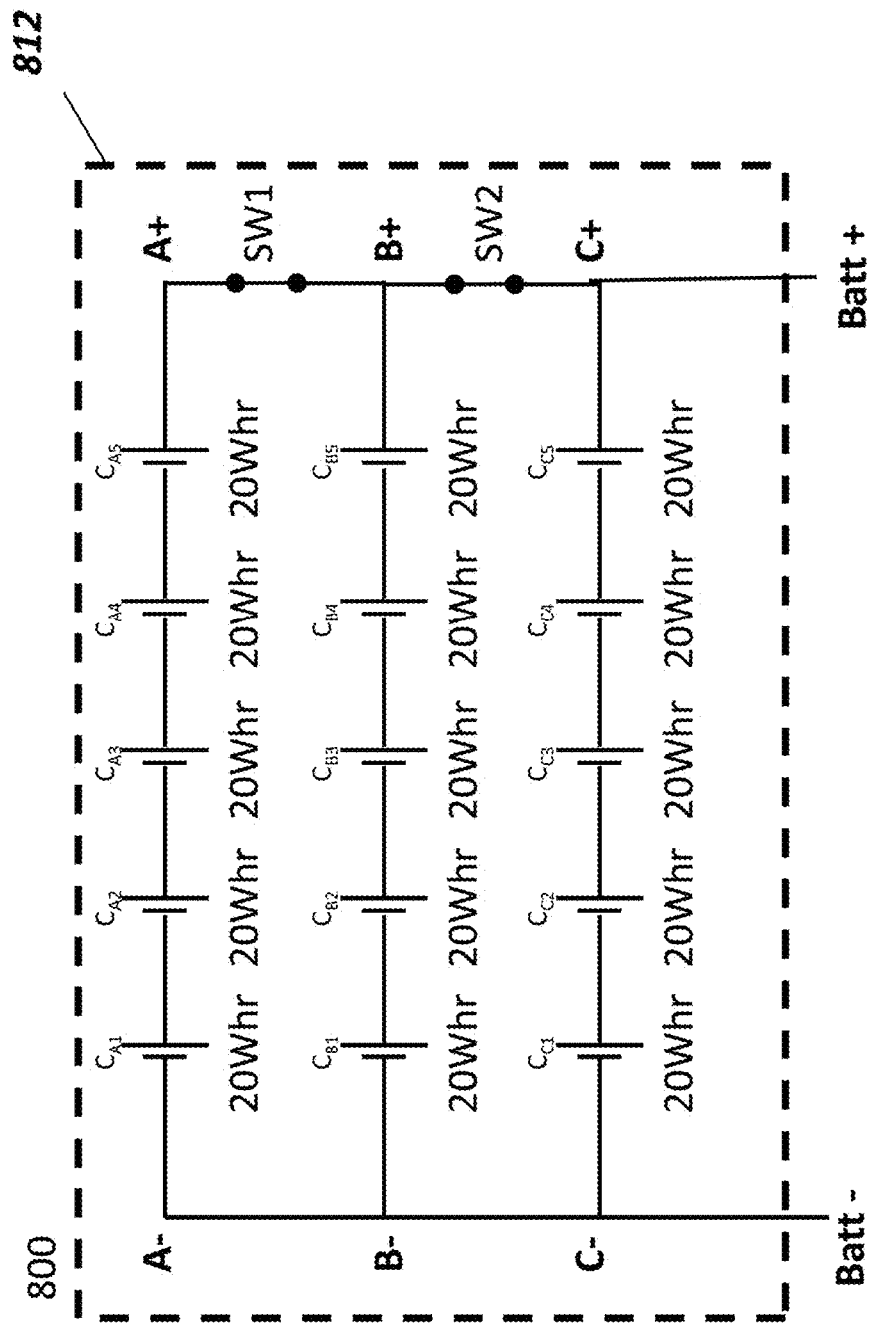
FIG. 63 is a simple circuit diagram of the battery cells of the battery pack of FIG. 61 in a transport configuration.

FIGS. 61-63 illustrate an alternate embodiment of a battery pack 800 and a transport coupler for use in conjunction with the battery pack 800. The battery pack 800 includes a housing 812. The housing 812 houses a plurality of battery cells, as described above. The battery cells are connected in series in a string of battery cells, as described above. The battery pack 800 may include two or more strings of battery cells. Each string of cells may include two or more battery cells. As described above, each string of battery cells has a positive terminal and a negative terminal. In this exemplary embodiment, each positive string terminal is electrically connected to a terminal node 816. The battery pack 800 includes a cell interconnect (also referred to as a cell strap) 820 that connects the terminal nodes 816. The connection between the terminal nodes 816 and the cell interconnect 820 effectively operates as a switch (SW1, SW2). The battey pack 800 includes a pull tab 824 positioned between the cell interconnect 820 and the terminal nodes 816. The pull tab 824 is made of an insulating material and effectively opens the switch between the terminal nodes 816 and the cell interconnect 820. As illustrated in FIG. 61A, the pull tab 824 extends from inside the battery pack housing 812 to outside the battery pack housing 812. A user may pull the pull tab 824 to remove it from between the terminal nodes 816 and the cell interconnect 820. Once the pull tab 824 is removed (in the direction of arrow C) by a user the cell interconnect 820 will electrically couple with the terminal nodes 816 effectively closing the switches SW1, SW2.

FIG. 62 illustrates a simplified circuit diagram of the strings of cells 834*a*, 834*b*, 834*c* and the switches SW1, SW2 connecting the string terminals. In the configuration illustrated in FIG. 62, the pull tab 824 is positioned between the terminal nodes 816 and the cell interconnect 820 so that the switches SW1 and SW2 are open and the strings of cells are decoupled/disconnected.

FIG. 63 illustrates the simplified circuit diagram of the strings of cells 834*a*, 834*b*, 834*c* and the switches SW1, SW. In the configuration illustrated in FIG. 63, the pull tab 824 has been removed (in the direction of arrow C) from between the terminal nodes 816 and the cell interconnect 820 so that the switches SW1 and SW2 are closed and the strings of cells are coupled/connected.

FIGS. 64-65 illustrate an alternate embodiment of a battery pack 800' and a transport coupler for use in conjunction with the battery pack 800'. The battery pack 800' includes a housing 812'. The housing 812' houses a plurality of battery cells, as described above. The battery cells are connected in series in a string of battery cells, as described above. The battery pack 800' may include two or more strings of battery cells. Each string of cells may include two or more battery cells. As described above, each string of battery cells has a positive terminal and a negative terminal. In this exemplary embodiment, each positive string terminal is electrically connected to a terminal node 816'. The battery pack 800' includes a cell interconnect (also referred to as a cell strap) 820' that connects the terminal nodes 816'. The connection between the terminal nodes 816' and the cell interconnect 820' effectively operates as a switch (SW1, SW2). The battery pack 800' includes a pair of pull tab 824*a*', 824*b*' positioned between the cell interconnect 820' and the terminal nodes 816'. The pull tabs 824*a*', 824*b*' are made of an insulating material and effectively open the switch between the terminal nodes 816' and the cell interconnect 820'. As illustrated in FIG. 64A, the pull tabs 824*a*', 824*b*' extend from inside the battery pack housing 812' to outside the battery pack housing 812'. A user may pull the pull tabs 824*a*', 824*b*' to remove them from between the terminal nodes 816' and the cell interconnect 820'. Once the pull tabs 824*a*', 824*b*' are removed (in the direction of arrow C) by a user the cell interconnect 820' will electrically couple with the terminal nodes 816 or an adjacent cell interconnect 820' effectively closing the switches SW1, SW2.

Figure 64C:
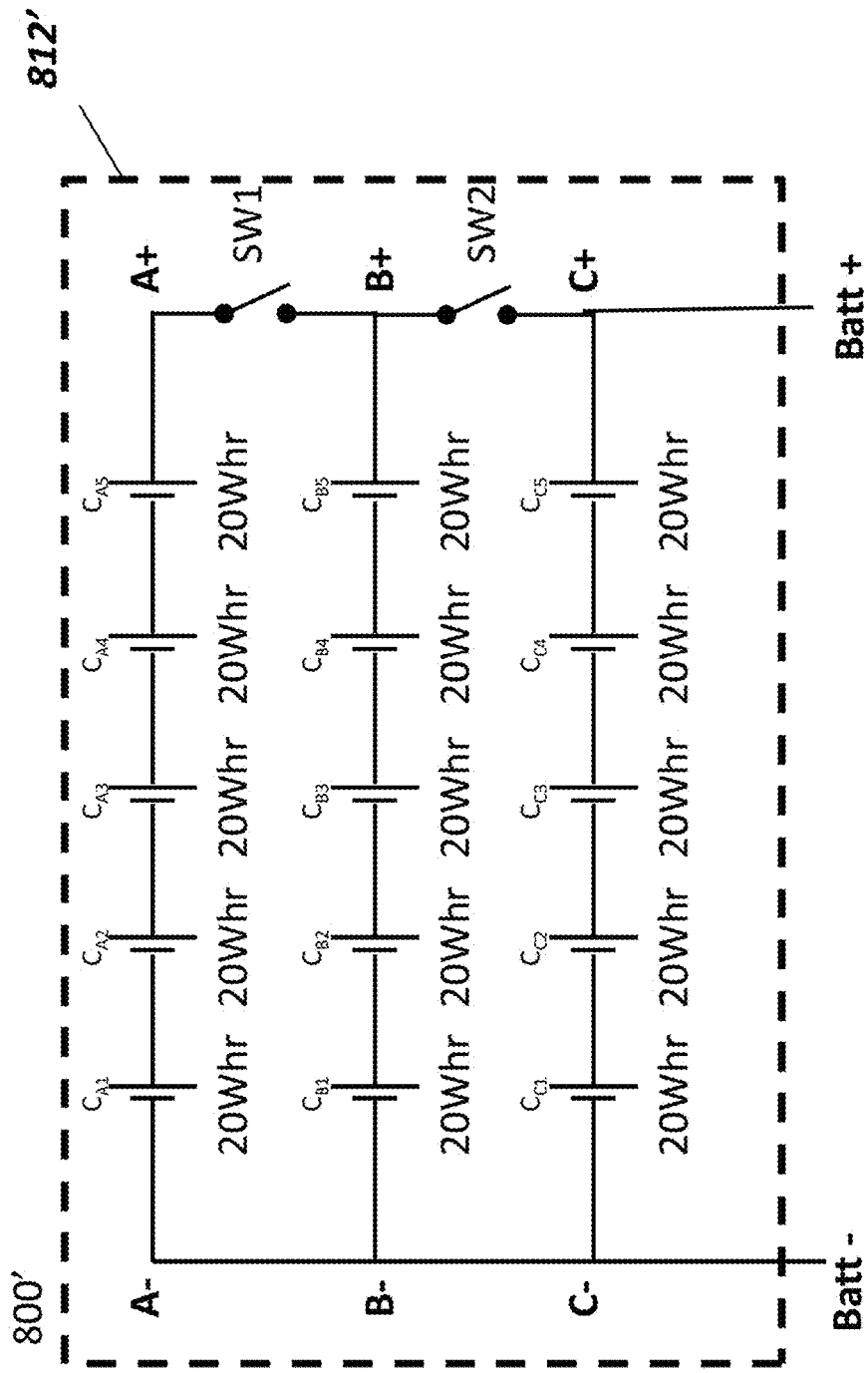
FIG. 64C is a circuit diagram of the battery pack of FIG. 64A.

FIG. 64C illustrates a simplified circuit diagram of the strings of cells 834*a*, 834*b*, 834*c* and the switches SW1, SW2 connecting the string terminals. In the configuration illustrated in FIG. 64C, the pull tabs 824*a*', 824*b*' is positioned between the terminal nodes 816' and the cell interconnect 820' so that the switches SW1 and SW2 are open and the strings of cells are decoupled/disconnected.

Figure 65C:
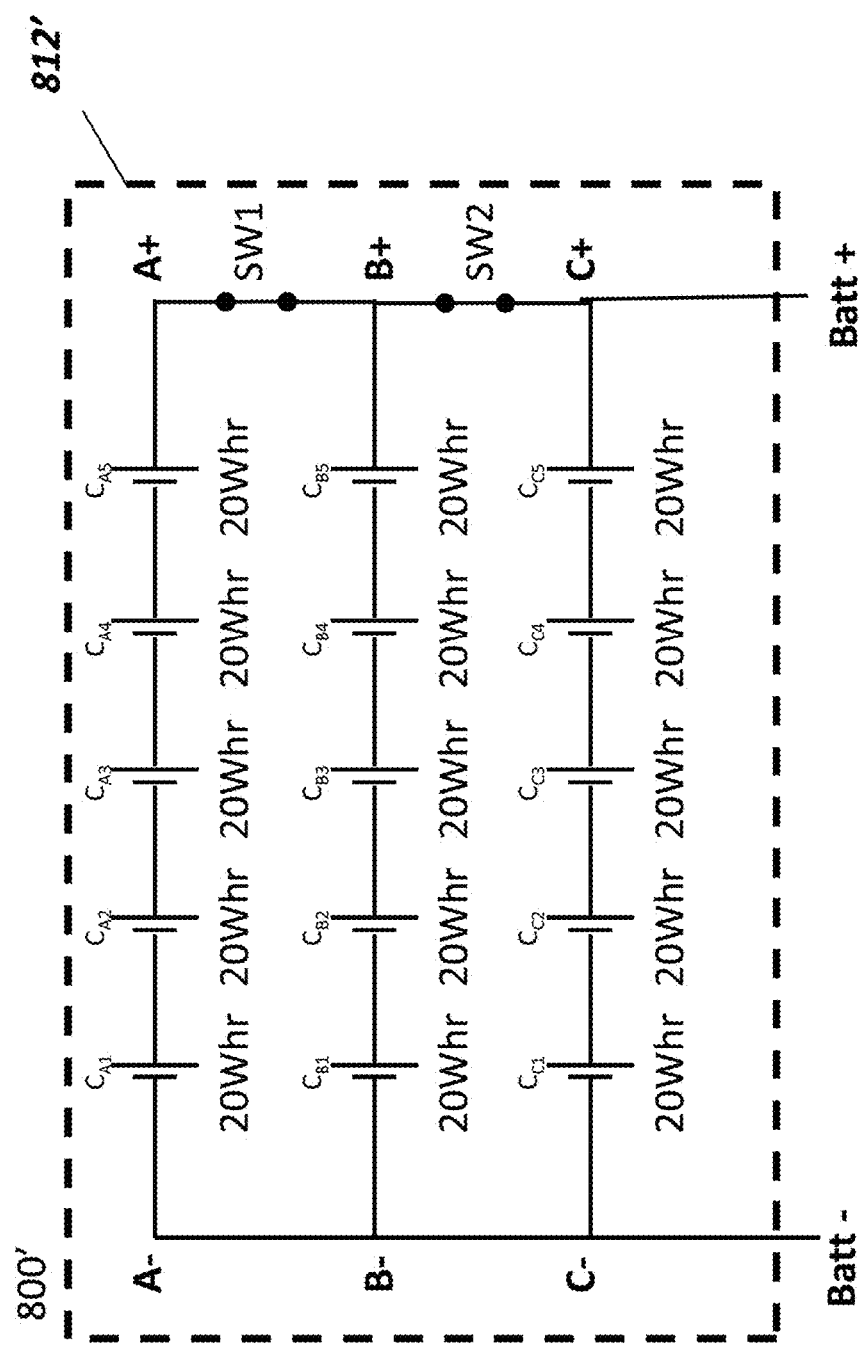
FIG. 65C is a circuit diagram of the battery pack FIG. 65A.

FIG. 65C illustrates the simplified circuit diagram of the strings of cells 834*a*, 834*b*, 834*c* and the switches SW1, SW.

In the configuration illustrated in FIG. 65C, the pull tabs 824a', 824b' have been removed (in the direction of arrow C) from between the terminal nodes 816' and the cell interconnect 820' so that the switches SW1 and SW2 are closed and the strings of cells are coupled/connected.

With such an arrangement, battery pack 810' complies with the shipping regulations as each battery cell has an energy equal to or less than 20 Watt-hours and the energy of the battery pack equal to or less than 100 Watt-hours, as the different strings A, B, C of cells 48 ($C_{A1}$-$C_{A5}$, $C_{B1}$-$C_{B5}$ and $C_{C1}$-$C_{C5}$) are electrically and/or mechanically disconnected. In order for the end user to use battery pack 800', the end user needs only to remove pull tabs 824a', 824b' from the housing 812' of battery pack 810'. This will allow the contacts and connecting straps 820a', 820b' to close and operate as discussed above.

Figure 66A:
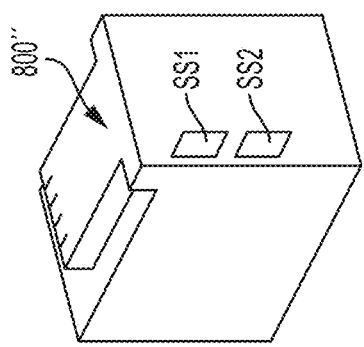
FIG. 66A and FIG. 66B are perspective views of an exemplary battery pack incorporating an alternate exemplary transport coupler.
Figure 66B:
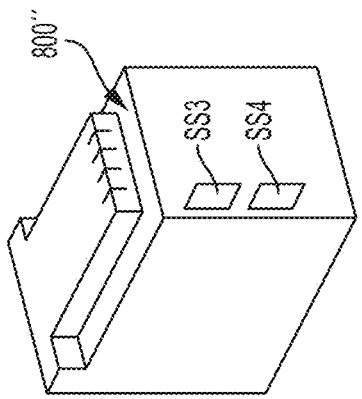

FIGS. 66 and 67 illustrate an alternate transport solution for the battery pack shown in FIG. 61A. Similar to the embodiment illustrated in FIGS. 64 and 65, this embodiment includes pull tabs to decouple (separate) and couple (connect) cell interconnects to decouple and couple the strings of cells. In such an exemplary embodiment, each cell 32 has an energy equal to or less than 20 Watt-hours. When positioned in the exemplary battery pack 800" as illustrated in FIGS. 66a and 66b, the temporary coupler includes four pull tabs SS1, SS2, SS3 and SS4 (instead of two pull tabs as described with respect to FIGS. 64 and 65). Persons skilled in the art will recognize that pull tabs SS1, SS2, SS3 and SS4 are made of an insulating (non-conductive) material and decouple the interconnects PS so that electricity cannot flow between the strings of cells. As shown in FIGS. 66A-66B, the pull tabs SS1, SS2, SS3 and SS4 extend outside of the housing of battery pack 800".

Figure 67A:
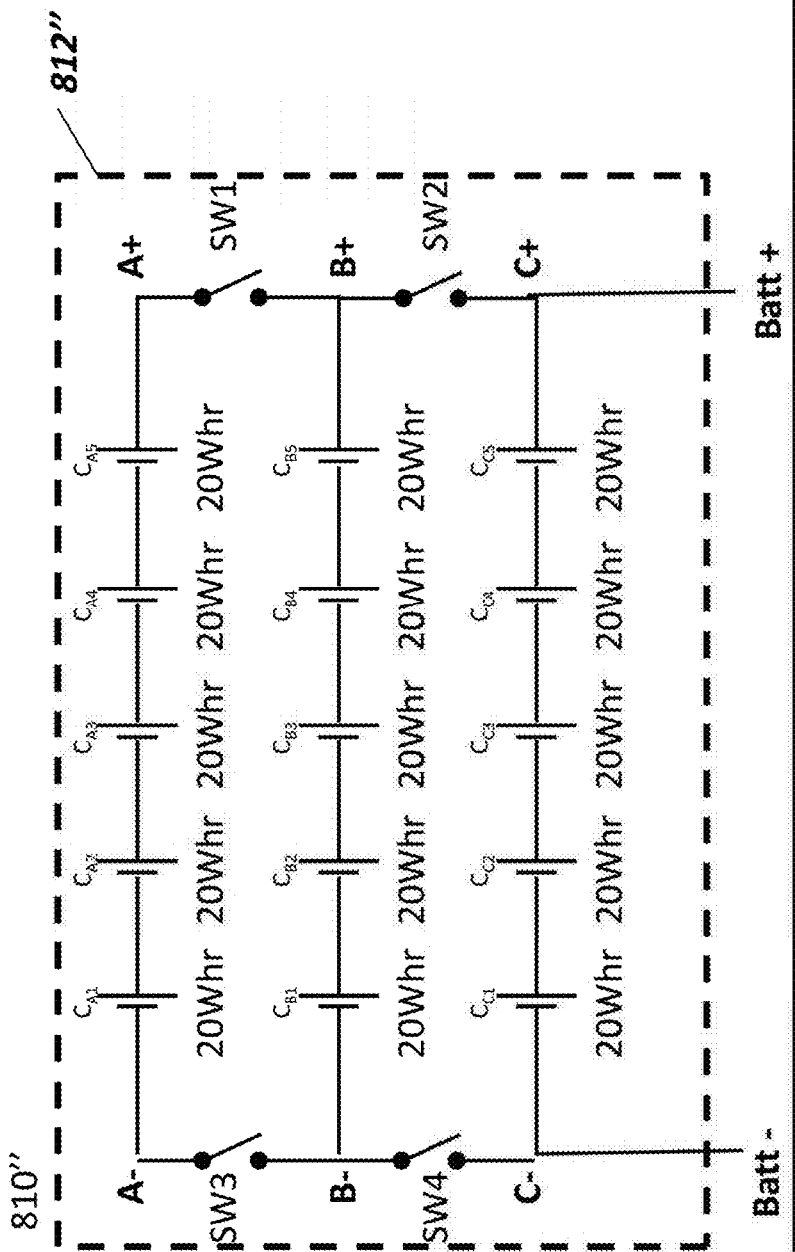
FIG. 67A is a simplified circuit diagram of the battery pack of FIGS. 66A and 66B and FIG. 67B is a simplified circuit diagram of the battery pack of FIGS. 66A and 66B with a part of the transport coupler removed.

FIG. 67A illustrates a simplified circuit diagram of the battery of FIG. 66 wherein the pull tabs are positioned between the interconnects and as such there is an open switch between the positive and negative terminals of the strings of battery cells. More specifically, positioning the pull tab SS1 between the interconnect PS1 and the interconnect PS2 disconnects the positive terminal of the C string of cells and the positive terminal of the B string of cells thereby effectively opening the switch SW2 between the positive terminal of the C string of cells and the positive terminal of the B string of cells.

Positioning the pull tab SS3 between the interconnect PS4 and the interconnect PS5 disconnects the negative terminal of the C string of cells and the negative terminal of the B string of cells thereby effectively opening the switch SW4 between the negative terminal of the C string of cells and the negative terminal of the B string of cells.

Positioning the pull tab SS2 between the interconnect PS2 and the interconnect 68 disconnects the positive terminal of the B string of cells and the positive terminal of the A string of cells thereby effectively opening the switch SW1 between the positive terminal of the B string of cells and the positive terminal of the A string of cells.

Positioning the pull tab SS4 between the interconnect PS5 and the interconnect 69 disconnects the negative terminal of the B string of cells and the negative terminal of the A string of cells thereby effectively opening the switch SW3 between the negative terminal of the B string of cells and the negative terminal of the A string of cells.

With such arrangement, battery pack 800" complies with the shipping regulations as each battery cell has an energy equal to or less than 20 Watt-hours and the total energy of the battery pack being equal to or less than 100 Watt-hours per battery pack, as the different subsets A, B, C of cells 48 ($C_{A1}$-$C_{A5}$, $C_{B1}$-$C_{B5}$ and $C_{C1}$-$C_{C5}$) are electrically disconnected.

Figure 67B:
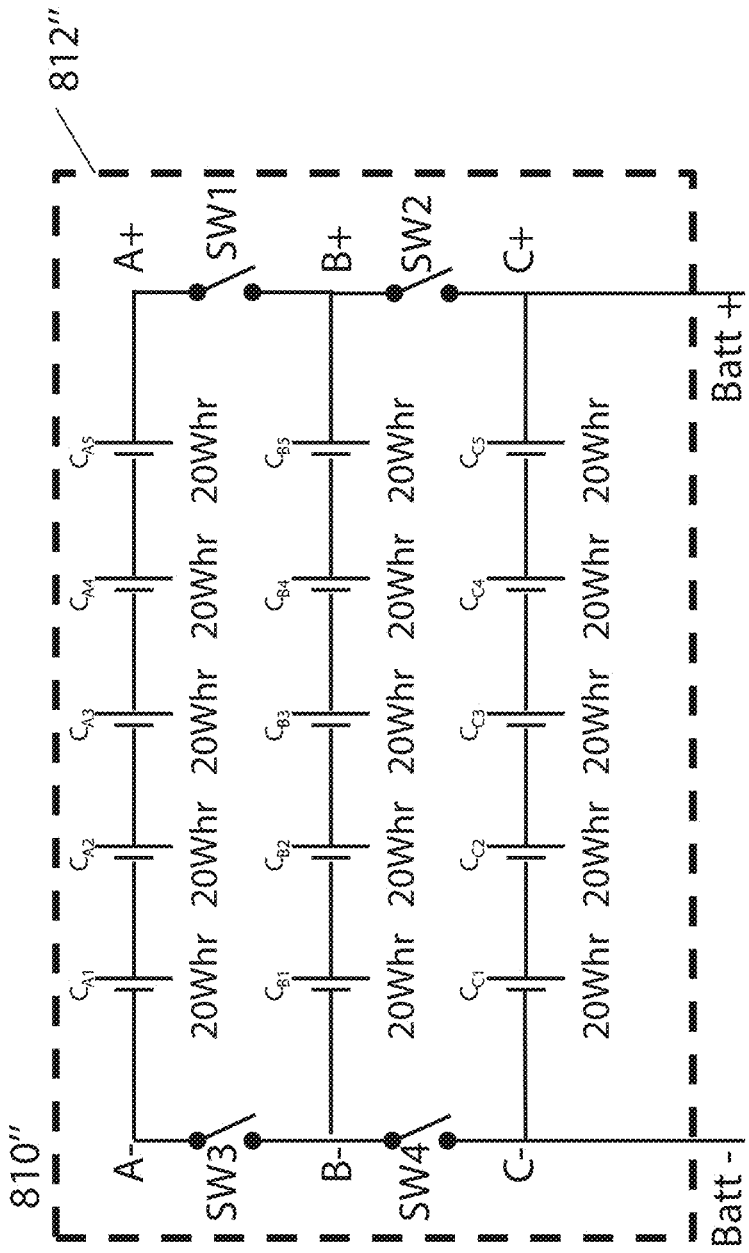
Figure 68:
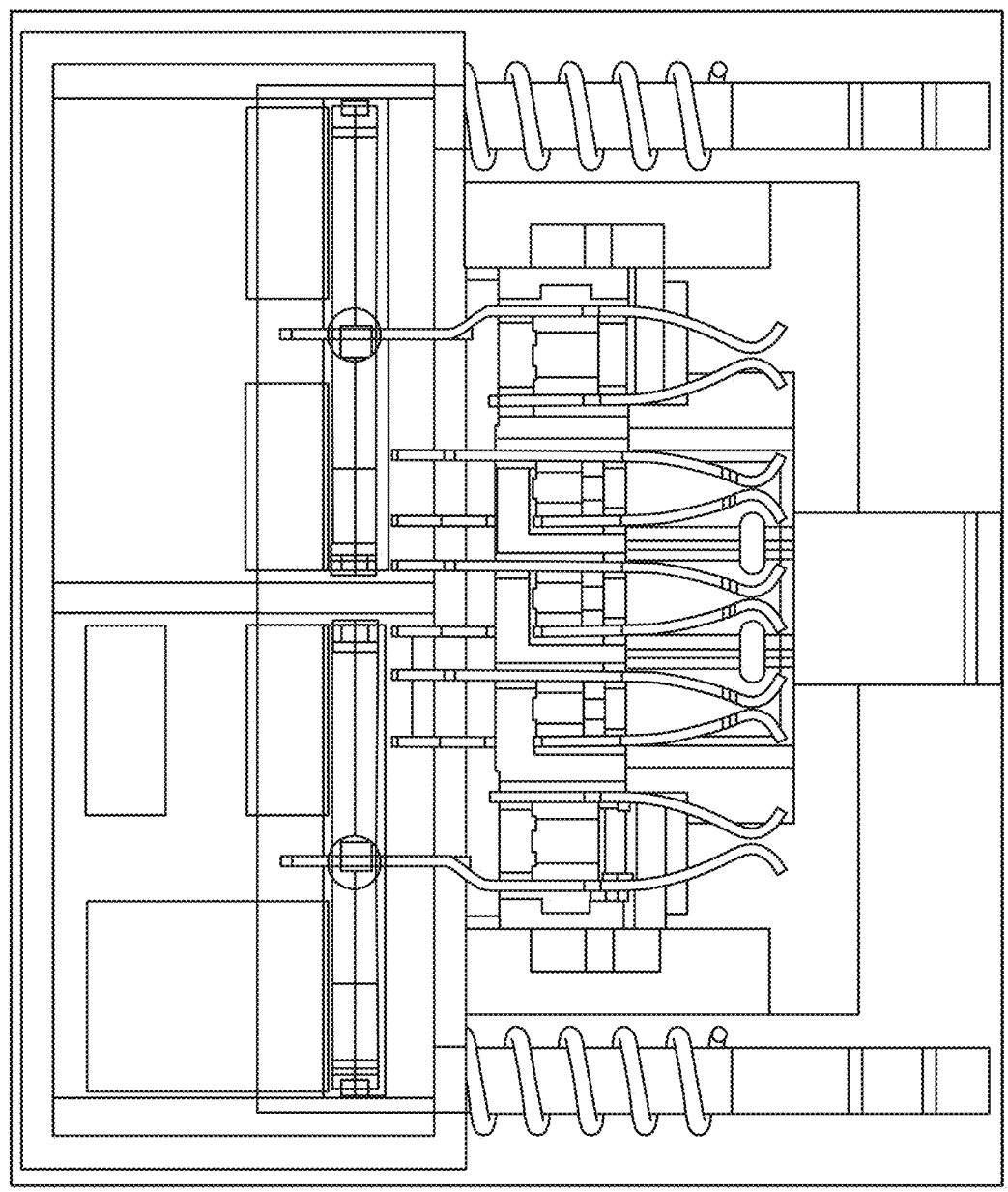
FIG. 68 is a view of an alternate exemplary embodiment of a converting subsystem in a first operational (transport) configuration.
Figure 69:
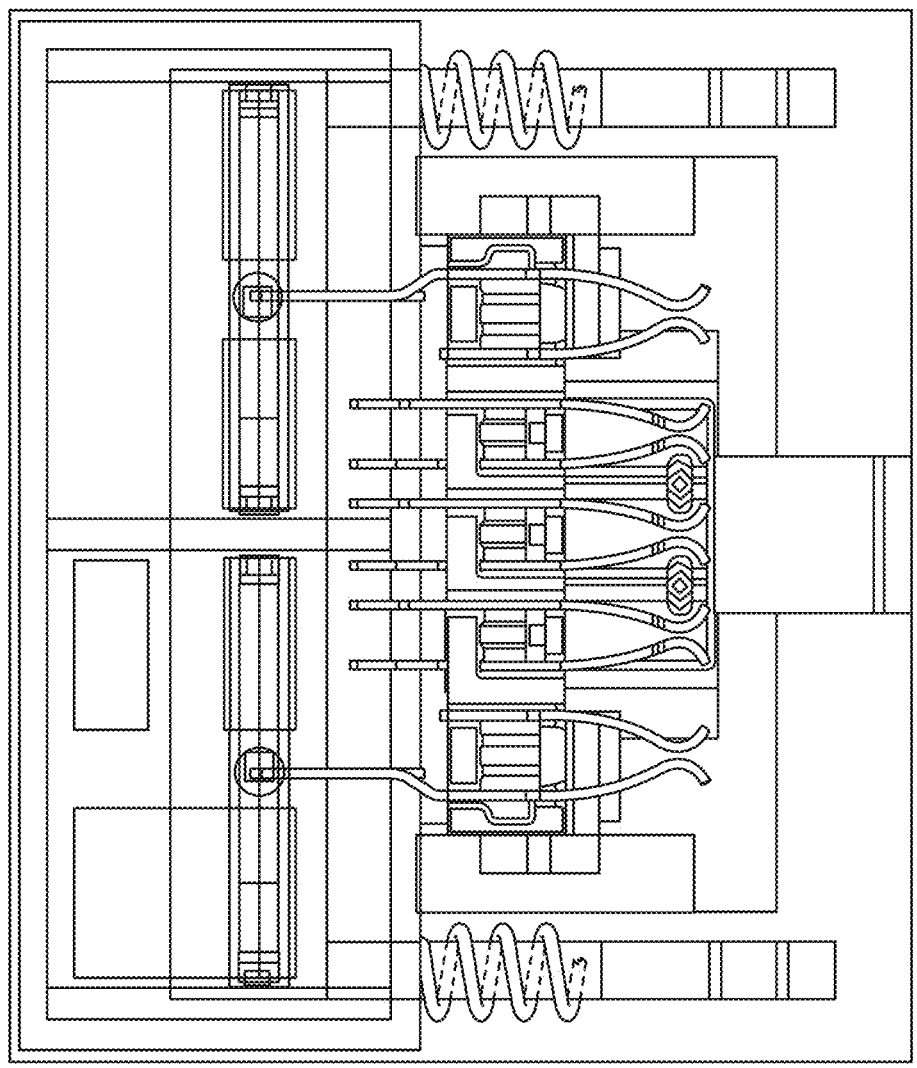
FIG. 69 is a view of the converting subsystem of FIG. 68 in a second operational (low rated voltage) configuration.
Figure 70:
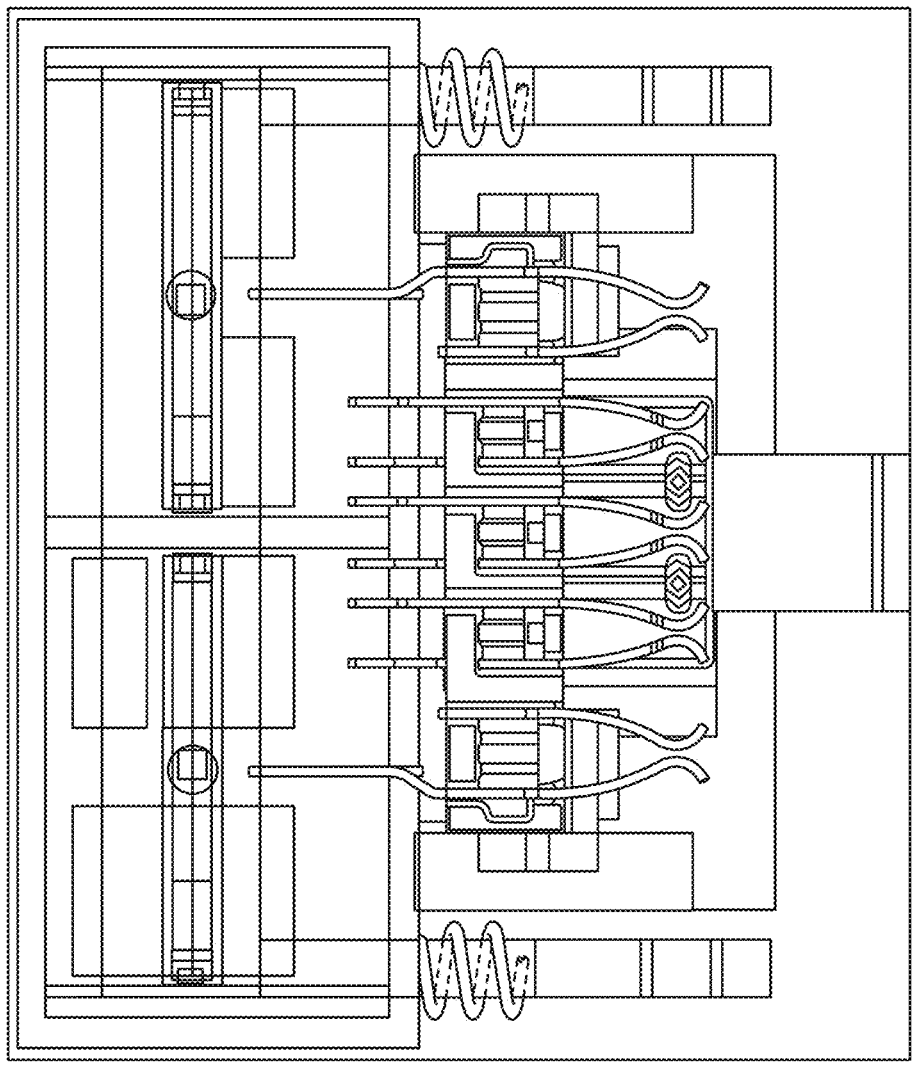
FIG. 70 is a view of the converting subsystem of FIG. 68 in a third operational (decoupled) configuration.
Figure 71:
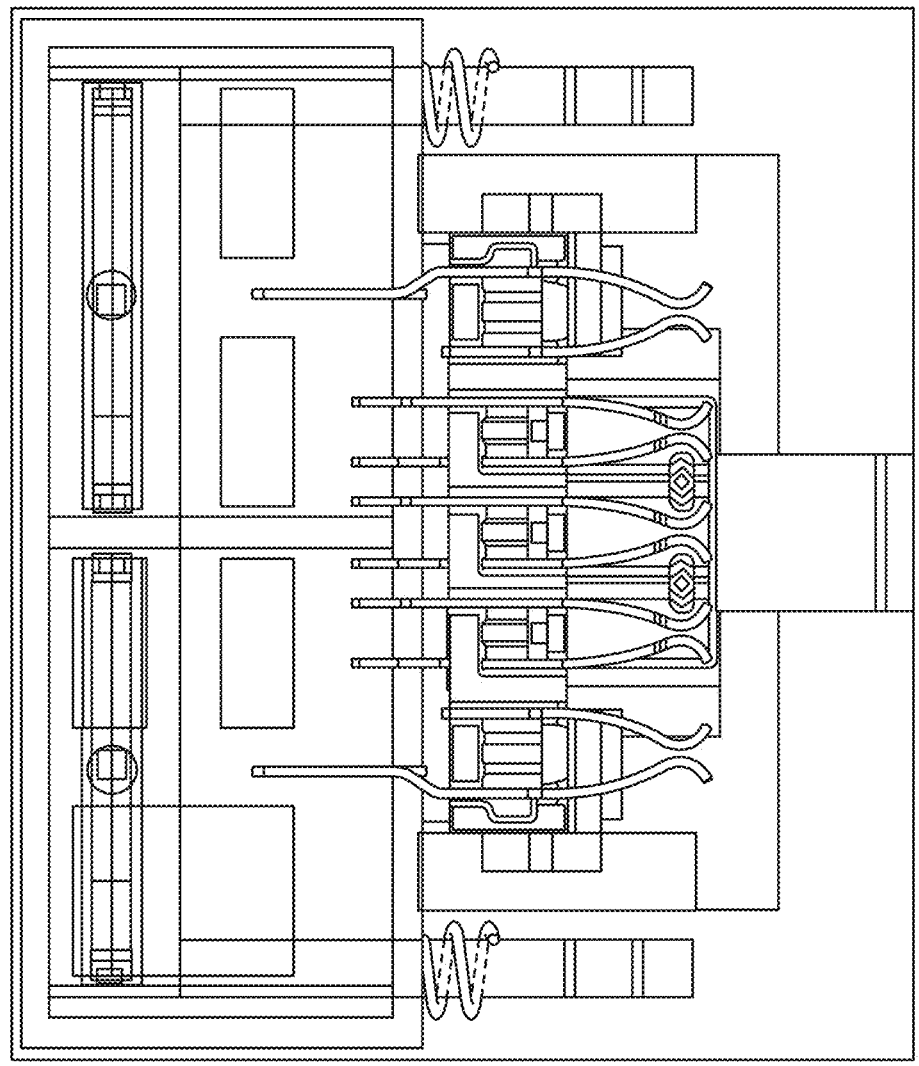
FIG. 71 is a view of the converting subsystem of FIG. 68 in a fourth operational (medium rated voltage) configuration.

In order for the end user to use battery pack 800", the end user needs only to remove pull tabs SS1, SS2, SS3 and SS4 from the housing of battery pack 800". FIG. 67B illustrates a simplified circuit diagram of the battery of FIG. 66 wherein the pull straps are removed from between the interconnects and as such there is a closed switch between the positive and negative terminals of the strings of battery cells. More specifically, removing the pull tab SS1 from between the interconnect PS1 and the interconnect PS2 connects the positive terminal of the C string of cells and the positive terminal of the B string of cells thereby effectively closing the switch SW2 between the positive terminal of the C string of cells and the positive terminal of the B string of cells.

Removing the pull tab SS3 from between the interconnect PS4 and the interconnect PS5 connects the negative terminal of the C string of cells and the negative terminal of the B string of cells thereby effectively closing the switch SW4 between the negative terminal of the C string of cells and the negative terminal of the B string of cells.

Removing the pull tab SS2 from between the interconnect PS2 and the interconnect 68 connects the positive terminal of the B string of cells and the positive terminal of the A string of cells thereby effectively closing the switch SW1 between the positive terminal of the B string of cells and the positive terminal of the A string of cells.

Removing the pull tab SS4 from between the interconnect PS5 and the interconnect 69 connects the negative terminal of the B string of cells and the negative terminal of the A string of cells thereby effectively closing the switch SW3 between the negative terminal of the B string of cells and the negative terminal of the A string of cells.

Persons skilled in the art shall recognize that each different subset A, B, C of cells 48 ($C_{A1}$-$C_{A5}$, $C_{B91}$-$C_{B5}$ and $C_{C1}$-$C_{C5}$) could be a separate UN38.3 tested sub-assembly, instead of discrete cells or cell sets combined into a larger battery pack for testing.

[FIGS. 68-71—Embodiment C4]

FIGS. 72 and 73 illustrate an alternate exemplary embodiment of a battery pack 900 and a transport coupler for use in conjunction with the battery pack 900. The battery pack 900 includes two strings (sets) of battery cells 934a, 934b. Each string—the A string and the B string—includes five battery cells 932 connected in series. Each string of battery cells 934 has a positive terminal 936 and a negative terminal 938. In alternate embodiments, the battery pack 900 may include more strings of battery cells and each string may include fewer or more battery cells. The battery pack 900 includes a housing 912 that holds the battey cells 932. The battery pack 900 also includes a cell holder that maintains the position of each battery cell 932 relative to the other battery cells. The battery pack 900 also includes a battery pack terminal block 940. The battery pack terminal block 940 houses a plurality (set) of battery pack terminals 950. In this embodiment, the plurality of battery pack terminals 950 includes a pair of positive battery pack terminal corresponding to each string of battery cells and a pair of negative terminal corresponding to each string of battery cells. In this embodiment, there is a pair of positive battery pack terminal for the A string of battery cells 950a, a pair of positive battery pack terminal for the B string of battery cells 950b, a pair of negative battery pack terminal for the A string of battery cells 950c, and a pair of negative battery pack terminal for the B string of battery cells 950d.

The battery pack terminals 950 are electrically coupled to a corresponding terminal of the string of battery cells. More specifically, the positive A string battery pack terminals 950*a* are electrically connected to the positive terminal of the A string of battery cells 936*a*, the positive B string battery pack terminals 950*b* are electrically connected to the positive terminal of the B string of battery cells 936*b*, the negative A string battery pack terminals 950*c* are electrically connected to the negative terminal of the A string of cells 938*a* and the negative B string battery pack terminals 950*d* are electrically connected to the negative terminal of the B string of battery cells 938*b*. Furthermore, in a default state the positive battery pack terminals 550*a*, 550*b* are electrically uncoupled/disconnected to each other and the negative battery pack terminals 550*c*, 550*d* are electrically uncoupled/disconnected to each other. In this manner, the individual strings of cells 934 are not coupled (uncoupled/disconnected) to each other and as such the battery pack has a lower power capacity than if the strings of cells 934 are coupled to each other. The positive terminals and the negative terminals may be formed in a tulip contacts configuration. Other configurations are contemplated by this disclosure.

As illustrated in FIG. 73, when a power tool 966 is mated with the battery pack 900 a pair of tool terminals 970*a*, 970*b* mate with corresponding battery pack terminals 950. Specifically, a positive tool terminal 970*a* mates with and electrically couples the positive A string battery pack terminal 950*a* and the positive B string battery pack terminal 950*b* and a negative tool terminal 970*b* mates with and electrically couples the negative A string battery pack terminal 950*c* and the negative B string battery pack terminal 950*d*. The tool terminals 970 effectively serve as power switches SW1, SW2 between the terminals of the strings of battery cells. In other words, when the positive tool terminal 970*a* mates with and couples the positive battery pack terminals 950*a*, 950*b*, the positive terminals of the strings of battery cells 936*a*, 936*b* are coupled effectively closing switch SW2 and when the negative tool terminal 970*b* mates with and couples the negative battery pack terminals 950*c*, 950*d*, the negative terminals of the strings of battery cells 938*a*, 938*b* are coupled effectively closing switch SW1, as illustrated in FIGS. 73A1, 73A2, 73A3 and 73A4.

The invention claimed is:

1. A removable, secondary battery pack for providing electrical power to an electrical device, the battery pack comprising:
   a housing configured to mechanically mate with a receiving portion of the electrical device;
   a first string of battery cells housed within the housing;
   a second string of battery cells housed within the housing; and
   a coupler provided at least partially inside the housing and at least partially outside the housing and movable at least partially into and out of the housing between a first position and a second position, wherein in the first position, the coupler causes the first string of battery cells to be electrically connected to the second string of battery cells, and in the second position, the coupler causes the first string of battery cells to be electrically disconnected from the second string of battery cells.

2. The battery pack of claim 1, further comprising at least one switching element arranged to electrically connect the first string of battery cells to the second string of battery cells in the first position of the coupler, and electrically disconnect the first string of battery cells from the second string of battery cells in the second position of the coupler.

3. The battery pack of claim 2, wherein each of the first string of battery cells and second string of battery cells comprises a plurality of battery cells connected in series, and the at least one switching element is provided to connect the first string of battery cells and second string of battery cells in series.

4. The battery pack of claim 3, further comprising at least one converter switch configured to switchably connect the first string of battery cells and the second string of battery cells in parallel in a third position of the coupler.

5. The battery pack of claim 1, further comprising a plurality of battery terminals oriented along a longitudinal direction of the housing, wherein the coupler comprises a portion provided at least partially accessible from an exterior of the housing at least in the second position of the coupler and is slidably moveable along the longitudinal direction of the housing.

6. The battery pack of claim 1, further comprising a transport lock removably mounted to lock the coupler in the second position.

7. The battery pack of claim 6, wherein the transport lock comprises a main body and at least one projection extending from the main body that engages the coupler and biases the coupler in the second position.

8. The battery pack of claim 7, further comprising a plurality of terminal housing slots corresponding to a plurality of battery terminals, wherein the transport lock is slidably mountable proximate the plurality of terminal housing slots.

9. The battery pack of claim 8, wherein the main body of the transport lock at least partially covers the plurality of battery terminal housing slots.

10. The battery pack of claim 6, wherein the battery pack is prevented from being mechanically mated with the receiving portion of the electrical device when the transport lock is mounted on the housing.

11. The battery pack of claim 1, wherein when the battery pack is coupled to the electrical device, the coupler moves from the second position to the first position.

12. A removable, secondary battery pack for providing electrical power to an electrical device, the battery pack comprising:
   a housing configured to mechanically mate with a receiving portion of the electrical device;
   a first string of battery cells housed within the housing;
   a second string of battery cells housed within the housing; and
   a transport lock removably mounted to the housing, wherein in a mounted position of the transport lock, the first string of battery cells is prevented from being electrically connected to the second string of battery cells inside the housing, and an unmounted position of the transport lock, the first string of battery cells is allowed to be electrically connected to the second string of battery cells inside the housing.

13. The battery pack of claim 12, further comprising a coupler provided at least partially inside the housing and movable between a first position, which causes the first string of battery cells to be electrically connected to the second string of battery cells inside the housing, and a second position, which causes the first string of battery cells to be electrically disconnected from the second string of battery cells inside the housing.

14. The battery pack of claim 13, wherein the transport lock is configured to engage the coupler to lock the coupler in the second position.

15. The battery pack of claim 13, further comprising at least one switch arranged to electrically connect the first string of battery cells to the second string of battery cells in the first position of the coupler, and electrically disconnect the first string of battery cells from the second string of battery cells in the second position of the coupler.

16. The battery pack of claim 15, wherein each of the first string of battery cells and second string of battery cells comprise a plurality of battery cells connected in series, and the at least one switch is provided to connect the first string of battery cells and second string of battery cells in series.

17. The battery pack of claim 13, further comprising a plurality of battery terminals arranged along a longitudinal direction of the housing, wherein the coupler comprises a portion provided at least partially outside the housing at least in the second position of the coupler and is slidably moveable along the longitudinal direction of the housing.

18. The battery pack of claim 12, further comprising a plurality of terminal housing slots corresponding to a plurality of battery terminals, wherein the transport lock is slidably mountable on the housing proximate the plurality of terminal housing slots.

19. The battery pack of claim 18, wherein the transport lock at least partially covers the plurality of battery terminals housing slots.

20. The battery pack of claim 12, wherein the battery pack is prevented from being mechanically mated with the receiving portion of the electrical device when the transport lock is mounted on the housing.

21. A removable, secondary battery pack for providing electrical power to an electrical device, the battery pack comprising:

a housing configured to mechanically mate with a receiving portion of the electrical device;

a first string of battery cells housed within the housing;

a second string of battery cells housed within the housing;

at least one switching element arranged to electrically connect the first string of battery cells to the second string of battery cells in a first state, and electrically disconnect the first string of battery cells from the second string of battery cells in a second state; and a coupler moveably provided at least partially inside the housing and at least partially outside the housing and configured to selectively change a state of the at least one switching element between the first state and the second state upon the coupler moving to more partially inside the housing and less partially outside the housing.

22. The battery pack of claim 21, wherein the at least one switching element comprises a network of one or more switches comprising at least one of a mechanical switch, an electronic switch, or an electro-mechanical switch or a combination thereof.

* * * * *